US012641018B2

(12) United States Patent
Qian et al.

(10) Patent No.: US 12,641,018 B2
(45) Date of Patent: May 26, 2026

(54) WIDE AREA NETWORKING SERVICE USING PROVIDER NETWORK BACKBONE NETWORK

(71) Applicant: Amazon Technologies, Inc., Seattle, WA (US)

(72) Inventors: Baihu Qian, Chicago, IL (US); Omer Hashmi, Bethesda, MD (US); Thomas Nguyen Spendley, Rockville, MD (US); Bashuman Deb, Aldie, VA (US); Shridhar Kulkarni, Seattle, WA (US); Paul John Tillotson, Herndon, VA (US); Ramin Ali Dousti, Ashburn, VA (US); Indira Radhika Pulla, Aldie, VA (US); Steve Ge, Potomac, MD (US); Nicholas Ryan Lombardi, Ashburn, VA (US); Nick Matthews, Westminster, CO (US); Anoop Dawani, Redmond, WA (US)

(73) Assignee: Amazon Technologies, Inc., Seattle, WA (US)

( * ) Notice: Subject to any disclaimer, the term of this patent is extended or adjusted under 35 U.S.C. 154(b) by 433 days.

(21) Appl. No.: 18/160,997

(22) Filed: Jan. 27, 2023

(65) Prior Publication Data

US 2023/0179517 A1 Jun. 8, 2023

Related U.S. Application Data

(63) Continuation of application No. 17/218,036, filed on Mar. 30, 2021, now Pat. No. 11,601,365.

(51) Int. Cl.
| | |
|---|---|
| *H04L 45/586* | (2022.01) |
| *H04L 45/02* | (2022.01) |
| *H04L 45/16* | (2022.01) |

(52) U.S. Cl.
CPC ............ *H04L 45/586* (2013.01); *H04L 45/04* (2013.01); *H04L 45/16* (2013.01)

(58) Field of Classification Search
CPC ....... H04L 45/586; H04L 45/04; H04L 45/16; H04L 45/02; H04L 67/10
See application file for complete search history.

(56) References Cited

U.S. PATENT DOCUMENTS

| | | |
|---|---|---|
| 6,006,272 A | 12/1999 | Aravamudan et al. |
| 6,993,021 B1 | 1/2006 | Chuah et al. |

(Continued)

FOREIGN PATENT DOCUMENTS

WO 2016075913 A1 5/2016

OTHER PUBLICATIONS

Office Action mailed Oct. 29, 2024 in Japanese Patent Application No. 2023-560016, Amazon Technologies, Inc., 7 pages (including translation).

(Continued)

*Primary Examiner* — Luat Phung
(74) *Attorney, Agent, or Firm* — Robert C. Kowert; Kowert, Hood, Munyon, Rankin & Goetzel, P.C.

(57) ABSTRACT

An indication of a set of premises between which network traffic is to be routed via a private fiber backbone of a provider network is obtained. Respective virtual routers are configured for a first premise and a second premise, and connectivity is established between the virtual routers and routing information sources at the premises. Contents of at least one network packet originating at the first premise are transmitted to the second premise via the private fiber backbone using routing information obtained at the virtual routers from the routing information source at the second premise.

20 Claims, 31 Drawing Sheets

(56) References Cited

U.S. PATENT DOCUMENTS

| | | | |
|---|---|---|---|
| 7,274,706 | B1 | 9/2007 | Nguyen |
| 7,468,956 | B1 | 12/2008 | Leelanivas |
| 7,660,265 | B2 | 2/2010 | Kruek |
| 7,782,782 | B1 | 8/2010 | Ferguson et al. |
| 7,865,586 | B2 | 1/2011 | Cohn |
| 7,869,442 | B1 | 1/2011 | Kamboh et al. |
| 8,160,056 | B2 | 4/2012 | Van der Merwe |
| 8,194,554 | B2 | 6/2012 | Bragg |
| 8,244,909 | B1 | 8/2012 | Hanson et al. |
| 8,331,371 | B2 * | 12/2012 | Judge ..................... H04L 45/30 |
| | | | 370/408 |
| 8,358,658 | B2 | 1/2013 | Flynn et al. |
| 8,478,896 | B2 | 7/2013 | Ehlers |
| 8,693,470 | B1 | 4/2014 | Maxwell et al. |
| 8,788,705 | B2 | 7/2014 | Norrman |
| 8,989,131 | B2 | 3/2015 | Adhikary |
| 9,210,090 | B1 | 12/2015 | Baldi |
| 9,356,866 | B1 | 5/2016 | Sivaramakrishnan et al. |
| 9,935,829 | B1 | 4/2018 | Miller |
| 9,935,920 | B2 | 4/2018 | Sridharan |
| 9,948,579 | B1 | 4/2018 | Sivaramakrishnan |
| 10,164,868 | B2 | 12/2018 | Cowart |
| 10,263,840 | B2 | 4/2019 | Mudigonda |
| 10,313,930 | B2 | 6/2019 | Hughes |
| 10,355,989 | B1 | 7/2019 | Panchal et al. |
| 10,382,401 | B1 * | 8/2019 | Lee ..................... H04L 63/166 |
| 10,623,390 | B1 | 4/2020 | Rosenhouse |
| 10,715,419 | B1 | 7/2020 | Suryanarayana |
| 10,735,263 | B1 | 8/2020 | McAlary et al. |
| 10,742,446 | B2 | 8/2020 | Tillotson et al. |
| 10,742,554 | B2 | 8/2020 | Deb et al. |
| 10,742,557 | B1 | 8/2020 | Miriyala et al. |
| 10,757,009 | B2 | 8/2020 | Deb et al. |
| 10,785,146 | B2 | 9/2020 | Tillotson et al. |
| 10,797,989 | B2 | 10/2020 | Tillotson et al. |
| 10,834,044 | B2 | 11/2020 | Tillotson et al. |
| 10,893,004 | B2 | 1/2021 | Tillotson |
| 10,897,417 | B2 | 1/2021 | Tillotson et al. |
| 10,999,137 | B2 | 5/2021 | Cidon |
| 11,228,641 | B1 | 1/2022 | Wagner et al. |
| 11,310,155 | B1 | 4/2022 | Qian et al. |
| 11,412,416 | B2 | 8/2022 | Hughes |
| 11,451,467 | B2 | 9/2022 | Deb et al. |
| 11,601,365 | B2 | 3/2023 | Qian et al. |
| 11,632,268 | B2 | 4/2023 | Sridhar |
| 11,824,773 | B2 | 11/2023 | Qian et al. |
| 11,870,677 | B2 | 1/2024 | Suryanarayana |
| 12,009,947 | B2 | 6/2024 | Ritchie |
| 12,010,097 | B2 | 6/2024 | Cometto |
| 2002/0116501 | A1 | 8/2002 | Ho |
| 2003/0051163 | A1 | 3/2003 | Bidaud |
| 2005/0152284 | A1 | 7/2005 | Kotha |
| 2008/0225875 | A1 | 9/2008 | Wray et al. |
| 2009/0304004 | A1 | 12/2009 | Huynh Van |
| 2010/0040069 | A1 | 2/2010 | Johri |
| 2010/0043068 | A1 | 2/2010 | Varadhan et al. |
| 2010/0309839 | A1 | 12/2010 | Goldshtein |
| 2013/0254766 | A1 | 9/2013 | Zuo et al. |
| 2014/0161091 | A1 | 6/2014 | Adhikary |
| 2014/0244814 | A1 | 8/2014 | Kuzmack |
| 2014/0282071 | A1 | 9/2014 | Martini |
| 2014/0359091 | A1 | 12/2014 | Senniappan |
| 2015/0271268 | A1 | 9/2015 | Finkelstein |
| 2016/0088092 | A1 | 3/2016 | Cardona-Gonzalez |
| 2016/0127454 | A1 * | 5/2016 | Maheshwari ........... H04L 67/10 |
| | | | 709/223 |
| 2016/0182310 | A1 | 6/2016 | Gintis |
| 2016/0239337 | A1 | 8/2016 | Gu |
| 2016/0241513 | A1 | 8/2016 | Sridharan |
| 2016/0261506 | A1 | 9/2016 | Hedge |
| 2016/0308762 | A1 * | 10/2016 | Teng ................... H04L 12/4633 |
| 2016/0337474 | A1 * | 11/2016 | Rao ..................... H04L 12/4633 |
| 2017/0177396 | A1 | 6/2017 | Palermo et al. |
| 2018/0007002 | A1 | 1/2018 | Landfraf |
| 2018/0041425 | A1 | 2/2018 | Zhang |
| 2018/0063000 | A1 | 3/2018 | Wu |
| 2018/0067819 | A1 | 3/2018 | Kotha |
| 2018/0091394 | A1 | 3/2018 | Richards |
| 2018/0234259 | A1 | 8/2018 | Du et al. |
| 2018/0367445 | A1 | 12/2018 | Bajaj |
| 2019/0026082 | A1 | 1/2019 | Shalev |
| 2019/0052604 | A1 | 2/2019 | Coleman |
| 2019/0132152 | A1 | 5/2019 | Wang |
| 2019/0208008 | A1 | 7/2019 | Tan |
| 2019/0230030 | A1 | 7/2019 | Eswara |
| 2019/0268421 | A1 | 8/2019 | Markuze et al. |
| 2019/0319894 | A1 | 10/2019 | Tang |
| 2019/0392150 | A1 | 12/2019 | Shevade |
| 2020/0007437 | A1 | 1/2020 | Keshava et al. |
| 2020/0092193 | A1 | 3/2020 | Tillotson et al. |
| 2020/0106744 | A1 | 4/2020 | Miriyala et al. |
| 2020/0162362 | A1 * | 5/2020 | Deb ...................... H04L 45/42 |
| 2020/0204492 | A1 | 6/2020 | Sarva et al. |
| 2020/0274952 | A1 | 8/2020 | Waskiewicz |
| 2020/0336336 | A1 * | 10/2020 | Sethi ...................... H04L 45/38 |
| 2020/0344146 | A1 | 10/2020 | Roberts et al. |
| 2021/0359948 | A1 | 11/2021 | Durrani et al. |
| 2021/0385149 | A1 | 12/2021 | Suryanarayana |
| 2022/0171649 | A1 | 6/2022 | Green et al. |
| 2022/0286489 | A1 * | 9/2022 | Trussart .............. H04L 12/1859 |
| 2022/0321469 | A1 | 10/2022 | Qian et al. |
| 2022/0321471 | A1 | 10/2022 | Deb et al. |
| 2023/0016213 | A1 * | 1/2023 | Bahl ................... H04L 41/0894 |
| 2023/0031462 | A1 | 2/2023 | Keane |
| 2023/0079670 | A1 | 3/2023 | Deb et al. |
| 2024/0333640 | A1 | 10/2024 | Shevade et al. |

OTHER PUBLICATIONS

Albert Greenberg, et al "VL2: a Scalable and Flexible Data Center Network" Communications of the ACM, vol. 54, No. 3, Mar. 2011, pp. 1-10.

Chuanxiong Guo, et al "BCube: a High Performance, Server-centric Network Architecture for Modular Data Centers" SIGCOMM'09 Aug. 17-21, pp. 1-12.

"On the Impact of Packet Spraying in Data Center Networks", Advait Dixit, et al., 2013, pp. 1-9.

U.S. Appl. No. 17/385,778, filed Jul. 26, 2021, Meher Aditya Kumar Addepalli.

U.S. Appl. No. 17/218,031, filed Mar. 30, 2021, Baihu Qian, et al.

U.S. Appl. No. 17/218,039, filed Mar. 30, 2021, Baihu Qian, et al.

International Search Report and Written Opinion mailed Jul. 4, 2022 in PCT/US2022/021549, Amazon Technologies, Inc.

U.S. Appl. No. 18/986,588, filed Dec. 18, 2024, Bashuman Deb, et al.

U.S. Appl. No. 18/339,189, filed Jun. 21, 2023, Bashuman Deb.

E. Rosen and Y. Rekhter, "BGP/MPLS IP Virtual Private Networks (VPNs)," Networking Working Group, The Internet Society Feb. 2006, pp. 1-47.

U.S. Appl. No. 18/190,888, filed Mar. 27, 2023, Shevade, et al.

U.S. Appl. No. 18/190,891, filed Mar. 27, 2023, Shevade, et al.

* cited by examiner

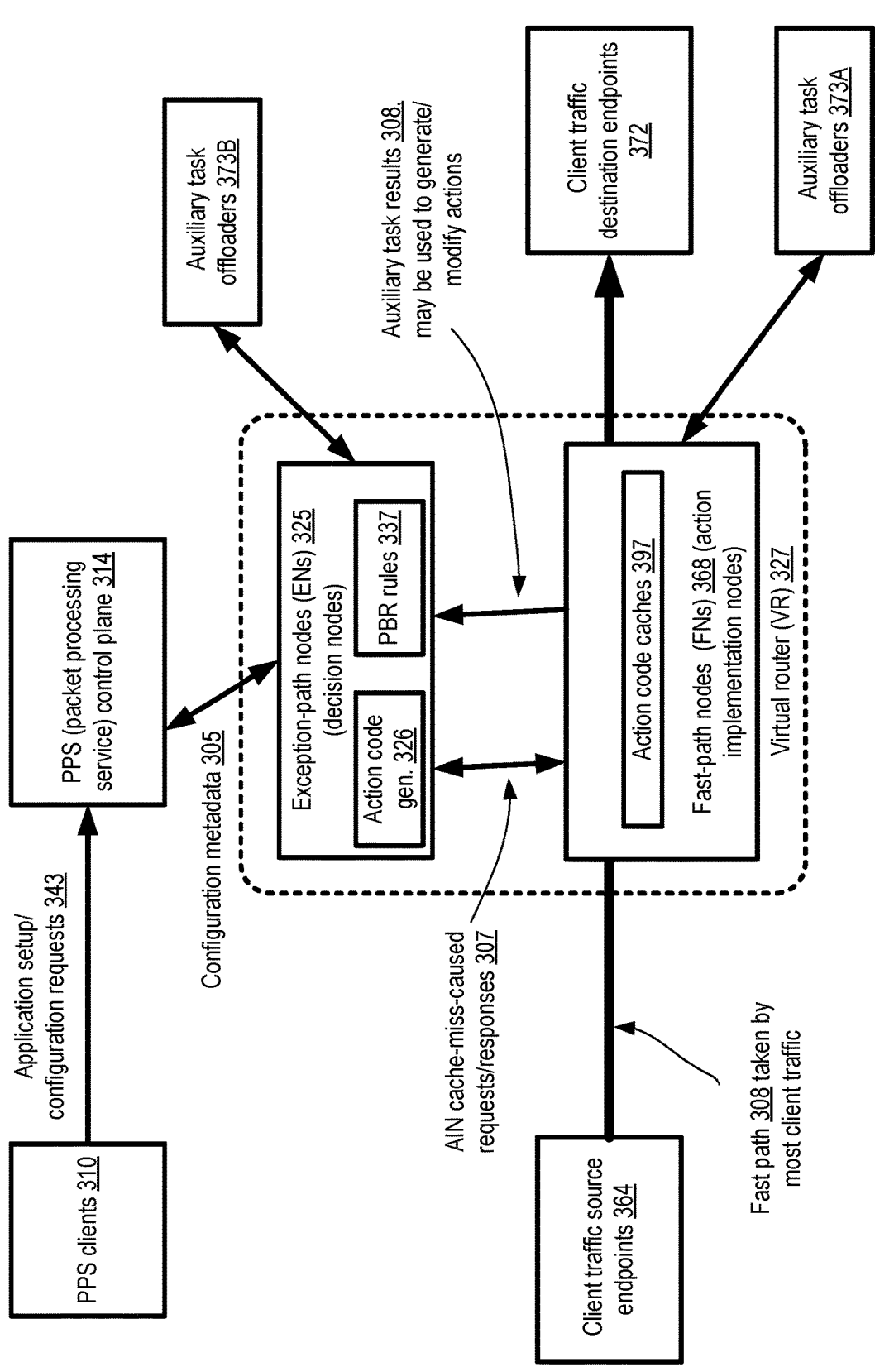

PPS clients 310

Application setup/ configuration requests 343

PPS (packet processing service) control plane 314

Configuration metadata 305

Auxiliary task offloaders 373B

Exception-path nodes (ENs) 325 (decision nodes)

PBR rules 337

Action code gen. 326

Auxiliary task results 308 may be used to generate/ modify actions

AIN cache-miss-caused requests/responses 307

Client traffic destination endpoints 372

Action code caches 397

Fast-path nodes (FNs) 368 (action implementation nodes)

Virtual router (VR) 327

Auxiliary task offloaders 373A

Client traffic source endpoints 364

Fast path 308 taken by most client traffic

FIG. 3

Packet processing service (PPS) 812

CustomAuxiliaryTaskDescriptor 914

TaskDescriptorSaved 915

Programmatic interfaces 877

SetAuxiliaryTaskResourceTenancy 917

TenancyInfoSaved 919

AuxiliaryTaskMonitoringRequirements 921

MonitoringRequirementsSaved 923

Client 810

GetAuxiliaryTaskMetrics 925

AuxiliaryTaskMetricsSet 927

ModifyAuxiliaryTasks 929

AuxiliaryTasksModified 931

. . .

Determine, e.g., from a client via programmatic interfaces at a packet processing service of a provider network, a set of isolated networks (INs) whose network traffic is to be processed based on client-specified application requirements (such as dynamic routing preferences, multicast requirements, policy-based routing (PBR) rules)   1001

Identify one or more categories of auxiliary tasks (e.g., in addition to baseline packet forwarding) associated with the transmission of the network packets between a pair of INs IN1 and IN2; the categories could include, for example, routing configuration management tasks using BGP or other protocols, encryption of packet contents using IPSec or other protocols, periodic performance measurements (e.g., using TWAMP), DNS tasks, client-specified custom tasks such as tagging-based packet analytics collection, etc.   1004

Configure one or more virtual routers (VRs) for the client's application and programmatically attach IN1 and IN2 to the VR(s); each VR may include nodes at two layers – a fast-path layer which efficiently implements routing/forwarding actions, and an exception-path layer responsible for specifying/generating the routing/forwarding actions based on client-supplied metadata or rules   1007

Configure one or more auxiliary task offloaders (ATOs) to perform the offloading tasks; enable connectivity between the VR(s) and the ATOs, e.g., by providing one or more PBR rules and configuring one or more virtual network interfaces to which the VR nodes can direct packets which require auxiliary processing   1010

Enable client's application endpoints (e.g., in IN1) to start sending packets (e.g., to destination endpoints in IN2) via a VR; set up auxiliary task protocol sessions if needed, which also lead to packets being received at the VR   1013

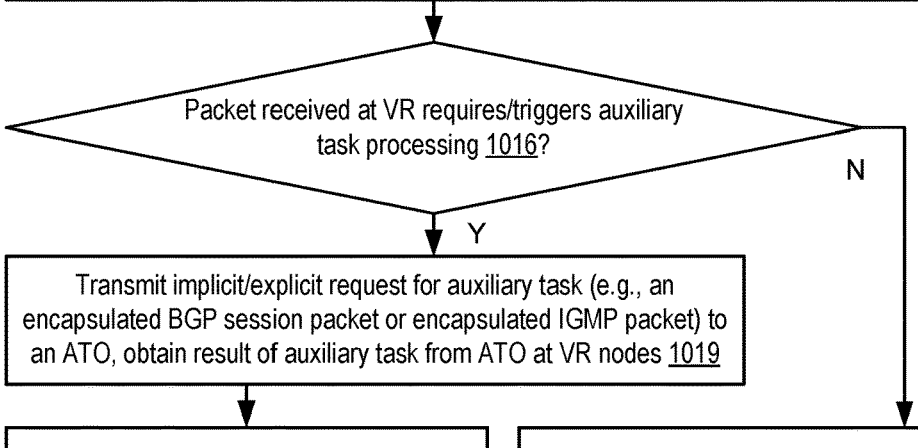

Packet received at VR requires/triggers auxiliary task processing 1016?

N

Y

Transmit implicit/explicit request for auxiliary task (e.g., an encapsulated BGP session packet or encapsulated IGMP packet) to an ATO, obtain result of auxiliary task from ATO at VR nodes 1019

Use result of auxiliary task to transmit at least some packets between IN1 and IN2 (e.g., via routes learned using BGP, to multicast destinations identified using IGMP, or in encrypted form using IPSec)   1022

Implement routing/forwarding action w.r.t. received packet without utilizing ATO   1025

FIG. 10

Figure 12:
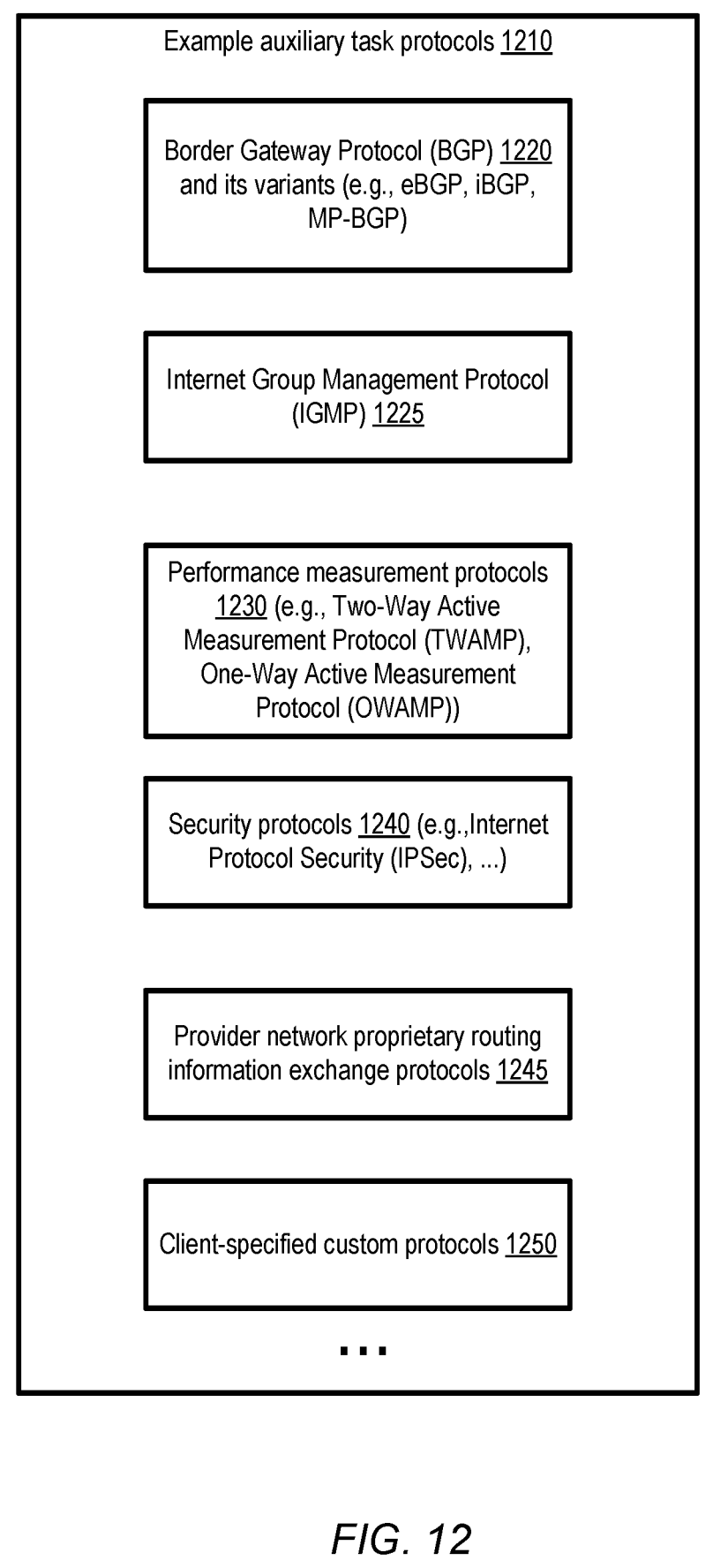

Example auxiliary task protocols 1210

Border Gateway Protocol (BGP) 1220 and its variants (e.g., eBGP, iBGP, MP-BGP)

Internet Group Management Protocol (IGMP) 1225

Performance measurement protocols 1230 (e.g., Two-Way Active Measurement Protocol (TWAMP), One-Way Active Measurement Protocol (OWAMP))

Security protocols 1240 (e.g.,Internet Protocol Security (IPSec), ...)

Provider network proprietary routing information exchange protocols 1245

Client-specified custom protocols 1250

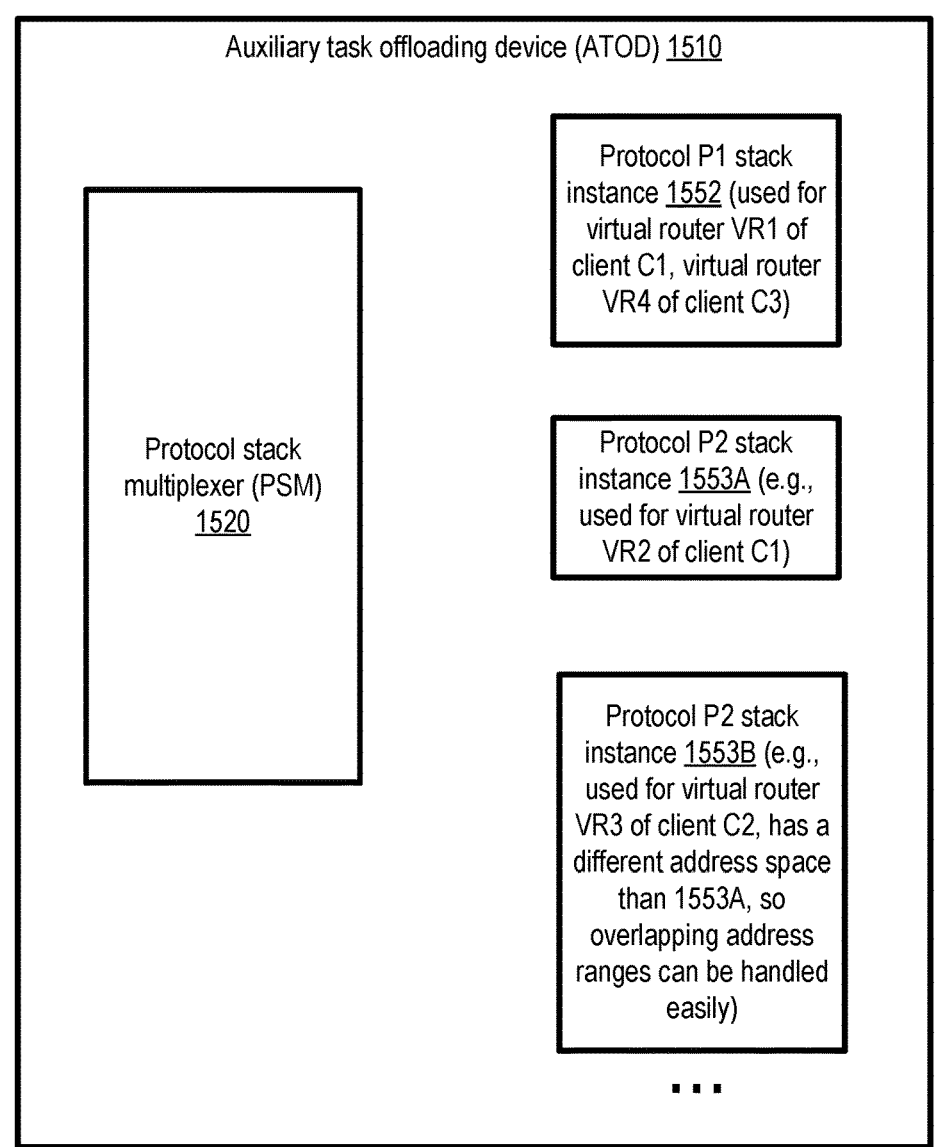

Auxiliary task offloading device (ATOD) 1510

Protocol stack multiplexer (PSM) 1520

Protocol P1 stack instance 1552 (used for virtual router VR1 of client C1, virtual router VR4 of client C3)

Protocol P2 stack instance 1553A (e.g., used for virtual router VR2 of client C1)

Protocol P2 stack instance 1553B (e.g., used for virtual router VR3 of client C2, has a different address space than 1553A, so overlapping address ranges can be handled easily)

Protocol stack state management approach A

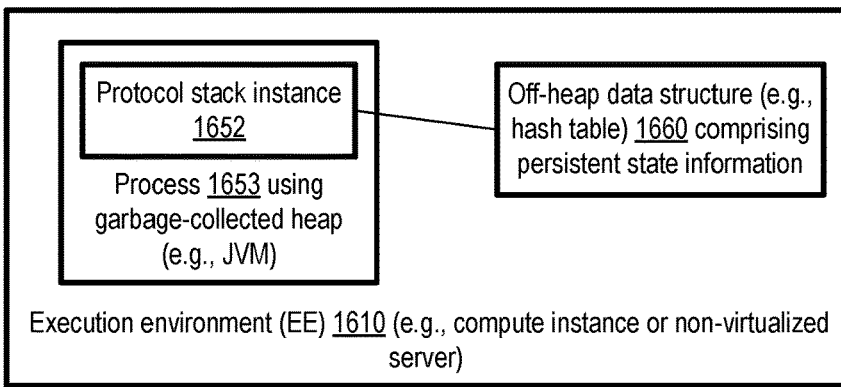

Protocol stack instance 1652

Process 1653 using garbage-collected heap (e.g., JVM)

Off-heap data structure (e.g., hash table) 1660 comprising persistent state information Execution environment (EE) 1610 (e.g., compute instance or non-virtualized server)

Protocol stack state management approach B

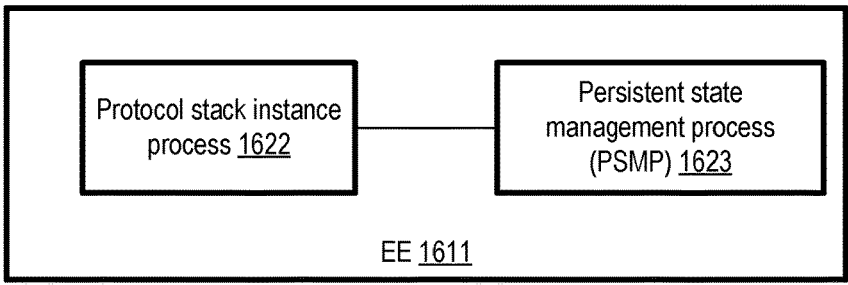

Protocol stack instance process 1622

Persistent state management process (PSMP) 1623

EE 1611

Protocol stack state management approach C

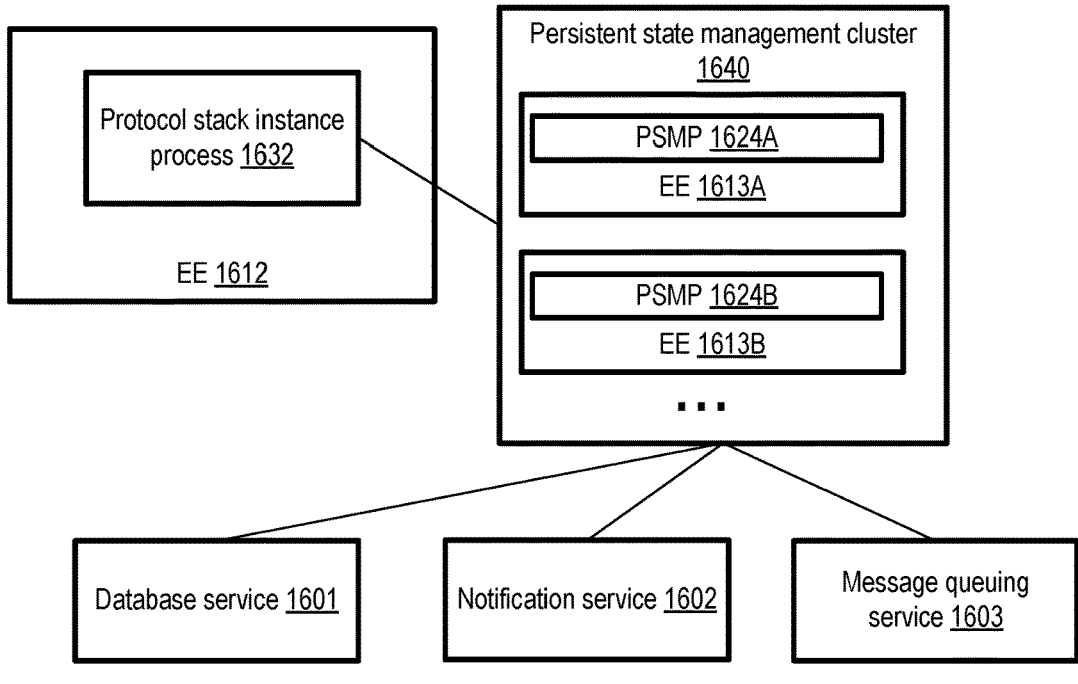

Persistent state management cluster 1640

Protocol stack instance process 1632

PSMP 1624A

EE 1613A

PSMP 1624B

EE 1613B

EE 1612

• • •

Database service 1601

Notification service 1602

Message queuing service 1603

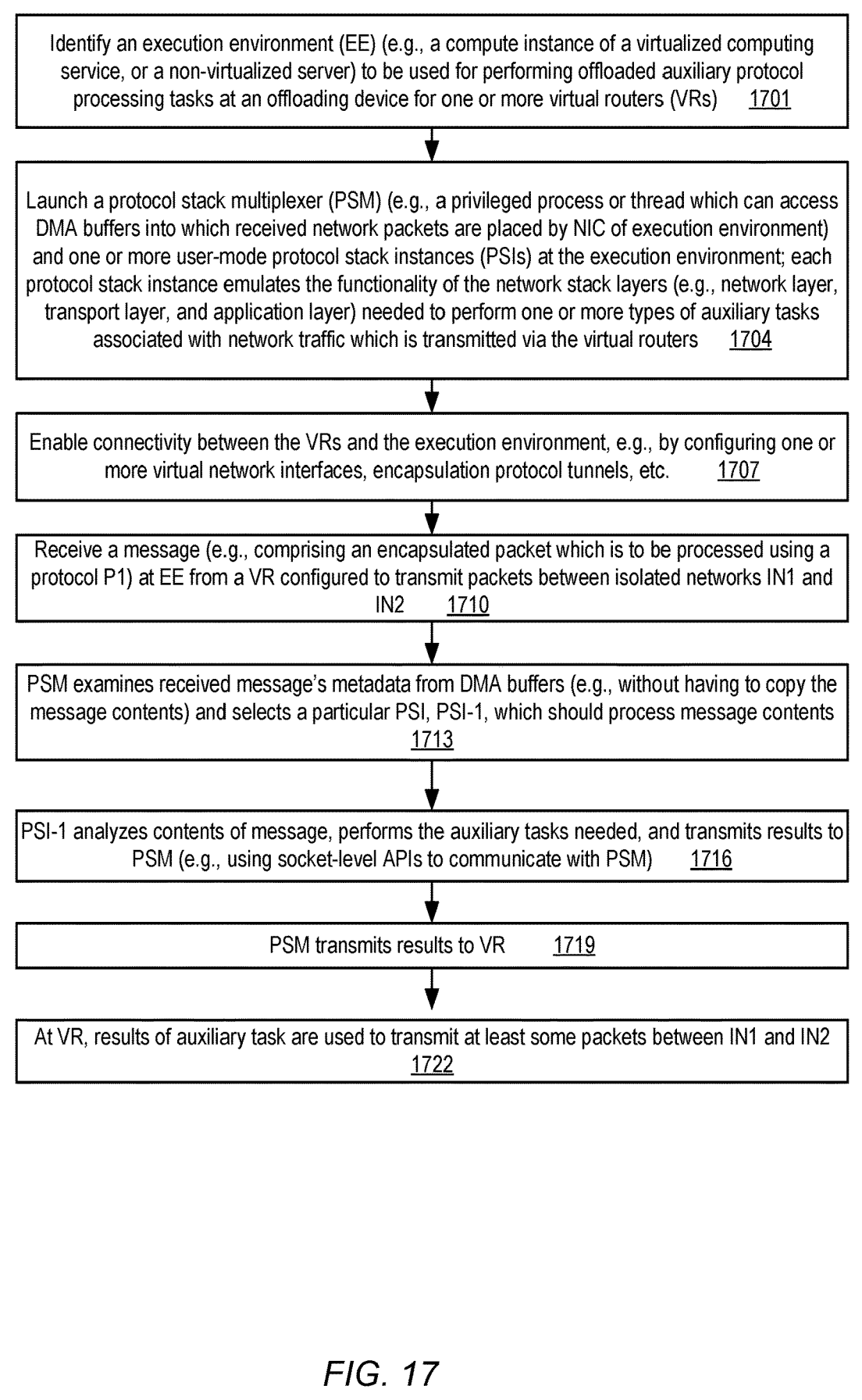

Identify an execution environment (EE) (e.g., a compute instance of a virtualized computing service, or a non-virtualized server) to be used for performing offloaded auxiliary protocol processing tasks at an offloading device for one or more virtual routers (VRs)    1701

Launch a protocol stack multiplexer (PSM) (e.g., a privileged process or thread which can access DMA buffers into which received network packets are placed by NIC of execution environment) and one or more user-mode protocol stack instances (PSIs) at the execution environment; each protocol stack instance emulates the functionality of the network stack layers (e.g., network layer, transport layer, and application layer) needed to perform one or more types of auxiliary tasks associated with network traffic which is transmitted via the virtual routers    1704

Enable connectivity between the VRs and the execution environment, e.g., by configuring one or more virtual network interfaces, encapsulation protocol tunnels, etc.    1707

Receive a message (e.g., comprising an encapsulated packet which is to be processed using a protocol P1) at EE from a VR configured to transmit packets between isolated networks IN1 and IN2    1710

PSM examines received message's metadata from DMA buffers (e.g., without having to copy the message contents) and selects a particular PSI, PSI-1, which should process message contents 1713

PSI-1 analyzes contents of message, performs the auxiliary tasks needed, and transmits results to PSM (e.g., using socket-level APIs to communicate with PSM)    1716

PSM transmits results to VR    1719

At VR, results of auxiliary task are used to transmit at least some packets between IN1 and IN2 1722

FIG. 17

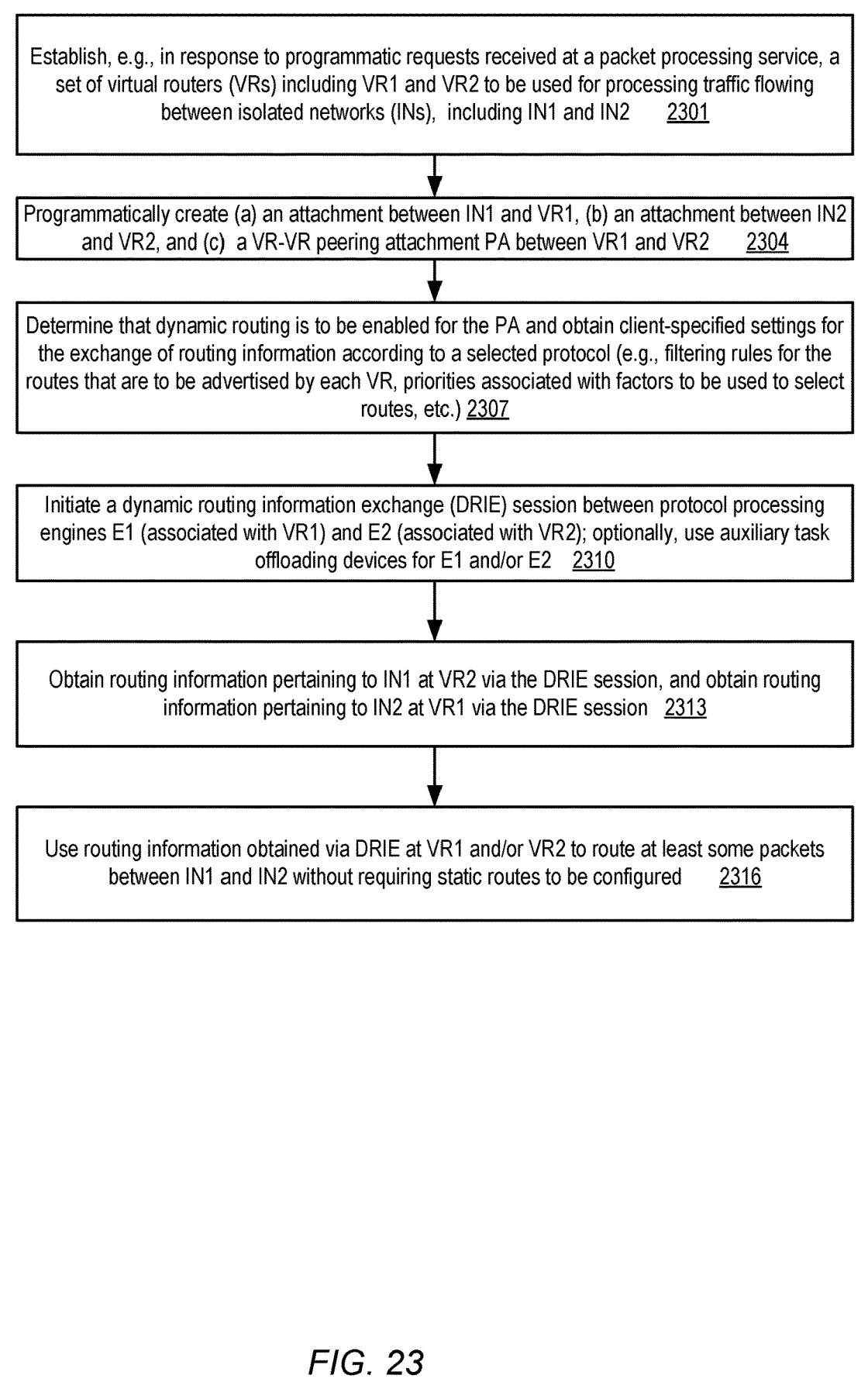

Establish, e.g., in response to programmatic requests received at a packet processing service, a set of virtual routers (VRs) including VR1 and VR2 to be used for processing traffic flowing between isolated networks (INs), including IN1 and IN2     2301

Programmatically create (a) an attachment between IN1 and VR1, (b) an attachment between IN2 and VR2, and (c) a VR-VR peering attachment PA between VR1 and VR2     2304

Determine that dynamic routing is to be enabled for the PA and obtain client-specified settings for the exchange of routing information according to a selected protocol (e.g., filtering rules for the routes that are to be advertised by each VR, priorities associated with factors to be used to select routes, etc.) 2307

Initiate a dynamic routing information exchange (DRIE) session between protocol processing engines E1 (associated with VR1) and E2 (associated with VR2); optionally, use auxiliary task offloading devices for E1 and/or E2     2310

Obtain routing information pertaining to IN1 at VR2 via the DRIE session, and obtain routing information pertaining to IN2 at VR1 via the DRIE session   2313

Use routing information obtained via DRIE at VR1 and/or VR2 to route at least some packets between IN1 and IN2 without requiring static routes to be configured     2316

*FIG. 23*

Web-based interface
2602

Web-based interface
2714

Virtual router (VR) 2825A

Premise P1, Region-A

Auditing engine 2871

VR 2825B

Premise P2, Region-B

Mandatory intermediary 2835 for inter-regional traffic (e.g., for regulatory reasons); may be implemented using offloading device(s)

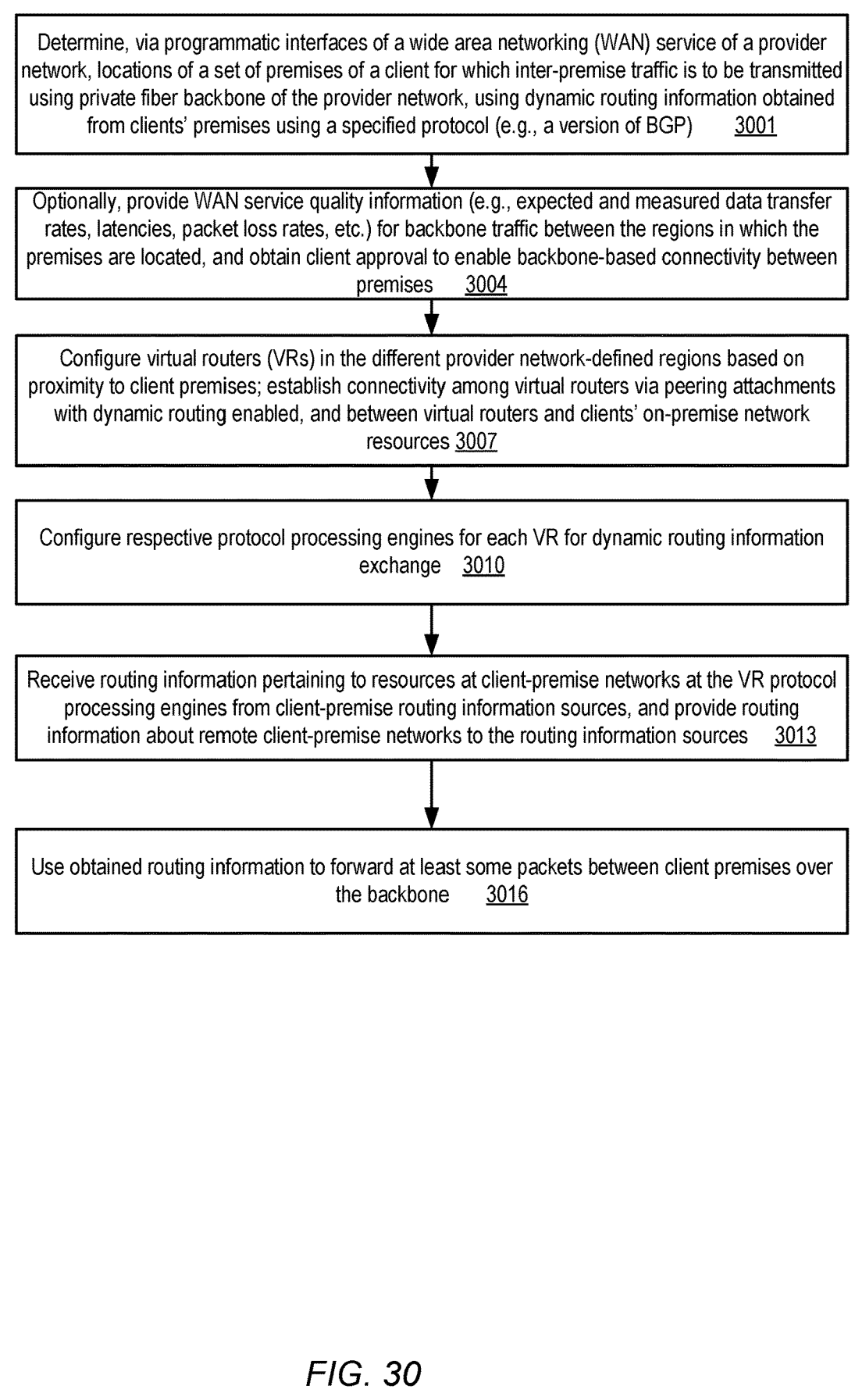

Determine, via programmatic interfaces of a wide area networking (WAN) service of a provider network, locations of a set of premises of a client for which inter-premise traffic is to be transmitted using private fiber backbone of the provider network, using dynamic routing information obtained from clients' premises using a specified protocol (e.g., a version of BGP) 3001

Optionally, provide WAN service quality information (e.g., expected and measured data transfer rates, latencies, packet loss rates, etc.) for backbone traffic between the regions in which the premises are located, and obtain client approval to enable backbone-based connectivity between premises 3004

Configure virtual routers (VRs) in the different provider network-defined regions based on proximity to client premises; establish connectivity among virtual routers via peering attachments with dynamic routing enabled, and between virtual routers and clients' on-premise network resources 3007

Configure respective protocol processing engines for each VR for dynamic routing information exchange 3010

Receive routing information pertaining to resources at client-premise networks at the VR protocol processing engines from client-premise routing information sources, and provide routing information about remote client-premise networks to the routing information sources 3013

Use obtained routing information to forward at least some packets between client premises over the backbone 3016

FIG. 30

WIDE AREA NETWORKING SERVICE USING PROVIDER NETWORK BACKBONE NETWORK

BACKGROUND

This application is a continuation of U.S. patent application Ser. No. 17/218,036, filed Mar. 30, 2021, which is hereby incorporated by reference herein in its entirety.

Many companies and other organizations operate computer networks that interconnect numerous computing systems to support their operations, such as with the computing systems being co-located (e.g., as part of a local network) or instead located in multiple distinct geographical locations (e.g., connected via one or more private or public intermediate networks). For example, data centers housing significant numbers of interconnected computing systems have become commonplace, such as private data centers that are operated by and on behalf of a single organization, and public data centers that are operated by entities as businesses to provide computing resources to customers. Some public data center operators provide network access, power, and secure installation facilities for hardware owned by various customers, while other public data center operators provide "full service" facilities that also include hardware resources made available for use by their customers.

The advent of virtualization technologies for commodity hardware has provided benefits with respect to managing large-scale computing resources for many customers with diverse needs, allowing various computing resources to be efficiently and securely shared by multiple customers. For example, virtualization technologies may allow a single physical virtualization host to be shared among multiple users by providing each user with one or more "guest" virtual machines hosted by the single virtualization host. Each such virtual machine may represent a software simulation acting as a distinct logical computing system that provides users with the illusion that they are the sole operators of a given hardware computing resource, while also providing application isolation and security among the various virtual machines. Instantiating several different virtual machines on the same host may also help increase the overall hardware utilization levels at a data center, leading to higher returns on investment.

As demand for virtualization-based services at provider networks has grown, more and more networking and inter-connectivity-related features may have to be added to meet the requirements of applications being implemented using the services. Many such features may require network packet address manipulation in one form or another, e.g., at level 3 or level 4 of the Open Systems Interconnection stack. Some clients of virtualized computing services may wish to employ customized policy-based packet processing for application traffic flowing between specific sets of endpoints. Using ad-hoc solutions for all the different types of packet transformation requirements may not scale in large provider networks at which the traffic associated with hundreds of thousands of virtual or physical machines may be processed concurrently.

BRIEF DESCRIPTION OF DRAWINGS

FIG. 3 illustrates an overview of example interactions between exception-path nodes of virtual routers, fast-path nodes of virtual routers, and auxiliary task offloading resources associated with virtual routers, according to at least some embodiments.

FIG. 10 is a flow diagram illustrating aspects of operations that may be performed to offload some types of tasks from virtual routers, according to at least some embodiments.

FIG. 12 illustrates an example set of protocols for which respective protocol stack instances may be run at a device with a protocol stack multiplexer, according to at least some embodiments.

FIG. 15 illustrates an example scenario in which multiple independent instances of a given protocol stack may be executed concurrently at an auxiliary task offloading device, according to at least some embodiments.

FIG. 16 illustrates examples of alternative approaches for saving protocol state information associated with auxiliary tasks of a virtual router, according to at least some embodiments.

FIG. 17 is a flow diagram illustrating aspects of operations that may be performed to offload some types of tasks from virtual routers using a protocol stack multiplexer and independent instances of protocol stacks, according to at least some embodiments.

FIG. 23 is a flow diagram illustrating aspects of operations that may be performed for enabling and utilizing dynamic routing for peered virtual routers, according to at least some embodiments.

FIG. 30 is a flow diagram illustrating aspects of operations that may be performed at a wide area networking service of a provider network which transmits traffic between client premises via a private fiber backbone, according to at least some embodiments.

Figure 1:
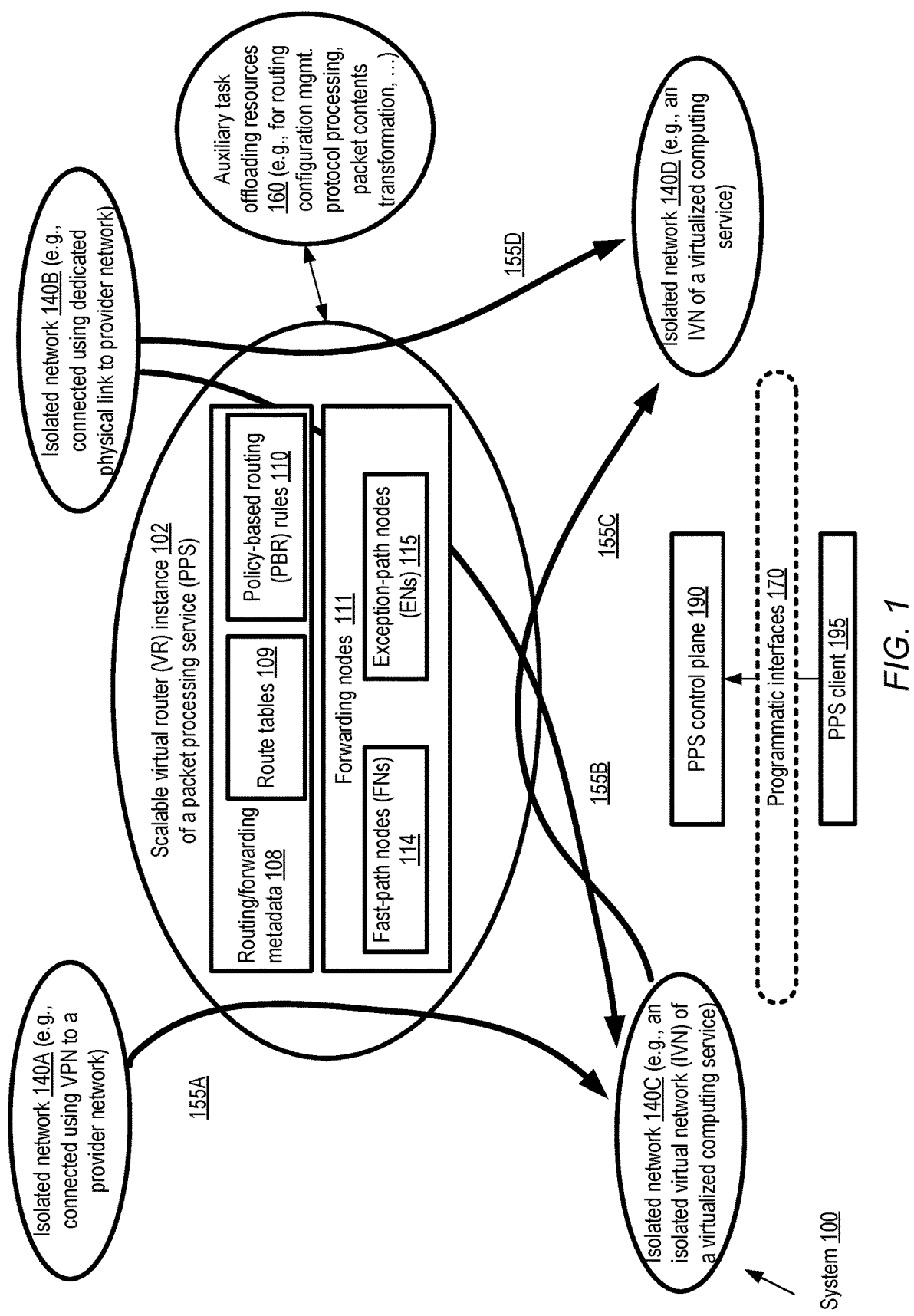
FIG. 1 illustrates an example system environment in which scalable virtual routers may be implemented for traffic flowing between isolated networks, according to at least some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to. When used in the claims, the term "or" is used as an inclusive or and not as an exclusive or. For example, the phrase "at least one of x, y, or z" means any one of x, y, and z, as well as any combination thereof.

DETAILED DESCRIPTION

The present disclosure relates to methods and apparatus for efficient implementation of several categories of auxiliary tasks (such as routing configuration information exchange tasks, encryption/decryption tasks, or custom client-requested tasks) associated with transmission of network packets containing application data between isolated networks via virtual routers implemented at a provider network or cloud computing environment. A given virtual router includes a collection of nodes of a multi-layer packet processing service, including fast-path nodes configured to quickly execute locally-cached routing or forwarding actions, and exception-path nodes which determine the actions to be taken for different packet flows based on client-specified policies and connectivity requirements for the isolated networks. In scenarios in which dynamic routing is implemented for the application data traffic between pairs of isolated networks using routing information exchange protocols (e.g., protocols similar to the Border Gateway Protocol (BGP)), the processing of messages containing the dynamic routing information can be offloaded from the virtual router nodes to protocol processing engines running at other devices, thereby enabling the virtual router nodes to remain dedicated to their primary tasks of rule-based packet forwarding. For similar reasons, other types of auxiliary tasks such as multicast configuration management via protocols similar to IGMP (Internet Group Management Protocol), encryption/decryption of packet contents, or custom packet analysis/processing tasks requested by clients can also be handed off to offloading devices from the virtual routers.

Offloading tasks may differ from the baseline or core forwarding-related tasks performed at the virtual routers in several important ways—e.g., at least some offloading tasks may typically have to be performed far less often than application data packet forwarding tasks, the amount of computation or other resources (e.g., memory or storage for saving state information) required for some offloading tasks may be much greater than the amount of the same resources needed for application data packet forwarding, and so on. Offloading of the auxiliary tasks may be beneficial not only for performance reasons (e.g., to avoid diversion of resources of the virtual routers, which may already be in high demand for application data forwarding), but also to enable virtual routers' forwarding-related components to be enhanced and developed independently of the auxiliary task processing components. In some cases, the auxiliary tasks may be performed using protocol stack instances (e.g., an instance of a BGP processing engine or an IGMP processing engine) run in user mode at an offloading device (such as a virtualization host of a computing service), with a protocol stack multiplexer distributing auxiliary tasks between the protocol stack instances at a given offloading device as needed.

Using the offloading techniques, several types of packet processing applications become more practicable and performant. Virtual routers implemented in different geographical regions (e.g., using resources located at data centers in different states, countries or continents) can be programmatically attached (or "peered") to one another and configured to obtain and automatically exchange dynamic routing information pertaining to isolated networks in the different regions using protocols similar to BGP, eliminating the need for clients to painstakingly configure static routes for traffic flowing between the isolated networks. Clients can specify various parameters and settings (such as the specific protocol versions to be used, rules for filtering routing information to be advertised to or from a virtual router, etc.) to control the manner in which routing information is transferred between the virtual routers. A wide-area networking (WAN) service can be implemented at the provider network using programmatically attached virtual routers with dynamic routing enabled, allowing clients to utilize the provider network's private fiber backbone links (already being used for traffic between data centers of the provider network on behalf of users of various other services) for traffic between client premises distributed around the world, and manage their long-distance traffic using easy-to-use tools with visualization interfaces. Note that while dynamic routing for such a WAN service or for peered virtual router pairs in general may benefit from the use of offloading resources, such offloading may not necessarily be required for all virtual routers used in such scenarios in at least some embodiments.

As one skilled in the art will appreciate in light of this disclosure, certain embodiments may be capable of achieving various advantages, including some or all of the following: (a) enabling processing associated with a variety of configuration management protocols used for certain types of packet processing applications, such as BGP, IGMP and the like, to be performed efficiently using dedicated resources, without consuming computation resources set aside primarily for high-speed packet forwarding/routing actions (b) scaling the set of resources dedicated for high-speed packet forwarding/routing independently of the resources used for auxiliary tasks such as routing table configuration management, cryptographic transformations of packet contents, performance latency measurements and the like, thereby ensuring high performance for forwarding/routing actions as well as auxiliary tasks, (c) reducing the number of networking configuration problem resolutions needed at organizations whose computing resources are geographically dispersed, e.g., by eliminating the need for error-prone specification of static routes between networks in different geographic regions and by eliminating the need for managing traffic over leased fiber lines, and/or (e) enhancing the user experience of system administrators and/or application owners of applications run in geographically distributed environments by providing configuration information and metrics separately on intra-region and inter-region levels. Because of the multi-tenant nature of the packet processing service used for virtual routers, the overall amount of computing and other resources needed to route traffic between various isolated networks may also be reduced in at least some embodiments.

According to some embodiments, a system may comprise one or more computing devices. The computing devices may include instructions that upon execution on or across the computing devices cause the computing devices to determine, based at least in part on input received via one or more programmatic interfaces from a client of a provider network, a category of auxiliary tasks associated with transmission of at least a subset of network packets between various isolated networks. Depending on the specifics of the packet processing application instance which the client wishes to implement using a packet processing service of the provider network, any combination of numerous categories of auxiliary tasks may be needed in different embodiments. The set of auxiliary task categories may, for example, include routing configuration management categories (e.g., tasks associated with processing BGP messages, messages of a custom routing information exchange protocol of the provider network, IGMP messages, messages of a custom multicast configuration protocol of the provider network, etc.), (b) packet content transformation categories (e.g., encryption/decryption of packet contents according to a protocol such as IPSec or custom security protocols of the provider network) (c) performance management categories (e.g., measurement of packet latencies or packet loss rates between geographically distant resources), (d) custom processing tasks specified by clients (e.g., computations performed specifically on packets to which client-define tags have been assigned), and so on. A given isolated network for whose traffic the auxiliary tasks are to be performed may, for example, comprise an isolated virtual network (also known as a virtual private cloud or VPC, or a virtual network) which includes some number of compute instances of a virtualized computing service (VPC) of the provider network, or a network set up at a client-owned premise external to the provider network in various embodiments. Resources at such a client-owned premise may be linked to the provider network data centers in any of several ways in different embodiments, e.g., using one or more VPN (virtual private network) tunnels, using dedicated private physical network links (referred to sometimes as direct connect links) and the like.

A virtual router may be configured to transmit network packets between a first isolated network and a second isolated network indicated by the client in various embodiments. The virtual router may, for example, be programmatically attached to at least one of the isolated networks in response to a request from a client of the provider network; such an attachment request may indicate that traffic of the isolated network is to be processed at the virtual router.

A given virtual router may comprise a plurality of packet processing nodes including a fast-path node and an exception-path node in some embodiments. A fast-path node may be configured to (a) obtain executable versions of one or more routing actions for a given flow of packets between pairs of isolated networks from an exception-path node, (b) cache the executable versions, and (c) implement the routing actions on packets of the flow using the executable versions. The term "exception" may be used to refer to the nodes at which executable versions of the routing actions are generated because on average, a given executable action may be run many times (e.g., for each packet of a flow comprising thousands of packets), so the activity of generating the action may be considered an exceptional or infrequent activity. A virtual router (VR) may also be referred to as a virtual traffic hub (VTH) or a transit gateway (TGW) in various embodiments. In at least some embodiments, individual nodes of a VR may comprise one or more threads of execution at a compute instance (e.g., a virtual machine) of a virtualized computing service of the provider network, or one or more threads of execution at a non-virtualized server. Fast-path nodes and exception-path nodes may collectively be referred to as forwarding plane nodes (or routing plane nodes) in some embodiments, as one of their primary function may comprise forwarding packets containing client application data as rapidly as feasible between resources at different isolated networks.

In addition to the VR itself, in at least some embodiments one or more auxiliary task offloading resources (ATORs) (also referred to as auxiliary task offloaders (ATOs)) may be configured on behalf of the client to perform auxiliary tasks of the categories identified for the client's packet processing application, e.g., by administrative or control plane components of the packet processing service in various embodiments. A communication pathway may be established between the ATOR and one or more packet processing or forwarding plane nodes of the VR, e.g., using metadata provided to the exception-path nodes of the VR. In some embodiments, establishing such connectivity may comprise setting up a virtual network interface to which packets can be directed from the VR forwarding plane nodes, and configuring one or more tunnels of an encapsulation protocol between the virtual network interface and the ATOR. An ATOR may, for example, comprise one or more threads of execution of a compute instance or a non-virtualized host in different embodiments.

After an ATOR has been established and connected to a VR, messages or packets indicating the auxiliary tasks may be transmitted to the ATOR from the VR in various embodiments. When a particular packet is received at the ATOR, an auxiliary task corresponding to the packet (such as updating routing information based on the packet contents) may be performed, and a result of the auxiliary task (such as an updated route) may be transmitted back to the VR. At the VR, the result of the auxiliary task may be used to transmit one or more packets between the isolated networks for whose traffic the VR was assigned. For example, in one scenario the auxiliary task may lead to an insertion or removal of one or more routes in a route table used to select a next hop to transmit a packet. In another example, the result of the auxiliary task (e.g., an encrypted version of a packet's application data payload) may itself be transmitted in a packet.

In contrast to the forwarding plane actions of a VR, which may be performed at high rates for the vast majority of traffic received at the VR, at least some categories of the auxiliary tasks may be performed (e.g., using ATORs) less frequently, and may be performed asynchronously with respect to the forwarding of application data packets. For example, routing information messages may be received and/or sent relatively infrequently during at least some portions of BGP sessions, and the processing of a given BGP message may not be part of the critical path for forwarding application data packets (even though a result of processing the BGP message may lead to a change in the next hop to which some application packets are transmitted). Thus, the timing at which forwarding plane components of the VR receive results of some categories of auxiliary task processing may be independent and asynchronous with respect to the individual application packet transfers performed by the forwarding plane components in some embodiments. For example, a given fast-path node may not have to wait for a BGP message processing task to be completed before forwarding a given packet to its destination. For other types of auxiliary tasks, the forwarding of a given application data packet by a fast-path node may be dependent on the completion of an auxiliary task—e.g., if contents of a to-be-forwarded application data packet are to be encrypted as part of an auxiliary task, or if a log record is to be generated and stored as part of an auxiliary task before a packet with a particular client-specified tag or label is transmitted from the VR, a fast-path node may have to wait for the auxiliary task to be completed.

In some embodiments, multiple types of auxiliary tasks may be performed for packets of a given flow of application data: for example, results of BGP message processing may be used to determine the next hops for packets of the flow, and encryption/decryption tasks may also be performed for packets of the flow. One flow may be distinguished from another by some combination of properties including source and destination IP (Internet Protocol) addresses, source and destination ports, source and destination virtual network interface identifiers, source and destination isolated network identifiers, and the like. In one such embodiment, a given ATOR may be used to implement several different categories of auxiliary tasks. In other embodiments, one category of auxiliary task may be performed using a first ATOR, and another category of auxiliary task may be performed using a second ATOR.

In one embodiment, an ATOR may comprise a hardware card attached to a server, e.g., via a peripheral interconnect such as USB (Universal Serial Bus) or PCIe (Peripheral Component Interconnect—Express). In such an embodiment, at least some categories of auxiliary tasks may be performed entirely on the hardware card (e.g., using a processor and memory incorporated within the card). In some embodiments, instead of being implemented using resources external to a VR, an ATOR may be implemented using resources (e.g., an auxiliary processing node, logically distinct from the fast-path and exception-path nodes) which are configured and managed as part of a VR by the control plane of the packet processing service.

According to some embodiments, a system may comprise one or more computing devices. The computing devices may include instructions that upon execution on or across the computing devices cause the computing devices to receive, at an offloading device (e.g., a virtualization host) from a virtual router configured to transmit network packets between a first isolated network and a second isolated network, a message indicative of at least a portion of a first auxiliary task associated with transmission of the network packets. A stack multiplexer (e.g., one or more processes or threads running at a compute instance and/or a virtualization manager) of the offloading device may select a particular protocol stack instance, from a set of protocol stack instances running at the offloading device, to process at least a portion of the message. A given protocol stack instance may include software implementing one or more layers of a stack of networking protocols, e.g., layers defined in the OSI (Open Systems Interconnection) model, within user mode or user space in at least some embodiments. The stack multiplexor may have access to direct memory access (DMA) buffers of the offloading device, within which the message may be placed by a network interface card at which the message is obtained from the virtual router. The particular protocol stack instance may be selected based at least in part on metadata contained in or associated with the message, such as the protocol used for an underlying packet encapsulated within the message, identification information of the isolated virtual networks for which the virtual router is configured, or an identifier of a client on whose behalf the traffic is being transmitted by the virtual router. At least some of the protocol stack instances may run in user space in various embodiments. The selected protocol stack instance (which may, for example, comprise a BGP processing engine, an IGMP processing engine, as well as logic for lower-layer protocols utilized by BGP or IGMP) may analyze the message and perform the required auxiliary task. A result of the auxiliary task may then be sent via the multiplexer to the virtual router, where it may be utilized to transmit at least some packets between the first and second isolated networks. According to at least some embodiments, a given protocol stack instance may be configured for use in single-tenant mode (on behalf of no more than one client, or for no more than one virtual router) or in multi-tenant mode, e.g., for auxiliary tasks performed on behalf of several clients or several virtual routers. The tenancy mode may be selected based at least in part on programmatic input from clients on whose behalf the virtual routers are configured in some embodiments.

According to some embodiments, a system may comprise one or more computing devices. The computing devices may include instructions that upon execution on or across the computing devices cause the computing devices to create a plurality of virtual routers using resources of a provider network, including a first virtual router and a second virtual router. The transfer of routing information between the first virtual router and the second virtual router in accordance with a group of dynamic routing protocol control settings indicated by a client of the provider network via one or more programmatic interfaces may be enabled. At least a portion of the routing information may be associated with a plurality of isolated networks including a first isolated network programmatically attached to the first virtual router and a second isolated network programmatically attached to the second virtual router. A particular setting of the group of dynamic routing protocol control settings may, for example, include a filter rule to be used to determine whether a route to a particular destination is to be transferred, respective priorities to be associated with various BGP attributes of groups of network addresses, and so on. Respective protocol processing engines for the dynamic routing protocol may be established for each of the virtual routers, e.g., using offloading resources of the kind discussed above in some embodiments. Based on client-specified preferences, any of several variants of BGP (such as internal BGP, external BGP, or multi-protocol BGP) may be used for the dynamic routing in some embodiments. In one embodiment, clients may specify configuration settings using BGP attributes, but the routing information may actually be transferred between the virtual routers' protocol processing engines using a custom protocol of the provider network.

In some cases, virtual routers with dynamic routing enabled may be utilized to transfer data among geographically distributed premises of provider network clients using private fiber backbone links of the provider network. According to some embodiments, a system may comprise one or more computing devices. The computing devices may include instructions that upon execution on or across the computing devices cause the computing devices to obtain, via one or more programmatic interfaces of a wide area networking service of the provider network, an indication of (a) a plurality of client premises between which network traffic is to be routed via a private fiber backbone of the provider network, including a first premise in a first geographical region and a second premise in a second geographical region and (b) a particular protocol to be used to obtain dynamic routing information pertaining to at least the first and second client premises. A first virtual router may be configured for the client using at least a first set of resources of a virtualized computing service at a first provider network data center which meets a proximity criterion with respect to the first premise. Similarly, a second virtual router may be configured using at least a second set of resources at a second provider network data center which meets the proximity criterion with respect to the second premise. Connectivity may be enabled between (a) the first and second virtual routers, (b) the first virtual router and a first premise and (c) the second virtual router and the second premise in various embodiments. Contents of at least one network packet originating at the first premise may be transferred, using a set of routing information, via the private fiber backbone to the second premise. At least a portion of the set of routing information may be obtained from the second dynamic routing information source by a protocol processing engine associated with the second virtual router. The protocol processing engine may be configured to process messages of the particular protocol indicated by the client.

As mentioned above, virtual routers and/or associated auxiliary task offloaders of the kind described above may be implemented using resources of a provider network in at least some embodiments. A cloud provider network (sometimes referred to simply as a "cloud") refers to a pool of network-accessible computing resources (such as compute, storage, and networking resources, applications, and services), which may be virtualized or bare-metal. The cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet or a cellular communication network) and the hardware and software in cloud provider data centers that provide those services.

A cloud provider network can be formed as a number of regions, where a region is a separate geographical area in which the cloud provider clusters data centers. Such a region may also be referred to as a provider network-defined region, as its boundaries may not necessarily coincide with those of countries, states, etc. Each region can include two or more availability zones connected to one another via a private high speed network, for example a fiber communication connection. An availability zone (also known as an availability domain, or simply a "zone") refers to an isolated failure domain including one or more data center facilities with separate power, separate networking, and separate cooling from those in another availability zone. A data center refers to a physical building or enclosure that houses and provides power and cooling to servers of the cloud provider network. Preferably, availability zones within a region are positioned far enough away from one other that the same natural disaster should not take more than one availability zone offline at the same time. Customers can connect to availability zones of the cloud provider network via a publicly accessible network (e.g., the Internet, a cellular communication network) by way of a transit center (TC). TCs can be considered as the primary backbone locations linking customers to the cloud provider network, and may be collocated at other network provider facilities (e.g., Internet service providers, telecommunications providers) and securely connected (e.g. via a VPN or direct connection) to the availability zones. Each region can operate two or more TCs for redundancy. Regions are connected to a global network connecting each region to at least one other region. The cloud provider network may deliver content from points of presence outside of, but networked with, these regions by way of edge locations and regional edge cache servers (points of presence, or PoPs). This compartmentalization and geographic distribution of computing hardware enables the cloud provider network to provide low-latency resource access to customers on a global scale with a high degree of fault tolerance and stability.

The cloud provider network may implement various computing resources or services, which may include a virtual compute service, data processing service(s) (e.g., map reduce, data flow, and/or other large scale data processing techniques), data storage services (e.g., object storage services, block-based storage services, or data warehouse storage services) and/or any other type of network based services (which may include various other types of storage, processing, analysis, communication, event handling, visualization, and security services not illustrated). The resources required to support the operations of such services (e.g., compute and storage resources) may be provisioned in an account associated with the cloud provider, in contrast to resources requested by users of the cloud provider network, which may be provisioned in user accounts.

Various network-accessible services may be implemented at one or more data centers of the provider network in different embodiments. Network-accessible computing services can include an elastic compute cloud service (referred to in various implementations as an elastic compute service, a virtual machines service, a computing cloud service, a compute engine, or a cloud compute service). This service may offer virtual compute instances (also referred to as virtual machines, or simply "instances") with varying computational and/or memory resources, which are managed by a compute virtualization service (referred to in various implementations as an elastic compute service, a virtual machines service, a computing cloud service, a compute engine, or a cloud compute service). In one embodiment, each of the virtual compute instances may correspond to one of several instance types or families. An instance type may be characterized by its hardware type, computational resources (e.g., number, type, and configuration of central processing units [CPUs] or CPU cores), memory resources (e.g., capacity, type, and configuration of local memory), storage resources (e.g., capacity, type, and configuration of locally accessible storage), network resources (e.g., characteristics of its network interface and/or network capabilities), and/or other suitable descriptive characteristics (such as being a "burstable" instance type that has a baseline performance guarantee and the ability to periodically burst above that baseline, or a non-burstable or dedicated instance type that is allotted and guaranteed a fixed quantity of resources). Each instance type can have a specific ratio of processing, local storage, memory, and networking resources, and different instance families may have differing types of these resources as well. Multiple sizes of these resource configurations can be available within a given instance type. Using instance type selection functionality, an instance type may be selected for a customer, e.g., based (at least in part) on input from the customer. For example, a customer may choose an instance type from a predefined set of instance types. As another example, a customer may specify the desired resources of an instance type and/or requirements of a workload that the instance will run, and the instance type selection functionality may select an instance type based on such a specification. A suitable host for the requested instance type can be selected based at least partly on factors such as collected network performance metrics, resource utilization levels at different available hosts, and so on.

The computing services of a provider network can also include a container orchestration and management service (referred to in various implementations as a container ser-vice, cloud container service, container engine, or container cloud service). A container represents a logical packaging of a software application that abstracts the application from the computing environment in which the application is executed. For example, a containerized version of a software application includes the software code and any dependencies used by the code such that the application can be executed consistently on any infrastructure hosting a suitable container engine (e.g., the Docker® or Kubernetes® container engine). Compared to virtual machines (VMs), which emulate an entire computer system, containers virtualize at the operating system level and thus typically represent a more lightweight package for running an application on a host computing system. Existing software applications can be "containerized" by packaging the software application in an appropriate manner and generating other artifacts (e.g., a container image, container file, or other configurations) used to enable the application to run in a container engine. A container engine can run on a virtual machine instance in some implementations, with the virtual machine instance selected based at least partly on the described network performance metrics. Other types of network-accessible services, such as packet processing services, database services, wide area networking (WAN) services and the like may also be implemented at the cloud provider network in some embodiments.

The traffic and operations of the cloud provider network may broadly be subdivided into two categories in various embodiments: control plane operations carried over a logical control plane and data plane operations carried over a logical data plane. While the data plane represents the movement of user data through the distributed computing system, the control plane represents the movement of control signals through the distributed computing system. The control plane generally includes one or more control plane components distributed across and implemented by one or more control servers. Control plane traffic generally includes administrative operations, such as system configuration and management (e.g., resource placement, hardware capacity management, diagnostic monitoring, system state information). The data plane includes customer resources that are implemented on the cloud provider network (e.g., computing instances, containers, block storage volumes, databases, file storage). Data plane traffic generally includes non-administrative operations such as transferring customer data to and from the customer resources. Certain control plane components (e.g., tier one control plane components such as the control plane for a virtualized computing service) are typically implemented on a separate set of servers from the data plane servers, while other control plane components (e.g., tier two control plane components such as analytics services) may share the virtualized servers with the data plane, and control plane traffic and data plane traffic may be sent over separate/distinct networks.

Example System Environment with Offloading Resources for Virtual Routers

FIG. 1 illustrates an example system environment in which scalable virtual routers may be implemented for traffic flowing between isolated networks, according to at least some embodiments. As shown, system 100 comprises an instance 102 of a scalable virtual router (VR), set up using the resources of a multi-layer packet processing service (PPS) in the depicted embodiment. VR instance 102 may be used to enable connectivity among a plurality of isolated networks 140A-140D. The PPS may, for example, include an administrative or control plane 190, as well as a data plane comprising fast-path nodes (FNs) 114 and exception-path nodes (ENs) 115 in the depicted embodiment. FNs and ENs may collectively be referred to as forwarding nodes 111 or forwarding plane nodes in some embodiments. The control plane may be responsible for configuring VR instances and associated routing/forwarding metadata 108 in the depicted embodiment, while the data plane resources may be used to generate and implement actions to route packets originating at (and directed to) the isolated networks 140. Multiple VR instances may be set up in various embodiments at the request of clients of the provider network. In some cases, a single client may have several VR instances configured, e.g., for processing traffic between distinct sets of isolated networks. Some VRs may be configured in single-tenant mode (e.g., to handle application data of a single client) while others may be configured in multi-tenant mode (to handle application data of several different clients) in some embodiments. In at least one embodiment, the tenancy mode to be used for a given virtual router may be indicated by the client on whose behalf the VR is configured.

Connectivity among a number of different types of isolated networks 140 may be provided using a VR instance 102 in the depicted embodiment, e.g., in response to programmatic requests submitted via interfaces 170 to the PPS control plane 190 from a PPS client 195. For example, isolated network 140A may comprise a set of resources at a data center or premise external to the provider network's own data centers, which may be linked to the provider network using VPN (virtual private network) tunnels or connections that utilize portions of the public Internet in the depicted embodiment. Isolated network 140B may also comprise resources at premises outside the provider network, connected to the provide network via dedicated physical links (which may be referred to as "direct connect" links) in the depicted embodiment. Isolated network 140C and 140D may comprise respective isolated virtual networks (IVNs) set up using resources located at the provider network's data centers in the depicted example scenario. An isolated virtual network may comprise a collection of networked resources (including, for example, compute instances such as virtual machines) allocated to a given client of the provider network, which are logically isolated from (and by default, inaccessible from) resources allocated for other clients in other isolated virtual networks. The client on whose behalf an IVN is established may be granted substantial flexibility regarding network configuration for the resources of the IVN—e.g., private IP addresses for virtual machines may be selected by the client without having to consider the possibility that other resources within other IVNs may have been assigned the same IP addresses, subnets of the client's choice may be established within the IVN, security rules may be set up by the client for incoming and outgoing traffic with respect to the IVN, and so on. Similar flexibility may also apply to configuration settings at VPN-connected isolated networks such as 140A, and/or at isolated networks 140B connected via dedicated links to the provider network in the depicted embodiment.

Depending on the requirements of the client on whose behalf a VR instance 102 is configured, one or more types of auxiliary tasks may be performed for traffic between various pairs (or all) of the isolated networks 140, in addition to the baseline or primary tasks of forwarding/routing the packets. For example, if a client indicates that dynamic routing using BGP or a similar protocol is to be implemented for packets flowing between a given pair of isolated networks 140, BGP messages may have to be processed, with the results of the BGP processing being inserted onto one or more route tables 109. Similarly, processing of IGMP messages may be required for multicast applications, IPSec (Internet Protocol Security) or other security-related processing may be required for some packet flows, and so on. In order to facilitate such auxiliary tasks without adding to the primary workload of the forwarding nodes 111, a set of offloading resources 160 may be configured for the VR instance 102 in the depicted embodiment, e.g., by the PPS control plane 190. The particular category (or categories) of auxiliary tasks needed for traffic between a given pair of isolated networks (or for a given packet flow) may be determined based on input provided by a PPS client 195 in various embodiments. Example auxiliary task categories may include, among others, routing configuration management, packet content transformation (e.g., using cryptographic protocols), performance monitoring, availability monitoring, and the like in different embodiments. After one or more auxiliary task offloading resources 160 for the required categories of tasks have been provisioned, connectivity may be established between at least some of the forwarding nodes 111 and the auxiliary task offloading resources in various embodiments. In at least some embodiments, some of the packets received at the VR instance 102 may trigger a request to the offloading resources—e.g., if a BGP message is received at the VR, the BGP message may be transmitted to a BGP processing offloading resource. The required task may be performed at the offloading resource 160, and a result (if any result that is to be consumed by the forwarding nodes) may be transmitted to the forwarding nodes 111 in various embodiments. Such results may then be used to forward at least some packets from one isolated network 140 to another in various embodiments—e.g., a preferred next hop for packets of a packet flow, determined as a result of a BGP offloading task, may be used to route a packet of the flow.

In at least some embodiments, a PPS client 195 may provide at least a portion of the routing/forwarding metadata 108 of the VTH instance which is used for generating the actions that are eventually used to forward network packets among the isolated networks 140, e.g., using the programmatic interfaces 170 of the PPS control plane 190. In the depicted embodiment, the routing/forwarding metadata 108 may include entries of a plurality of route tables 109 and/or policy-based routing rules 110 indicated by a client. A given isolated network 140 may be programmatically associated with a particular route table 109, e.g., using a first type of programmatic interface (an interface used for the "associate" verb or operation) in the depicted embodiment; such an associated route table 109 may be used for directing at least a subset of outbound packets from the isolated network. In another type of programmatic action, route table entries whose destinations are within a given isolated network 140 may be programmatically propagated/installed (e.g., using a different interface for propagation or installation of entries into particular tables) into one or more route tables, enabling traffic from other sources to be received at the isolated network. In at least some embodiments, entries with destinations within a particular isolated network such as 140C may be propagated to one or more route tables 109 that are associated with other isolated networks such as 140A or 140B, enabling, for example, traffic to flow along paths 155A and 155B from those other isolated networks to 140C. Similarly, one or more entries with destinations within isolated network 140D may be propagated to a route table associated with isolated network 140C, enabling traffic to flow from isolated network 140C to isolated network 140D along path 155C. For traffic transferred via path 155D, entries with destinations within isolated network 140D may be propagated to a route table associated with isolated network 140B in the depicted embodiment. In general, any desired combination of unidirectional or bi-directional traffic between a given pair of isolated networks that is programmatically attached to VR instance 102 may be enabled by using the appropriate combination of route table associations and route table entry propagations in various embodiments. A wide variety of network flow configurations may thereby be supported in different embodiments, as discussed below in further detail.

After the routing metadata 108 and auxiliary task offloading resources 160 have been set up, network packets containing application data may be accepted at the FNs 114 (e.g., comprising one or more action implementation nodes or AINs) of the VR instance from various resources within the different isolated networks 140 in the depicted embodiment. When a packet is received at an AIN, that AIN may attempt to find (e.g., using a key based on various properties of the packet's flow, including for example the combination of source and destination IP addresses and ports) a matching action in its action cache in various embodiments. If an action is not found in the cache, an EN 115 (e.g., comprising a decision node (DN) of the VR instance) may be consulted by the AIN. A DN may look for a previously-generated action appropriate for the received packet in its own cache in some embodiments. If a pre-generated action is found, it may be provided to the MN for caching and implementation. If no such action is found by the DN, a new action may be generated, e.g., using one of the route tables 109 which is associated with the source isolated network from which the packet was received in the depicted embodiment. An executable version of the action (e.g., in byte code expressed using instructions of a register-based virtual machine optimized for implementing network processing operations) may be generated, optionally cached at the decisions layer, and provided to the AIN, where it may be implemented for the current packet (and cached and re-used for subsequent packets of the same flow) in various embodiments.

In various embodiments, a given flow for which an action is generated may be characterized (or distinguished from other flows) based on one or all of the following attributes or elements of packets received at the packet processing service (PPS): the network protocol used for sending the packet to the PPS, the source network address, the source port, the destination network address, the destination port, and/or an application identifier (e.g., an identifier of a specific virtual network interface set up for communications between an isolated network and the PPS). In some embodiments the direction in which the packets are transmitted (e.g., towards the PPS, or away from the PPS) may also be included as an identifying element for the flow. Packets formatted according to a number of different networking protocols may be processed and/or transferred among isolated networks 140 by the forwarding nodes 111 of a VR instance 102 in different embodiments—e.g., including the Internet Protocol (IP), the Transmission Control Protocol (TCP), the User Datagram Protocol (UDP), the Internet Control Message Protocol (ICMP), protocols that do not belong to or rely on the TCP/IP suite of protocols, and the like. Messages formatted according to a variety of additional protocols, such as BGP, IGMP, IPSec, TWAMP (Two-Way Active Measurement Protocol) and the like may be processed at least in part at auxiliary task offloading resources 160 in the depicted embodiment.

Example Packet Processing Applications and Auxiliary Tasks

Figure 2:
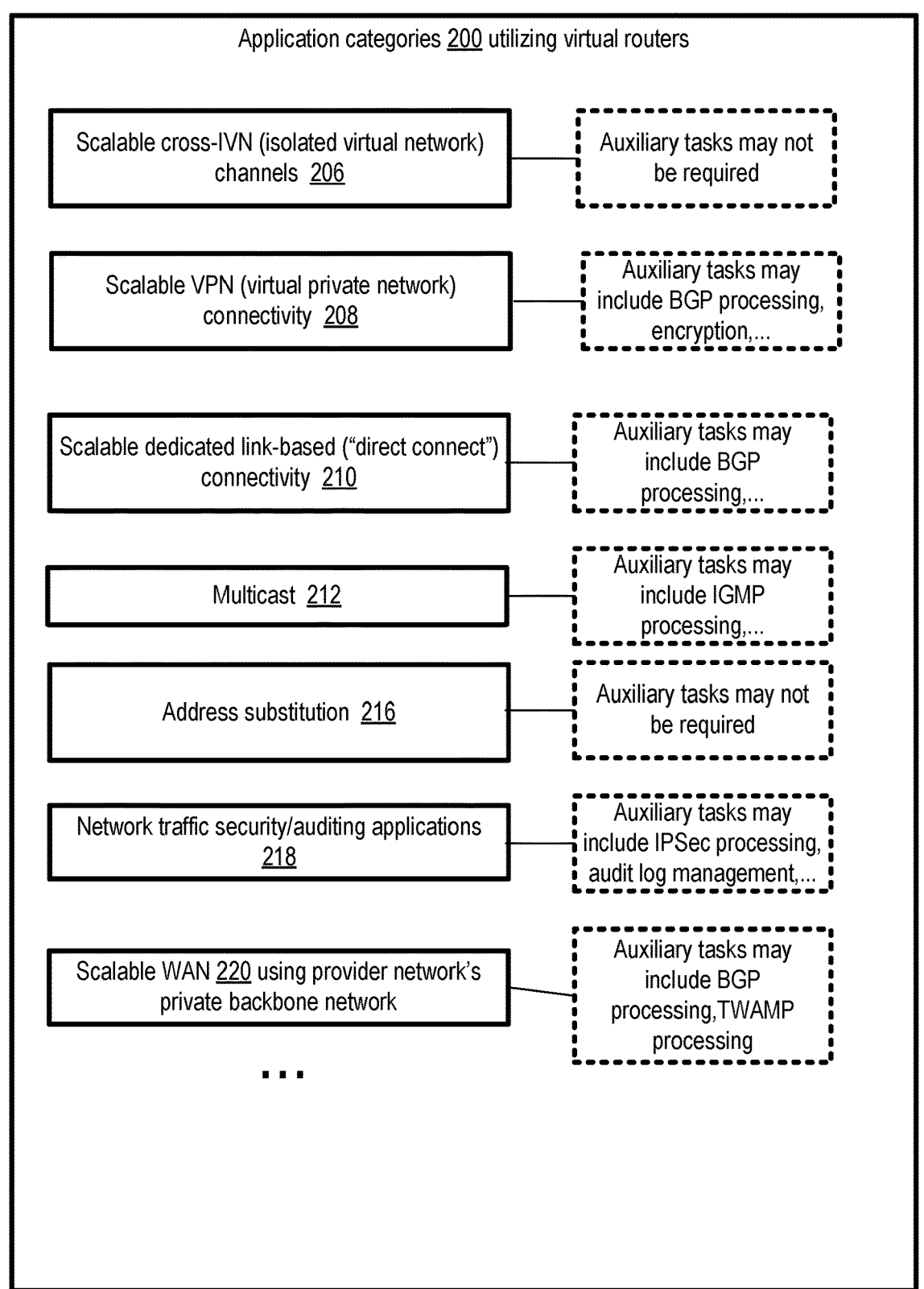
FIG. 2 illustrates example categories of packet processing applications implemented with the help of virtual routers, and auxiliary tasks which may be performed for some of the categories, according to at least some embodiments.

FIG. 2 illustrates example categories of packet processing applications implemented with the help of virtual routers, and auxiliary tasks which may be performed for some of the categories, according to at least some embodiments. As shown, application categories 200 in the depicted embodiment may include, for example, scalable cross-IVN (isolated virtual network) channels 206, scalable VPN (virtual private network) connectivity 208, scalable dedicated-link connectivity 210, multicast 212, address substitution 216, network traffic security/auditing applications 218, scalable WAN (wide area networking) using the provider network's private backbone network and the like. Other types of packet processing applications may be supported in various embodiments. In general, a virtual router similar to the virtual router instance 102 of FIG. 1 may be configured to implement (e.g., with the help of auxiliary task offloading resources) any desired type of packet processing or transformations (or combinations of different types of packet processing or transformations), with virtual router nodes and/or auxiliary resources being assignable dynamically as needed to support a large range of traffic rates in a transparent and scalable manner.

In some embodiments, as described earlier, a virtual router (VR) may be implemented at a provider network in which isolated virtual networks can be established. In such embodiments, the VR may act as intermediary or channel between the private address spaces of two or more different IVNs, in effect setting up scalable and scalable cross-WN channels 206. In at least some embodiments, auxiliary tasks may not be needed for cross-IVN channels. For scalable VPN connectivity 208, auxiliary tasks such as BGP processing, encryption and the like may be needed in the depicted embodiment, and such auxiliary tasks may be implemented using offloading resources associated with a VR. Scalable VPN connectivity may, for example, be established between one or more client-owned premised external to the provider network, and such premises may include routers or other appliances with BGP processing engines. BGP sessions may be set up between such external processing engines and BGP processing engines set up at auxiliary task offloading resources of the kind introduced above in some embodiments.

In some embodiments, a provider network may support scalable connectivity 210 with external networks via dedicated physical links called "direct connect" links, and the traffic between such external networks (and between such external networks and IVNs or VPN-connected external networks) may be managed using virtual routers. Auxiliary tasks for such scenarios may also include BGP processing in at least some embodiments, e.g., including the processing of BGP session messages exchanged between a BGP processing engine at the external premise and a BGP processing engine at an offloading resource.

Multicast 212 is a networking technique, implementable using a VR in some embodiments, in which contents (e.g., the body) of a single packet sent from a source are replicated to multiple destinations of a specified multicast group. Membership information of the multicast group may be obtained and/or verified periodically via IGMP messages in some embodiments; as such, auxiliary tasks comprising IGMP message processing may be performed using offloading resources for multicast applications.

Address substitution 216, as the name suggests, may involve replacing, for the packets of a particular flow, the source address and port in a consistent manner. Such address substitution techniques may be useful, for example, when an overlap exists between the private address ranges of two or more isolated networks, and a VR may be employed as the intermediary responsible for such substitutions in some embodiments. No auxiliary tasks may be needed for address substitution in the depicted embodiment.

Some clients of a provider network may wish to implement network traffic security or auditing applications 218 for at least a subset of the traffic flowing via aVR between various sets of endpoints. The subset of the traffic may, for example, be indicated via client-assigned tags or labels and specified by the clients in the form of policy-based routing rules. For such applications, auxiliary tasks may include processing associated with IPSec or some other client-selected security protocol, audit log generation and management tasks, and so on in the depicted embodiment. For scalable wide area networking applications 220, auxiliary tasks may include BGP processing, performance measurements involving TWAMP processing or custom latency measurement protocols of the provider network, and the like in some embodiments.

Note that at least in some embodiments, a single VR may combine several of the packet processing functions indicated in FIG. 2 (and/or other packet processing techniques).

For example, a single VR may concurrently implement (or collaborate with other VRs to concurrently implement) scalable cross-WN channels, scalable VPN connectivity, scalable dedicated-link based connectivity, and so on in some embodiments. Other categories of packet processing may be supported using VRs in different embodiments, while at least some of the types of applications indicated in FIG. 2 may not be supported in some embodiments.

Example Interactions Between Virtual Router Nodes and Offloading Resources

FIG. 3 illustrates an overview of example interactions between exception-path nodes of virtual routers, fast-path nodes of virtual routers, and auxiliary task offloading resources associated with virtual routers, according to at least some embodiments. In the depicted embodiment, a virtual router 327 has been assigned for processing traffic between client traffic source endpoints 364 and client traffic destination endpoints 372 for one or more PPS clients 310. The PPS clients 310 may submit application setup/configuration requests 343 to the PPS control plane 314 in the depicted embodiment, e.g., via a web-based console, command-line tools, APIs, graphical user interfaces or the like. The requests 343 may indicate the types of packet processing to be performed with the help of VR 327 (e.g., policies to be implemented for packet forwarding/routing), desired performance or other goals to be met etc. Based on the requirements of the client and/or on the availability and current resource consumption levels at various resources of the PPS, the PPS control plane 314 may identify or configure a set of exception-path nodes 325 (ENs, also referred to as decision nodes) and a set of fast-path nodes 368 (FNs, also referred to as action implementation nodes) for the VR 327 in the depicted embodiment. In addition, in at least some embodiments, resources for performing auxiliary tasks (e.g., tasks of the kind indicated in FIG. 2) associated with the traffic between endpoints 364 and 372 may be configured as well in the depicted embodiment, such as auxiliary task offloaders 373A and 373B. Connectivity may be established between the auxiliary task offloaders 373 and at least some nodes of the virtual router 327 in various embodiments. In some embodiments, connectivity may only be established between FNs 368 and auxiliary task offloaders. In other embodiments, connectivity may also or instead be established between ENs 325 and auxiliary task offloaders.

Configuration metadata 305 such as forwarding information base (FIB) entries provided by the client, policy-based (PBR) routing rules indicated by the client, which are used for making packet processing decisions, may be transmitted to one or more ENs 325 from the PPS control plane 314 in the depicted embodiment. In some embodiments in which a given VR 327 comprises multiple ENs, all the ENs may be provided all the metadata pertaining to the one or more applications to which the VR 327 is assigned. In other embodiments, respective subsets of metadata may be provided to individual ENs.

When a packet is received from a traffic source endpoint 364 of the application at an FN 368, an attempt may be made to find a corresponding action in an action cache 397. If such an action is found, e.g., via a lookup using a key based on some combination of packet header values, a client identifier, and so on, the action may be implemented, resulting in the transmission of at least some contents of the received packet to one or more destination endpoints 372 in the depicted embodiment. This "fast-path" 308 processing, in which a cache hit occurs, and in which ENs are not directly involved, may be much more frequently encountered in practice in various embodiments than the slower cache miss case (or cases in which some types of auxiliary task has to be performed). Note that at least for some applications, the total number of packets for which the same logical action is to be implemented may be quite large—e.g., hundreds or thousands of packets may be sent using the same long-lived TCP connection from one source endpoint to a destination endpoint.

In the scenario in which the arrival of a packet results in a cache miss at the FN 368, a request-response interaction 307 with an EN 325 may be initiated by the AIN in the depicted embodiment. An action query (which may in some implementations include the entire received packet, and in other implementations may include a representation or portion of the packet such as some combination of its header values) may be submitted from the FN 368 to the EN 325. The EN 325 may, for example, examine the contents of the action query and the configuration metadata 305 (including PBR rules 337), and determine the action that is to be implemented for the cache-miss-causing packet and related packets (e.g., packets belonging to the same flow, where a flow is defined at least partly by some combination of packet header values) in the depicted embodiment. In at least some embodiments, an EN 325 may comprise an action code generator 326, which produces an executable version of the action that (a) can be quickly executed at an FN and (b) need not necessarily be interpreted or "understood" at the FN. In at least one embodiment, the generated action may comprise some number of instructions of an in-kernel register-based virtual machine instruction set which can be used to perform operations similar to those of the extended Berkeley Packet Filter (eBPF) interface. The action may be passed back to the FN for caching, and for implementation with respect to the cache-miss-causing packet in at least some embodiments.

In at least some embodiments, this type of cache-miss-caused request response pathway may also be used for auxiliary tasks. For example, the configuration metadata 305 may indicate to an EN that for certain types of packets (such as BGP packets received at an FN from a BGP processing engine at a client premise), the action to be performed is to send the packet (e.g., using an encapsulation technique as discussed below) to an auxiliary task offloader. In some implementations, an FN may send such packets to an auxiliary task offloader 373A by implementing an action generated at an EN and cached in caches 397. When a response packet comprising a result 308 of such an auxiliary task is received from the auxiliary task offloader 373A at the FN, the results 308 may be sent to an EN, where they may be used to generate or modify actions to be used to forward one or more subsequent packets between endpoints 364 and 372 in some embodiments. In one embodiment, an EN may be configured to communicate directly with an auxiliary task offloader 373B, instead of using an FN as an intermediary. In such an embodiment, the results of the auxiliary task may be received directly by the EN and also used to generate/modify actions to be used for forwarding client traffic between endpoints 364 and endpoints 372. Note that in at least some embodiments, at least some of the network packets or messages which trigger auxiliary tasks may be directed to nodes of the VR 327 itself (e.g., have destination addresses assigned to VR nodes), as opposed to the client application packets which are directed to endpoints 372.

At the FN 368 that submitted an action query, the generated action may be stored in the cache 397, and re-used as needed for other packets in addition to the first packet that led to the identification and generation of the action in various embodiments. Any of a variety of eviction policies may be used to remove entries from the caches 397—e.g., if no packet requiring the implementation of a given action Al has been received for some threshold time interval, in one embodiment Al may be removed from the cache. In at least one embodiment, individual entries in the cache may have associated usage timing records, including for example a timestamp corresponding to the last time that action was performed for some packet. In such an embodiment, an entry may be removed from the cache if/when its usage timing record indicates that an eviction criterion has been met (e.g., when the action has not been performed for some threshold number of seconds/minutes). In some embodiments, cached actions may periodically be re-checked with respect to the current state of the configuration metadata 305—e.g., every T seconds (where T is a configurable parameter) the FN may submit a re-verification query indicating a cached action to an EN, and the EN may verify that the cached action has not been rendered invalid by some newly updated configuration metadata entries. Note that in various embodiments, as long as the action that is eventually performed for a given received packet is correct, from a functional perspective it may not matter whether the action was cached at the FNs or had to be generated at the ENs. As such, even if an action is occasionally evicted from a cache 397 unnecessarily or as a result of an overly pessimistic eviction decision, the overall impact on the packet processing application is likely to be small (as long as unnecessary evictions are not very frequent) in such embodiments.

Example Independent Scaling of Offloading Resources

Figure 4:
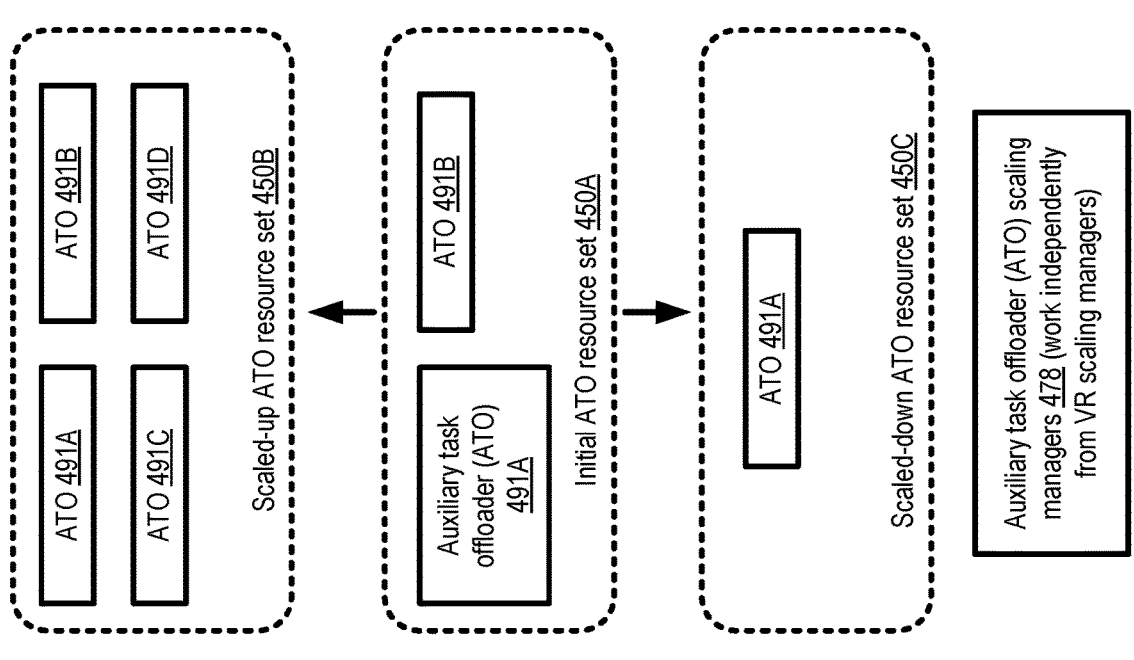
FIG. 4 illustrates an example scenario in which resources used for virtual routers may be automatically scaled independently of resources used for auxiliary tasks associated with traffic routed via the virtual routers, according to at least some embodiments.

One of the benefits of separating the resources used for auxiliary tasks from the resources used for baseline forwarding tasks is that changes in workload can be handled independently for the two types of tasks. FIG. 4 illustrates an example scenario in which resources used for virtual routers may be automatically scaled independently of resources used for auxiliary tasks associated with traffic routed via the virtual routers, according to at least some embodiments. A set of VR scaling managers 477 may be assigned the responsibility of collecting and analyzing workload and resource utilization levels of VR resources such as FNs and ENs, and initiating the acquisition or release of VR resources as needed, in response to trends or changes in the collected metrics in the depicted embodiment. Similarly, a set of auxiliary task offloader scaling managers 478 may be assigned the responsibility of collecting and analyzing workload and resource utilization levels at the set of auxiliary task offloaders (ATOS) associated with a virtual router, and initiating resource acquisition or release for the ATOs independently of the changes initiated by VR scaling managers.

An initial VR resource set 410A for a given VR may, for example, comprise four fast-path nodes (FNs 402A, 402B, 402C and 402D) and a pair of exception-path nodes (ENs 403A and 403B) in the depicted example scenario, each node comprising for example one or more processes or threads running at a respective computing device. An initial auxiliary task offloading resource set 450A may comprise two ATOS, 491A and 491B, each of which may also comprise one or more processes or threads running at a respective computing device. As the rate of application data packet arrivals at the VR changes, the resource set 410A may be expanded or shrunk by the VR scaling managers, independently of workload changes or configuration changes at the ATO in the depicted embodiments. If the application data traffic arrival rate increases beyond some threshold, for example, leading to corresponding increase in CPU and/or memory utilization levels at the FNs and ENs, and remains above the threshold for a selected time, two new FNs (402E and 402F) and a new EN 403C may be instantiated and added to the VR, resulting in a scaled-up VR resource set 410B. Alternatively, if application data traffic decreases below a threshold and remains below the threshold for some time, one of the FNs (402D) and one of the ENs (403B) of the initial VR resource set 410A may be decommissioned, leading to a reduced or scaled-down VR resource set 410C.

ATO scaling managers 478 may decide to add more resources (e.g., ATOs 491C and 491D) to the initial ATO resource set 450A, leading to scaled-up ATO resource set 450B if the resource utilization levels or other metrics collected from the initial ATO resource set satisfy scale-up criterion in the depicted embodiment. Alternatively, an ATO such as 491B may be deactivated if the metrics collected from initial ATO resource set 450A meet a different criterion, resulting in scaled-down ATO resource set 450C. Changes to ATO resource set configurations may be made asynchronously with respect to changes in the VR resource set in various embodiments.

Example Cell-Based Virtual Router Architecture

Figure 5:
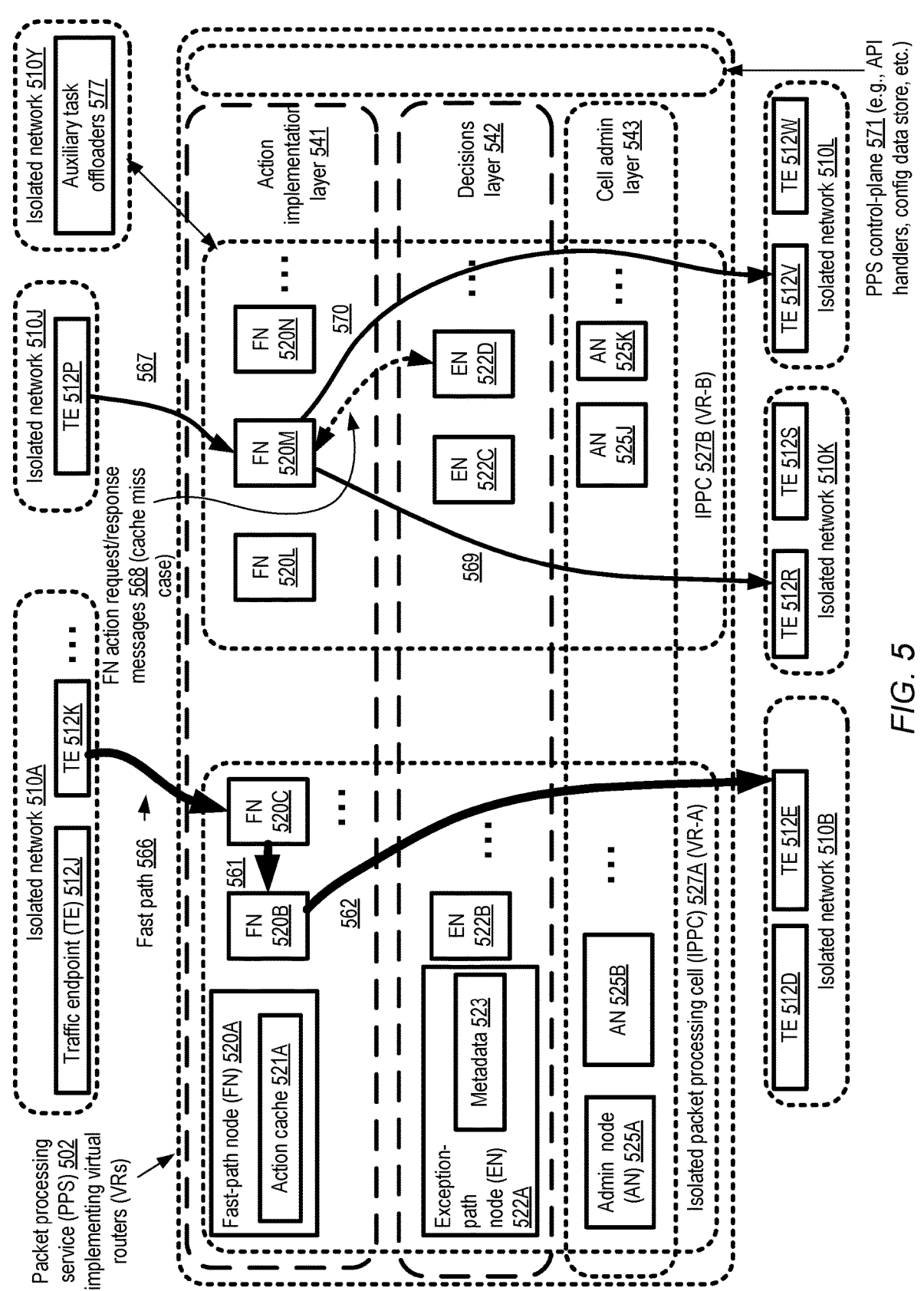
FIG. 5 illustrates an example use of independently managed packet processing cells for virtual routers, according to at least some embodiments.

In some embodiments, the resource used for the forwarding actions of a virtual router may be arranged in autonomous groups called cells. FIG. 5 illustrates an example use of independently managed packet processing cells for virtual routers, according to at least some embodiments. As shown, a packet processing service (PPS) 502 at which virtual routers can be configured at client request may comprise an action implementation layer 541, a decisions layer 542 and a cell administration layer 543, as well as a set of service-level control plane resources 571 including API handlers, metadata stores/repositories and the like in the depicted embodiment. Individual ones of the layers 541, 542 and 543 may comprise a plurality of nodes, such as fast-path nodes (FNs) at layer 541, exception-path nodes (ENs) at layer 542, and administration nodes (ANs) at layer 543. Resources of layers 541, 542, and 543 may be organized into groups called isolated packet processing cells (IPPCs) 527 in various embodiments, with a given IPPC 527 comprising some number of FNs, some number of ENs, and some number of ANs. For example, IPPC 527A may include FNs 520A, 520B and 520C, ENs 522A and 522B, and ANs 525A and 525B in the depicted embodiment, while IPPC 527B may comprise FNs 520L, 520M and 520N, ENs 522C and 522D, and ANs 525J and 525K. Individual nodes such as FNs, ENs and/or ANs may be implemented using some combination of software and hardware at one or more computing devices in different embodiments—e.g., in some embodiments, a given FN, EN or AN may comprise one or more threads or processes of a virtual machine running at a host managed by a virtualized computing service of a provider network, while in other embodiments FNs, ENs and/or ANs may be implemented using non-virtualized servers.

The resources of the packet processing service 502 may serve as an infrastructure or framework that can be used to build a variety of networking applications using virtual routers, such as the kinds of applications discussed in the context of FIG. 2. Individual IPPCs 527 may be assigned to implement the logic of one or more instances of such an application in some embodiments, with the traffic associated with that application being processed (at least under normal operating conditions) without crossing IPPC boundaries. For example, in the depicted embodiment, IPPC 527A may have been assigned to an instance of a VR (VR-A) for transmitting packets between at least isolated network 510A and isolated network 510B, while IPPC 527B may have been assigned to another VR instance (VR-B) for transmitting packets between at least isolated networks 510J and 510K. Individual ones of the isolated networks 510 may have associated private IP (Internet Protocol) address ranges, such that addresses assigned to resources within a given isolated network 510 may not be visible to resources outside the isolated network, and such that at least by default (e.g., prior to the assignment of an IPPC implementing a virtual routing application), a pathway between resources within different isolated networks may not necessarily be available.

In various embodiments, instances of VRs may be set up in response to programmatic requests received from customers of the PPS 502. Such requests may, for example, be received at API handlers of the PPS control plane 571. In response to a client's request or requests to enable connectivity between isolated networks 510A and 510B, for example, VR-A built using IPPC 227A may be assigned to forward packets among the two isolated networks in the depicted embodiment. Similarly, in response to another client's request (or the same client's request) to enable multicast connectivity among isolated networks 510J, 510K and 510L, IPPC 527B may be assigned. In at least some embodiments, a collection of virtual network interfaces may be programmatically configured to enable traffic to flow between endpoints (TEs 512, such as 512D, 512E, 512J, 512K, 512P, 512Q, 512R, 512S, 512V and 512W) in the isolated networks and the FNs of the cell assigned to those isolated networks. Clients on whose behalf the networking applications are being configured may provide decision metadata (e.g., layer 3 metadata 523 such as forwarding information base entries, route table entries and the like) and/or policies that can be used to determine the actions that are to be performed via control plane programmatic interfaces of the PPS in some embodiments. The metadata received from the clients may be propagated to the decision layer nodes of the appropriate IPPCs 527, e.g., from the PPS API handlers via the ANs 525 or directly in the depicted embodiment. In at least some embodiments, the metadata initially provided by the clients may be transformed, e.g., by converting high-level information into more specific route table entries that take into account the identifiers of virtual network interfaces to be used, locality-related information, information about the availability zones or availability containers in which various FNs are configured, and so on, and the transformed versions may be stored at the different ENs 522.

A given packet from a source endpoint such as TE 512K of isolated network 510A may be received at a particular FN such as 520C in the depicted embodiment. The specific FN to be used may be selected based, for example, on a shuffle-sharding algorithm in some embodiments, such that packets of a particular flow from a particular endpoint are directed to one of a subset of the FNs of the cell. Individual ones of the FNs may comprise or have access to a respective action cache, such as action cache 521A. An action cache may be indexed by a combination of attributes of the received packets, such as the combination of an identifier of the sending client, the source and destination IP addresses, the source and destination ports, and so on. Actions may be stored in executable form in the caches in some embodiments, e.g., using byte code expressed using instructions of a register-based virtual machine optimized for implementing network processing operations. FN 520C may try to look up a representation of an action for the received packet in its cache. If such an action is found, the packet may be processed using the "fast path" 566 in the depicted embodiment. For example, an executable version of the action may be implemented at FN 520C, resulting in the transmission of the contents of the packet on a path towards one or more destination endpoints, such as TE 512E in isolated network 510B. The path may include zero or more additional FNs— e.g., as shown using arrows 561 and 562, the contents of the packet may be transmitted via FN 520B to TE 512E in the depicted fast packet path. FN 520B may have a virtual network interface configured to access TE 512E, for example, while FN 520C may not have such a virtual network interface configured, thus resulting in the transmission of the packet's contents via FN 520B. Note that at least in some embodiments, one or more header values of the packet may be modified by the action (e.g., in scenarios in which overlapping private address ranges happen to be used at the source and destination isolated networks)—that is, the packet eventually received at the destination endpoint 512E may differ in one or more header values from the packet submitted from the source endpoint 512K.

If an FN's local action cache does not contain an action for a received packet, a somewhat longer workflow may ensue. Thus, for example, if a packet is received from TE 512P at FN 520M (as indicated via arrow 567), and a cache miss occurs in FN 520M's local cache when a lookup is attempted for the received packet, FN 220M may send an action query to a selected EN (EN 522D) in its IPPC 527B, as indicated by arrow 568. The EN 522D may determine, e.g., based on a client-supplied policy indicating that a multicast operation is to be performed, and based on forwarding/routing metadata provided by the client, that the contents of the packet are to be transmitted to a pair of endpoints 512R and 512V in isolated networks 510K and 510L respectively in the depicted example. A representation of an action that accomplishes such a multicasting operation may be sent back to FN 520M, stored in its local cache, and executed at FN 520M, resulting in the transmissions illustrated by arrows 569 and 570. In this example, FN 220M can send outbound packets directly to the destination TEs 512R and 512V, and may not need to use a path that includes other FNs of IPPC 527B.

Depending on the type of packet processing application being implemented using a VR such as VR-A or VR-B, auxiliary tasks may be performed in addition to baseline forwarding actions in the depicted embodiment. For example, for multicast, messages formatted according to IGMP, comprising multicast domain configuration information, may be received at an FN of a VR (e.g., from an IGMP processing engine in the source isolated network or the destination isolated network), and the processing of the IGMP messages may constitute one category of such auxiliary tasks. In various embodiments, one or more auxiliary task offloaders 577 of the kind introduced above may be associated with a given VR such as VR-B. In the depicted embodiment, the auxiliary task offloader(s) 577 may be implemented within another isolated network 510Y (e.g., an isolated virtual network of a virtualized computing service) set up specifically for handling such auxiliary tasks.

A given IPPC 527 may be referred to in some embodiments as being "isolated" because, at least during normal operating conditions, no data plane network traffic may be expected to flow from that IPPC to any other IPPC. In at least one embodiment, control plane traffic may also not flow across cell boundaries under normal operating conditions. As a result of such isolation, a number of benefits may be obtained: e.g., (a) an increase in a workload of one VR, being implemented using one IPPC, may have no impact on the resources being used for other VRs at other cells, and (b) in the rare event that a failure occurs within a given cell, that failure may not be expected to have any impact on applications to which other VRs have been assigned. Software updates may be applied to nodes of one IPPC at a time, so any bugs potentially introduced from such updates may not affect applications using other cells. In some embodiments, while at least one IPPC may be assigned to a given VR instance, a given IPPC 527 may potentially be employed in a multi-tenant mode for multiple VRs configured on behalf of multiple customers.

In at least some embodiments, a shuffle sharding algorithm may be used to assign a subset of nodes (e.g., FNs) of an IPPC 527 to a given set of one or more source or destination endpoints. According to such an algorithm, if the IPPC comprises N FNs, packets from a given source endpoint E1 may be directed (e.g., based on hashing of packet header values) to one of a subset S1 of K FNs (K<N), and packets from another source endpoint E2 may be directed to another subset S2 of K FNs, where the maximum overlap among S1 and S2 is limited to L common FNs. Similar parameters may be used for connectivity for outbound packets to destination endpoints in various embodiments. Such shuffle sharding techniques may combine the advantages of hashing based load balancing with higher availability for the traffic of individual ones of the source and destination endpoints in at least some embodiments.

Example Cell-Based Architecture for Auxiliary Task Offloaders

Figure 6:
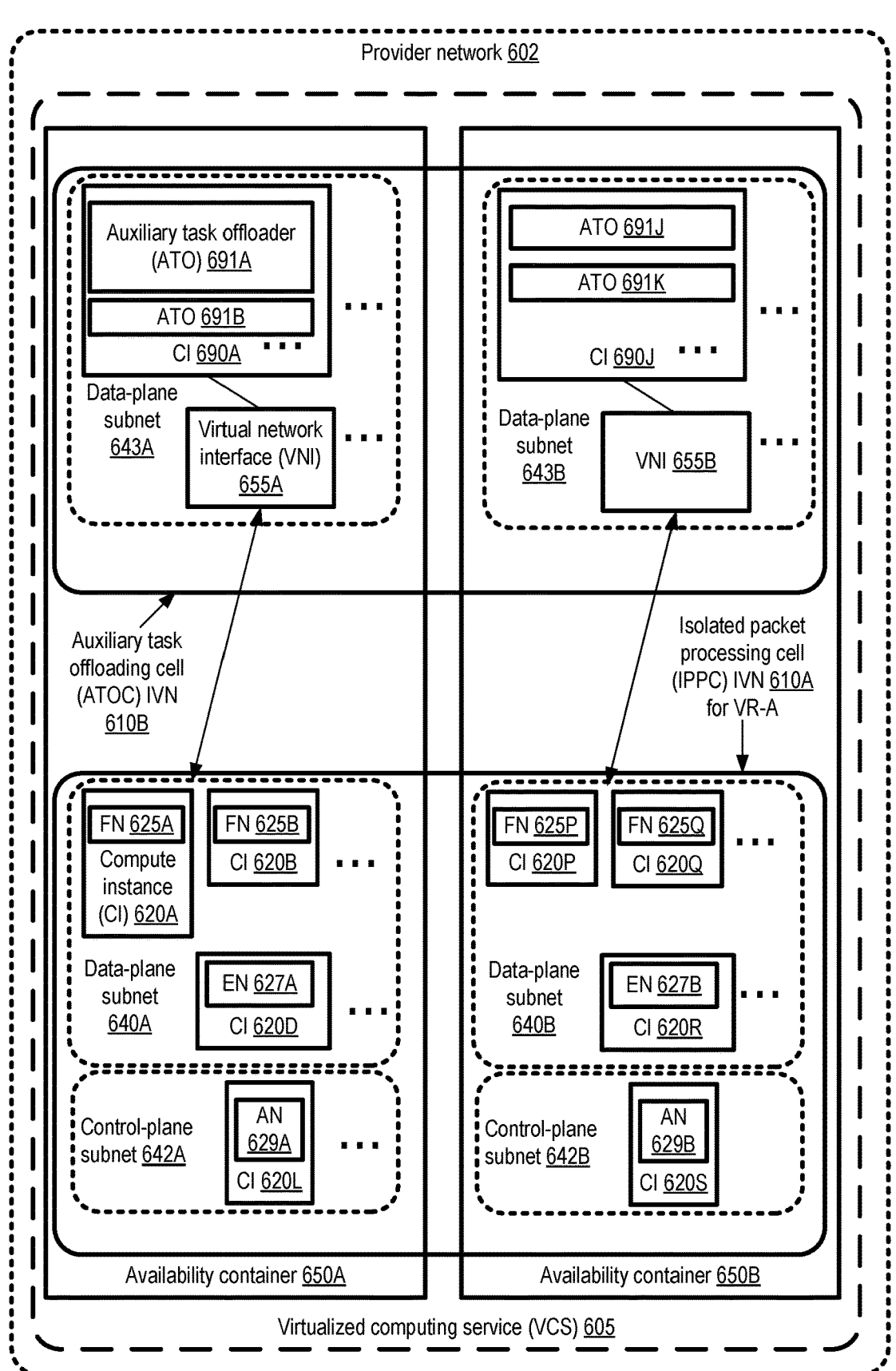
FIG. 6 illustrates an example use of independently managed auxiliary task offloading cells for virtual routers, according to at least some embodiments.

In some embodiments, the auxiliary task offloaders configured for virtual routers may also be organized in cells, for reasons similar to those described above for using a cell-based architecture for virtual router nodes. FIG. 6 illustrates an example use of independently managed auxiliary task offloading cells for virtual routers, according to at least some embodiments. In the depicted embodiment, a provider network 602 may comprise a virtualized computing service (VCS) 605 at which isolated virtual networks may be established on behalf of various customers or clients and/or for implementing various functions of provider network services. In the embodiment depicted in FIG. 6, IVN 610A may be include resources used for a packet processing cell assigned to a virtual router VR-A, while WN 810B may include resources used for an auxiliary task offloading cell (ATOC) associated with VR-A. IVN resources (including, for example, compute instances or virtual machines), may be logically isolated from (and by default, inaccessible from) resources allocated in other isolated virtual networks in at least some embodiments. In the depicted embodiment, the packet processing service itself may be considered a client or customer of the VCS 605—that is, the packet processing service may be built by leveraging the functionality supported by the VCS 605. As mentioned earlier, the client on whose behalf an IVN is established may be granted substantial flexibility regarding network configuration for the resources of the IVN—e.g., private IP addresses for compute instances may be selected by the client without having to consider the possibility that other resources within other IVNs may have been assigned the same IP addresses, subnets of the client's choice may be established within the WN, security rules may be set up by the client for incoming and outgoing traffic with respect to the WN, virtual network interfaces may be set up at the request of the client to enable connectivity among specified groups of resources, and so on.

In at least some embodiments, the resources of the VCS 605, such as the hosts on which various compute instances are run, may be distributed among a plurality of availability containers 650, such as 650A and 650B. An availability container, which may also be referred to as an availability zone, in turn may comprise portions or all of one or more distinct locations or data centers, engineered in such a way (e.g., with independent infrastructure components such as power-related equipment, cooling equipment, or physical security components) that the resources in a given availability container are insulated from failures in other availability containers. A failure in one availability container may not be expected to result in a failure in any other availability container; thus, the availability profile of a given resource is intended to be independent of the availability profile of resources in a different availability container.

In the depicted embodiment, fast-path nodes (FNs) 625, exception-path nodes (ENs) 627, and administration nodes (ANs) 629 (similar in capabilities to those shown in FIG. 5) of a given IPPC set up for VR-A may all be implemented at least in part using respective compute instances (CIs) 620 of the VCS 605. As shown, FNs 625A, 625B, 625P, and 625Q may be implemented at CIs 620A, 620B, 620P, and 620Q. ENs 627A and 627B, may be implemented at CIs 620D and 620R respectively, and ANs 629A and 629B may be implemented at CIs 620L and 620S respectively. In some embodiments, a given CI 620 may be instantiated at a respective physical virtualization host; in other embodiments, multiple CIs may be set up at a given physical host. The illustrated IPPC, implemented in WN 610A, may comprise at least two data-plane subnets 640A and 640B, and at least two control plane subnets 642A and 642B. One data plane subnet and one control plane subnet may be implemented in each of at least two availability containers 650—e.g., subnets 640A and 642A may be configured in availability container 650A, while subnets 640B and 642B may be configured in availability container 650B. A control plane subnet 642 may comprise one or more ANs 629 at respective CIs 620 in some embodiments, while a data-plane subnet 640 may comprise one or more FNs 625 and one or more ENs 627 at respective CIs 620. As a result of the use of multiple availability containers, the probability that the entire IPPC (or any given VR such as VR-A which uses the nodes of the IPPC) is affected by any given failure event may be minimized in the depicted embodiment. The use of different subnets for control plane versus data-plane nodes may help to separate at least the majority of the control plane traffic of the VRs using the IPPC from the data plane traffic of the VRs in various embodiments.

In the example scenario depicted in FIG. 6, an auxiliary task offloading cell (ATOC) comprising auxiliary task offloaders (ATOS) 691A, 691B, 691J and 691K configured within IVN 610B may be established for or assigned to VR-A. The ATOC may also be implemented using resources distributed across availability containers 650A and 650B in the depicted embodiment. The ATOs may also be implemented using compute instances: e.g., ATOs 691A and 691B may each comprise one or more processes or threads within a compute instance 690A in a data-plane subnet 643A, while ATOs 691J and 691K may be implemented within CI 690J in data-plane subnet 643B. A respective virtual network interface (VM) 655 may be set up in each data-plane subnet 643 to enable connectivity between the FNs of VR-A in the same availability container in the depicted embodiment. Thus, VNI 655A may be configured for connectivity between FNs 625A and 625B of VR-A and ATOs 691A and 691B, while VM 655B may be configured for connectivity between FNs 625P and 625Q of VR-A and ATOs 691J and 691K. A virtual network interface may comprise a set of networking configuration properties or attributes (such as IP addresses, subnet settings, security settings, and the like) that can be dynamically associated ("attached" to) or disassociated ("detached" from) with compute instances, without for example having to make changes at physical network interfaces if and when compute instances migrate from one physical host to another. Using ATOCs distributed among the same availability containers as are used for the VR nodes, as shown in the example of FIG. 6, may make the processing of auxiliary tasks resilient with respect to failures that are limited to within any individual availability container. In some embodiments, separate control plane resources (not shown in FIG. 6) may also be set up for managing auxiliary task offloaders.

Figure 7:
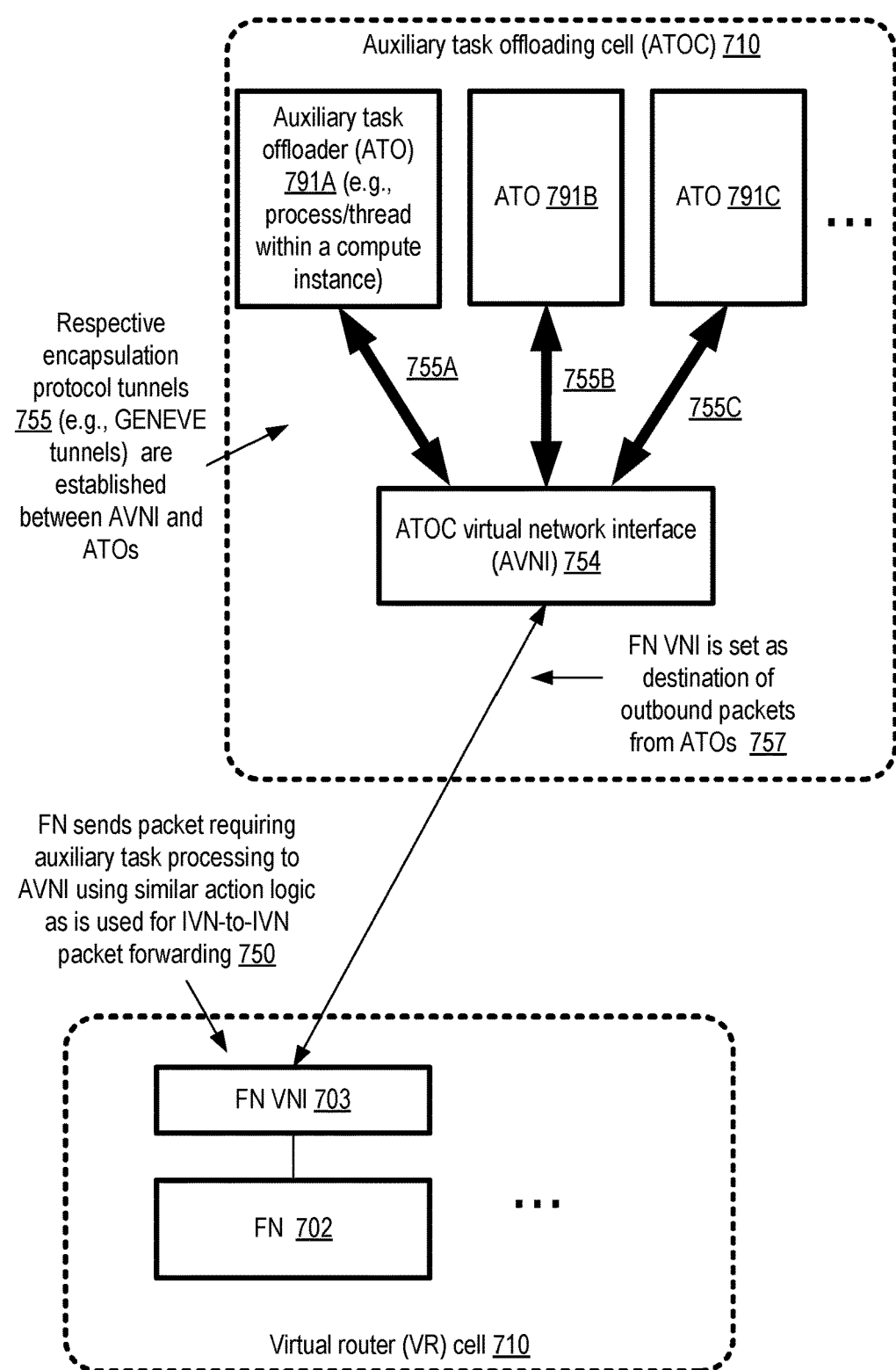
FIG. 7 illustrates an example technique for connecting nodes of virtual routers with auxiliary task offloaders, according to at least some embodiments.

Example Use of Encapsulation Protocol Tunnels for Auxiliary Task-Related Messages FIG. 7 illustrates an example technique for connecting nodes of virtual routers with auxiliary task offloaders, according to at least some embodiments. In the depicted embodiment, a fast-path node FN 702 within a virtual router cell 710 has an associated FN virtual network interface 703. Auxiliary task offloading cell (ATOC) 710 includes a VNI (AVNI) 754 associated with one or more compute instances at which ATOs 791A, 791B and 791C run.

As part of the setup operations for auxiliary task processing, initiated for example by control plane components of a packet processing service at which the VR is implemented, respective encapsulation protocol tunnels 755 (e.g., 755A, 755B and 755C) may be established to transmit messages formatted according to various protocols such as BGP, IGMP, and the like to the ATOs from the AVNI 754 in the depicted embodiment. In some implementations, the Generic Network Virtualization Encapsulation (GENEVE) protocol may be used for the tunnels, enabling packets of a wide variety of standard and/or custom protocols to be transmitted between the FNs and the ATOs using a common tunneling approach. An FN such as FN 702 may be configured, e.g., by an EN which receives metadata pertaining to the ATOC selected for the VR to which the EN and FN belong, to send packets requiring auxiliary task processing to the AVNI via FN VNI 703, using an executable action similar to the actions used for forwarding application data packets among isolated virtual networks (IVNs) in the depicted embodiment, as indicated in label 750. That is, in at least some embodiments, a similar methodology may be used to enable connectivity between FNs and ATOs as is used for enabling connectivity between FNs and endpoints in isolated networks for which the VR is configured. Similarly, the FN VNI may be set as the destination of outbound packets from ATOs (which may comprise results of the auxiliary tasks) in the depicted embodiment as part of the setup operations, as indicated in label 757. Other techniques for establishing bi-directional connectivity between the VR nodes and ATOs may be employed in different embodiments.

Example Programmatic Interactions Pertaining to Offloading Auxiliary Tasks

Figure 8:
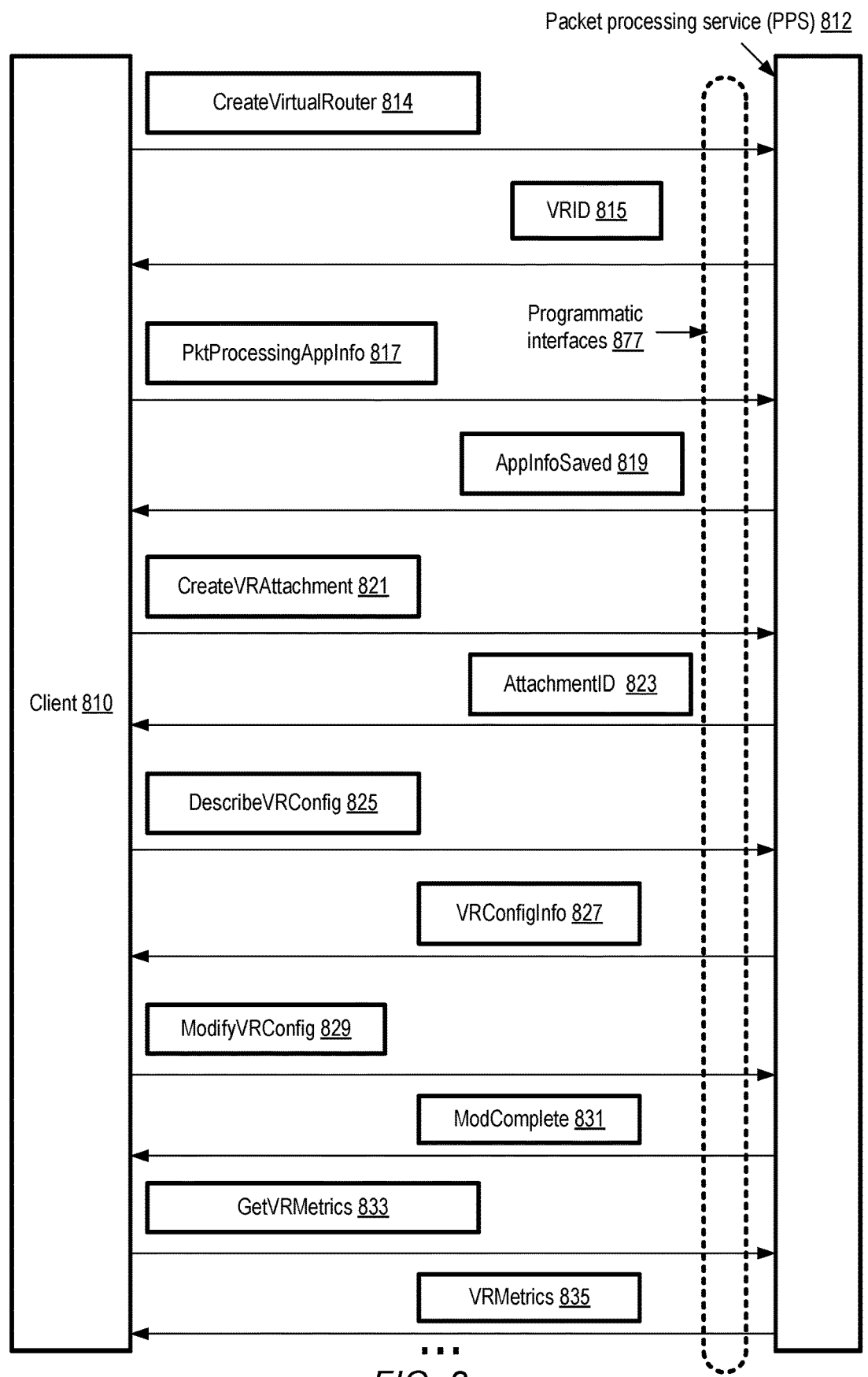
FIG. 8 and FIG. 9 illustrate example programmatic interactions between clients and a packet processing service, related to the configuration and use of virtual routers and associated auxiliary task offloading resources, according to at least some embodiments.
Figure 9:
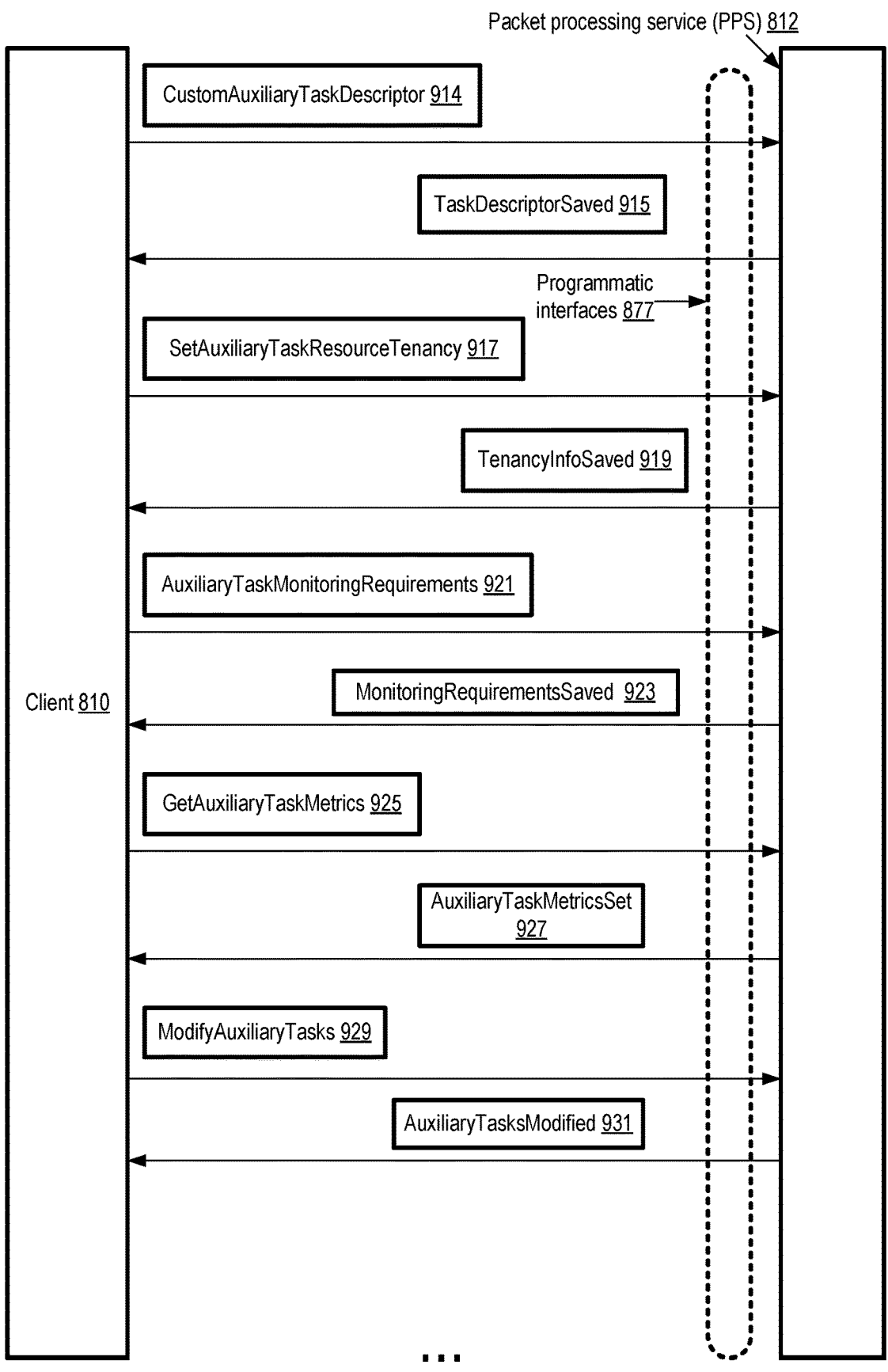

FIG. 8 and FIG. 9 illustrate example programmatic interactions between clients and a packet processing service, related to the configuration and use of virtual routers and associated auxiliary task offloading resources, according to at least some embodiments. One or more programmatic interfaces 877 may be implemented by the packet processing service (PPS) 812 at which virtual routers are established in the depicted embodiment. Such interfaces may include, for example, a set of application programming interfaces (APIs), graphical user interfaces, command line tools, web-based consoles and the like. The configuration-related messages may, for example, be handled by control plane components of the PPS.

A client 810 of the PPS 812 may submit a CreateVirtualRouter request 814 to initiate the process of configuring a VR in the depicted embodiment. In response to the CreateVR request, control plane components of the PPS may provide a VRID (virtual router identifier) 815 in some embodiments, indicating that the requested VR has been created (e.g., that metadata representing the VR has been stored at a repository of the PPS).

A PktProcessingAppinfo message 817 may be submitted via the interfaces 877 in some embodiments, indicating for example the type of packet processing application which is to be implemented using the virtual router. For example, one or more of the types of applications discussed in the context of FIG. 2 may be indicated in the PktProcessingAppinfo message, and/or one or more policy-based routing (PBR) rules may be specified for the traffic to be processed using the VR. The information about the application may be saved at the PPS, and an AppInfoSaved message 819 may be sent to the client. In at least one embodiment, the information provided by the client about the application may be analyzed to identify the kinds of auxiliary tasks that may be needed for the application, and one or more auxiliary task offloading resources may be configured accordingly. For example, a client may indicate that the VR is to be used for multicast, and an auxiliary task offloader comprising an IGMP message processor may be configured.

A client may submit a programmatic request (CreateVRAttachment) 821 to attach a specified isolated network (e.g., an IVN within the provider network at which the PPS 812 is implemented, a VPN-connected network outside the provider network's data centers, or an external network connected to the provider network via a dedicated physical link) or another VR to a specified VR in some embodiments, and receive an attachment identifier (AttachmentID) 823 in response. A given VH may be programmatically attached to several different isolated networks and/or to one or more other VRs CreateVRAttachment requests in various embodiments. Attachments between pairs of VRs, referred to as VR peering attachments, may for example be employed for wide area networking applications, as discussed below in further detail. In some embodiments, requests to create and/or associate a particular route table with a particular isolated network for which an attachment was created earlier may be submitted, enabling the PPS to determine which specific route table is to be used for traffic originating at the particular isolated network.

A DescribeVRConfig request 825 may be submitted by a client 810 in the depicted embodiment to obtain the current configuration of a specified VR (e.g., the different attachments that have been created, the mappings between route tables and isolated networks, whether auxiliary task offloaders have been configured and if so the types of auxiliary task offloaders, and so on). Configuration information about a specified VR may be provided via one or more VRConfigInfo messages 827 in the depicted embodiment.

In some embodiments, a programmatic request (ModifyVRConfig) 829 may be submitted to the PPS by a client to change one or more operating parameters of a specified VR. For example, a client may indicate new policy-based routing rules for a subset of the traffic handled by the VR, or modify an existing rule. The requested configuration changes may be implemented, and a ModComplete response message 831 may be sent to the client in the depicted embodiment.

A client 810 may submit a GetVRMetrics request 833 in the depicted embodiment to obtain metrics about the operations performed at a specified VR. Such metrics may include, for example, the number of application data packets that were processed (e.g., per isolated network attached to the VR) during a time interval, the number of messages pertaining to auxiliary tasks that were processed during a time interval, and so on. Metrics collected for the VR may be indicated via one or more VRMetrics messages 835.

As shown in FIG. 9, according to some embodiments, a client 810 may submit a descriptor of a custom auxiliary task to be performed with respect to at least some of the traffic handled a specified VR in a CustomAuxiliaryTaskDescriptor message 914 directed to PPS 812. Such a task descriptor may, for example, comprise source code or executable code for the task, a filter (e.g., based on client-defined packet tags or labels, based on source/destination virtual network interfaces, based on source/destination isolated networks, etc.) to be used to identify a subset of packets for which the task is to be implemented, how the results of the custom auxiliary task are to be stored or used, and so on in different embodiments. The PPS may conduct one or more verification/validation tests to ensure that the requested custom task can be implemented at offloaders of the kind introduced above in some embodiments. If the tests succeed, a TaskDescriptorSaved message 915 may be sent to the client in the depicted embodiment.

In one embodiment, a client may wish to control the tenancy mode for auxiliary task offloaders (e.g., whether auxiliary tasks are to be performed at a given device or host only for a single client or VR, or for multiple clients/VRs). A SetAuxiliaryTaskResourceTenancy request 917 indicating such tenancy preferences may be submitted via programmatic interfaces 877 in such an embodiment. A TenancyInfoSaved response message 919 may be sent to client after the preferences have been received and stored at the PPS 812.

According to some embodiments, a client may wish to control or specify the kinds of metrics to be collected for auxiliary tasks of a VR (e.g., the number/rate of BGP messages processed at auxiliary task offloaders, the number/rate of IGMP messages processed, the amount of memory or storage used for saving state information associated with stateful auxiliary tasks, etc.). An AuxiliaryTaskMonitoringRequirements message 921 indicating the monitoring-related preferences of the client may be submitted by the client in such embodiments, and a MonitoringRequirementsSaved message 923 may be sent to the client after the preferences are saved.

Clients 810 may submit GetAuxiliaryTaskMetrics requests 925 to obtain metrics pertaining to auxiliary tasks being performed using VRs and offloading resources in the depicted embodiment. A set of metrics collected over a specified time period (or over a time period selected by the PPS) may be provided to the client via one or more AuxiliaryTaskMetricsSet messages 927.

According to some embodiments, a client 810 may submit a ModifyAuxiliaryTasks request 929 to the PPS to change one or more properties of, or disable, one or more types of auxiliary tasks being performed for traffic handled by the client's VR. For example, the client may change the custom logic being used for specified subsets of the packets received at the VR, or indicate additional auxiliary tasks to be performed for some subset of the packets. In response, the PPS may propagate the requested changes to the offloaders configured for the VR, and send an AuxiliaryTasksModified message 931 to the client.

Note that a different combination of programmatic interactions may be supported in some embodiments for configuring and using VRs with auxiliary task offloaders than that shown in FIG. 9. For example, in one embodiment, several of the operations discussed may be performed in response to a single request instead of using separate requests: e.g., a combined request may be used to create a VR and attach a set of isolated networks to it, a combined request for attachment auxiliary tasks for traffic received via the attachment may be submitted, and so on.

Methods for Offloading Workload from Virtual Routers

FIG. 10 is a flow diagram illustrating aspects of operations that may be performed to offload some types of tasks from virtual routers, according to at least some embodiments.

As shown in element 1001, a set of isolated networks (INs) whose network traffic is to be processed based on client-specified application requirements (such as policy-based routing (PBR) rules, multicast requirements, dynamic routing requirements, etc.) may be determined, e.g., based on input received from a client via programmatic interfaces at a packet processing service of a provider network in the depicted embodiment.

The PPS may identify, e.g., based on analysis of the application requirements and/or based on additional programmatic interactions with the client, one or more categories of auxiliary tasks (in addition to baseline packet forwarding) associated with the transmission of the network packets between a pair of the INs, IN1 and IN2, in various embodiments (element 1004). The categories may include, for example, routing configuration management tasks using BGP, IGMP or other protocols, encryption of packet contents using IPSec or other protocols, periodic performance measurements (e.g., using TWAMP), DNS tasks, client-specified custom tasks such as tagging-based packet analytics collection, etc.

One or more virtual routers (VRs) may be configured for the client's application (element 1007) and programmatically attached to IN1 and IN2 in the depicted embodiment. A given VR may include nodes at two packet processing layers in various embodiments—a fast-path layer which efficiently implements routing/forwarding actions, and an exception-path layer responsible for specifying/generating the routing/forwarding actions based on client-supplied metadata or rules. Fast-path nodes and exception-path nodes may be referred to as forwarding plane nodes.

One or more auxiliary task offloaders (ATOS) may be configured (element 1010), e.g., by the control plane of the PPS, to perform the needed auxiliary tasks without adding to the workload of the fast-path layer nodes and/or the exception-path layer nodes in the depicted embodiment. For example, an ATO may comprise one or more processes or threads of execution at a compute instance run on a host other than the hosts used for the fast-path layer or the exception-path layer. Connectivity between the ATO(s) and one or more of the forwarding plane nodes of the VR (fast-path nodes and/or exception-path nodes) may be enabled in various embodiments. For example, such connectivity may be established by configuring one or more virtual network interfaces to which the VR forwarding plane nodes can transmit packets which require auxiliary task processing, configuring encapsulation protocol tunnels and the like as discussed in the context of FIG. 7. In some embodiments, the PPS control plane may generate and specify one or more policy-based routing rules, which when implemented at the exception-path layer cause packets requiring the auxiliary tasks to be transmitted from the VR forwarding plane to the ATOS, and cause response packets containing the results of the auxiliary tasks to be sent back to the forwarding plane nodes.

After the initial configuration of the VR forwarding plane nodes and the ATOs is complete, the client's application endpoints (e.g., in IN1) may be enabled to start sending packets comprising application data to destination endpoints (e.g., in IN2) via a VR (element 1013). As needed, based on the specific categories of auxiliary tasks identified for the traffic between IN1 and IN2, communication sessions of protocols such as BGP and the like may also be started, e.g., between protocol processing engines at the INs and the ATOs in some embodiments.

When a packet is received at a VR configured for the client, a determination may be made in various embodiments as to whether the packet requires or is going to trigger auxiliary task processing (element 1016). If the packet does not require any auxiliary tasks, the appropriate routing/forwarding action may be identified for the packet and implemented, without utilizing an ATO (element 1025). If the packet does require one or more auxiliary tasks to be performed, an implicit or explicit request for the auxiliary task(s) may be transmitted from the VR forwarding plane to a selected ATO (element 1019) in the depicted embodiment, and a corresponding result of the auxiliary task(s) may be obtained at the VR forwarding plane.

The result of the auxiliary task(s) may be used by the VR forwarding plane to transmit at least a portion of some packets between IN1 and IN2 (element 1022) in the depicted embodiment. Examples of the results may include routes selected using a selected version or variant of BGP, the identities of multicast group members verified using a selected version or variant of IGMP, encrypted/decrypted contents of application data packets obtained using a selected version or variant of IPSec or other security protocols, performance metrics obtained using a version or variant of TWAMP or other performance metric collection protocols, and so on in different embodiments. In some cases, as in the encryption/decryption scenario, the results of auxiliary tasks may be incorporated within packets sent to an isolated network from the VR forwarding plane. In other cases, as in the case of BGP/IGMP/TWAMP, the results may be used to select preferred next hops or routes for at least some of the packets, e.g., at the exception-path nodes of the VR. At least some types of auxiliary tasks (such as BGP message processing, IGMP message processing, or TWAMP message processing) may be performed asynchronously with respect to the forwarding actions of the VR—that is, a fast-path node of the VR may not have to wait for the completion of a given auxiliary task to implement a forwarding action, even though the forwarding actions undertaken at the fast-path node may be affected by the results of the auxiliary tasks.

Example System Environment with Protocol Stack Multiplexing for Auxiliary Tasks

Figure 11:
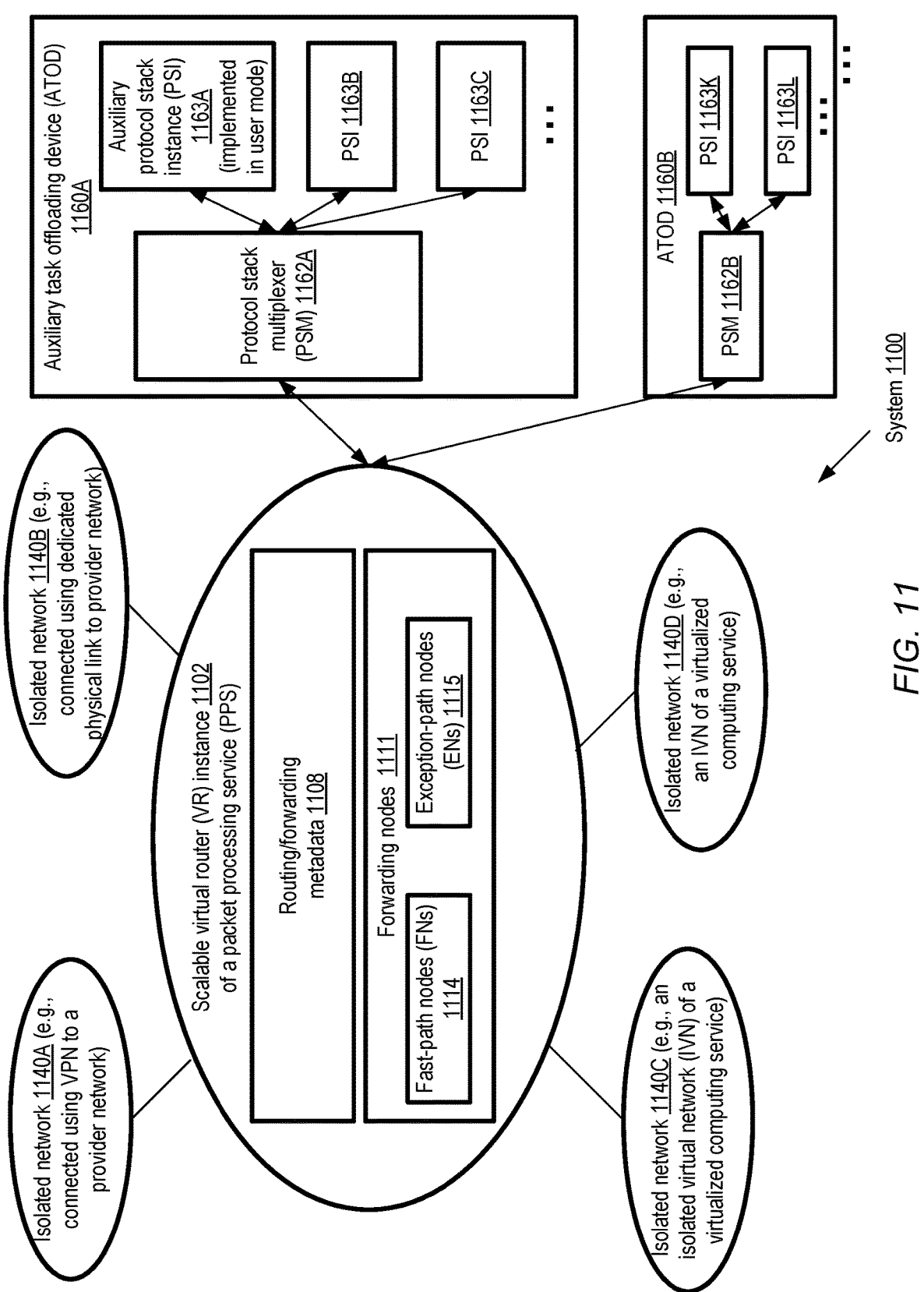
FIG. 11 illustrates an example system environment in which protocol stack multiplexers and multiple protocol stack instances may be set up for offloading auxiliary tasks of a scalable virtual router, according to at least some embodiments.

FIG. 11 illustrates an example system environment in which protocol stack multiplexers and multiple protocol stack instances may be set up for offloading auxiliary tasks of a scalable virtual router, according to at least some embodiments. As shown, system 1100 may comprise an instance 1102 of a scalable virtual router (VR) of a packet processing service of a provider network, configured to transmit network packets containing application data between several isolated networks in accordance with packet processing requirements indicated programmatically by one or more clients of the packet processing service. Isolated networks (INs) whose traffic is routed/forwarded using the VR instance may include, for example, IN 1140A (comprising resources at a premise external to the provider network and connected using VPN tunnels to the provider network), IN 1140B (also comprising resources at a premise external to the provider network, and connected using a dedicated physical link to the provider network), IN 1140C and IN 1140D (each comprising a respective isolated virtual network configured within a virtualized computing service of the provider network).

From the perspective of the client or clients on whose behalf VR instance 1102 is set up, the functionality provided by VR instance 1102 may be very similar to, or identical to, the functionality provided by VR instance 102 shown in FIG. 1. Applications of the types discussed in the context of FIG. 2 may be implemented using the VR instance 1102, for example, and similar types of auxiliary tasks may be required for the applications as those shown in FIG. 2. Routing/forwarding metadata 1108, of which at least a subset may be provided by the client via programmatic interfaces of the PPS, may be used to generate routing/forwarding actions to be undertaken for various packet flows, as discussed earlier in the context of VR instance 102. The routing/forwarding metadata may, for example, include client-specified policy-based routing rules to be used to route packets originating at the isolated networks, as well as one or more route tables populated according to configuration settings chosen by the client(s). VR instance 1102 may comprise a set of forwarding nodes 1111, including fast-path nodes (FNs) 1114 and exception-path nodes (ENs) 1115 similar in functionality to the forwarding nodes 111 of FIG. 1 in the depicted embodiment. A cell-based architecture similar to that shown in FIG. 5 or FIG. 6 may be employed for the VR instance 1102.

At least some auxiliary tasks associated with the transmission of packets between the isolated networks 1140 by VR instance, which involve the processing of messages formatted according to protocols such as BGP, IGMP, TWAMP and the like, may be performed using a combination of user-space protocol stack instances (each comprising a respective processing engine for one or more of the protocols) and protocol stack multiplexers in the embodiment depicted in FIG. 11. One or more auxiliary task offloading devices (ATODs) 1160, such as 1160A and 1160B (e.g., virtualization hosts of a virtualized computing service of the provider network, or servers which are not used for virtualization) may be selected to host a respective protocol stack multiplexer (PSM) and one or more auxiliary protocol stack instances (PSIs) for virtual router instance 1102 in the depicted embodiment. The offloading devices may, for example, be selected by control plane components of the PPS and/or the virtualized computing service of the provider network in various embodiments. PSMs and PSIs may be instantiated as part of the setup of the VR instance 1102 in some embodiments, or (e.g., in response to programmatic interactions pertaining to auxiliary tasks, similar to the messages/requests discussed in the context of FIG. 8 and FIG. 9) later in the lifetime of VR instance 1102. For example, at offloading device 1160A, PSM 1162A, PSI 1163A, PSI 1163B and PSI 1163C (with the PSM and individual PSIs each comprising one or more threads of execution) may be instantiated in the depicted embodiment, while at offloading device 1160B, PSM 1162B, PSI 1163K and PSI 1163L may be instantiated. In some embodiments, at least a portion of a PSM and/or a PSI may be implemented using a library similar to the Data Plane Development Kit (DPDK).

The number and types of PSIs set up for a VR 1102, and the number of offloading devices set up for the VR 1102, may vary over time based on factors such as the amount of application data traffic being handled via the VR, the tenancy requirements indicated by clients for auxiliary task processing, the different protocols whose messages are to be processed in auxiliary tasks for the VR, and so on. In effect, an auxiliary task offloader (ATO) of the kind discussed earlier (e.g., ATOs 373A and 373B of FIG. 3) may be implemented using a combination of a PSM 1162 and one or more PSIs 1163 in the embodiment depicted in FIG. 11. Connectivity between the forwarding plane nodes of the VR instance 1102 and the PSMs 1162 may be established using techniques similar to those discussed in the context of FIG. 7, such as via encapsulation protocol tunnels and one or more virtual network interfaces in various embodiments.

When a packet that requires an auxiliary task such as BGP processing is received at a VR 1102 configured to transmit packets between isolated networks 1140, a corresponding message indicating at least a portion of the auxiliary task may be sent to an offloading device 1160 by the VR. The message (e.g., an encapsulation packet formatted in accordance with GENEVE or another encapsulation protocol) may be received at a network interface card (MC) of the offloading device, which may store the message within one or more DMA (direct memory access) buffers in various embodiments. A PSM 1162 at the offloading device may have access to the DMA buffers, enabling the PSM to examine the message (including for example one or more encapsulation headers or other metadata associated with the contents of the message) without copying the message out of the DMA buffers in at least one embodiment.

Based at least in part on the metadata associated with and/or contained in the message, the PSM 1162 may select a particular PSI 1163, from among the set of PSIs instantiated at the offloading device 1160, to further process the message and perform the associated auxiliary task in the depicted embodiment. The metadata which may be used for the selection may include, for example, (a) an identifier of a networking protocol (e.g., BGP, IGMP, etc.) used for an encapsulated packet contained within the message, (b) a virtual router identifier, e.g., of VR instance 1102, (c) an identifier of a virtual network interface (e.g., a VM of the VR instance from which the message was sent), (d) an identifier of a client of the provider network on whose behalf the auxiliary task is to be performed, and/or (e) an identifier of an isolated network 1140 whose traffic required the auxiliary task.

The selected PSI, which may at least in some cases comprise one or more threads of execution running in user-mode or user-space (e.g., within a compute instance launched at the offloading device, or within an operating system of an un-virtualized server being used as the offloading device), may in turn examine the message and at least a portion of the associated metadata, and perform the auxiliary task. In at least some implementations, contents of the message may not have to be copied from the DMA buffers to any other location to complete the auxiliary task. A result of the auxiliary task may be provided to the PSM 1162, and transmitted by the PSM 1162 to the forwarding nodes of the VR 1102 in the depicted embodiment. There, the results of the auxiliary task may be used to transmit at least some contents of one or more packets of application data, originating at one of the isolated networks 1140, to another isolated network 1140 in various embodiments. In at least some embodiments, PSMs 1162 may implement socket-level interfaces (e.g., UNIX™ socket interfaces) for its communications with PSIs 1163.

For some types of auxiliary tasks, such as processing messages of a BGP session, state information generated with respect to one auxiliary task may have to be used when performing subsequent auxiliary tasks. According to at least some embodiments, such state information may be stored at storage devices external to the offloading device, e.g., to ensure that the state information can be accessed from a replacement PSI if the original PSI being used fails. A number of approaches with respect to storing such state information are discussed below in further detail.

The PSIs 1163 at a given offloading device 1160 may run independently of each other, e.g., within respective software containers in some embodiments. In some cases, multiple protocol processing engines for the same protocol used for auxiliary tasks, such as BGP, may be run at respective PSIs 1163, e.g., with each PSI handling messages of the same protocol within independent address spaces. As a result, the PSM 1162 at the offloading device may be able to easily multiplex multiple received encapsulated packets which are apparently directed to the same address, but are being used for auxiliary tasks of different VRs or different clients. For example, a first message may be received at an offloading device, indicating a particular IP address as the destination of an encapsulated packet within the message. The PSM of the offloading device may select a first PSI to process the message using metadata associated with the first message. If a second message also indicating the same IP address as a destination is received at the PSM, and the metadata associated with the second message indicates that a different PSI should be used, the PSM may cause a different PSI to process the second message, despite the identical destination IP address.

In at least some embodiments, PSIs and/or PSMs may be used in multi-tenant mode or in single-tenant mode, e.g., based on tenancy requirements or requests received from clients on whose behalf the associated VRs are established. For example, a request similar to the SetAuxiliaryTaskResourceTenancy request 917 of FIG. 9 may be submitted by a client to indicate tenancy preferences. If a PSI is configured in multi-tenant model it may be used for auxiliary tasks associated with (a) traffic flowing between isolated networks programmatically attached to a particular VR at the request of one client as well as (b) traffic flowing between isolated networks programmatically attached to the particular VR, or a different VR, at the request of another client.

In various embodiments, one PSI at an offloading device may implement the same transport layer protocol and application layer protocol of the OSI model as another PSI at the same offloading device, but the two PSIs may be used on behalf of different clients or different VRs. Of course, different PSIs at a given offloading device may implement entirely different protocols in some embodiments—e.g., one PSI may include a BGP processing engine, another may include an IGMP processing engine, and so on. In various embodiments, a client on whose behalf a VR such as VR 1102 is set up may be able to submit programmatic requests for metrics collected with respect to individual protocols (e.g., BGP, IGMP, etc.) used for auxiliary tasks on their behalf, and receive the requested metrics. For example, messages similar to AuxiliaryTaskMonitoringRequirements message 921 and GetAuxiliaryTaskMetrics 925 of FIG. 9 may be submitted by clients to indicate the kind of metrics they wish to obtain, and the requested metrics may be gathered from the PSIs.

Example Protocols used for Auxiliary Tasks

Auxiliary tasks for traffic processed via virtual routers may utilize any of a number of different protocols (which may be referred to as auxiliary task protocols) in various embodiments. FIG. 12 illustrates an example set of protocols for which respective protocol stack instances may be run at a device with a protocol stack multiplexer, according to at least some embodiments. As shown, the protocols 1210 for which PSIs similar to PSIs 1163 of FIG. 11 may be instantiated at offloading devices may include various versions of BGP 1220 and its variants (e.g., internal BGP or iBGP, external BGP or eBGP, multi-protocol BGP or MP-BGP), which may be used for dynamic routing information exchange in various embodiments, or versions/variants of IGMP 1225.

Performance measurement protocols 1230, such as TWAMP (Two-Way Active Measurement Protocol) or OWAMP (Two-Way Active Measurement Protocol) may be used for auxiliary tasks in some embodiments. Security protocols 1240 (e.g., protocols of the IP Security (IPSec) suite or other similar suites), which may involve cryptographic computations for encryption or decryption of application data packet contents, may be used for some VR-based applications in the depicted embodiment.

In at least some embodiments, PSIs may be established for proprietary routing information exchange protocols 1245 (also referred to as custom routing information exchange protocols) used within the provider network at which VRs are configured. In one embodiment, a client whose traffic is being transmitted via a VR may indicate a custom protocol 1250 to be used for auxiliary tasks for at least a subset of packets flowing between specified isolated networks, and PSIs may be set up for such custom protocols as well.

In scenarios in which multiple versions of a given protocol may have to be used, e.g., in response to preferences indicated by clients of the packet processing service, any of several approaches may be taken with respect to support for the different versions. In some cases, respective PSIs may be implemented for each of the versions; in other cases, a single PSI which can proOcess packets of several different versions of the protocol may be employed.

In one embodiment, a given PSI may include respective protocol processing engines for several protocols similar to, or including, those shown in FIG. 12.

Example Interactions Between Stack Multiplexers and Protocol Stack Instances

Figure 13:
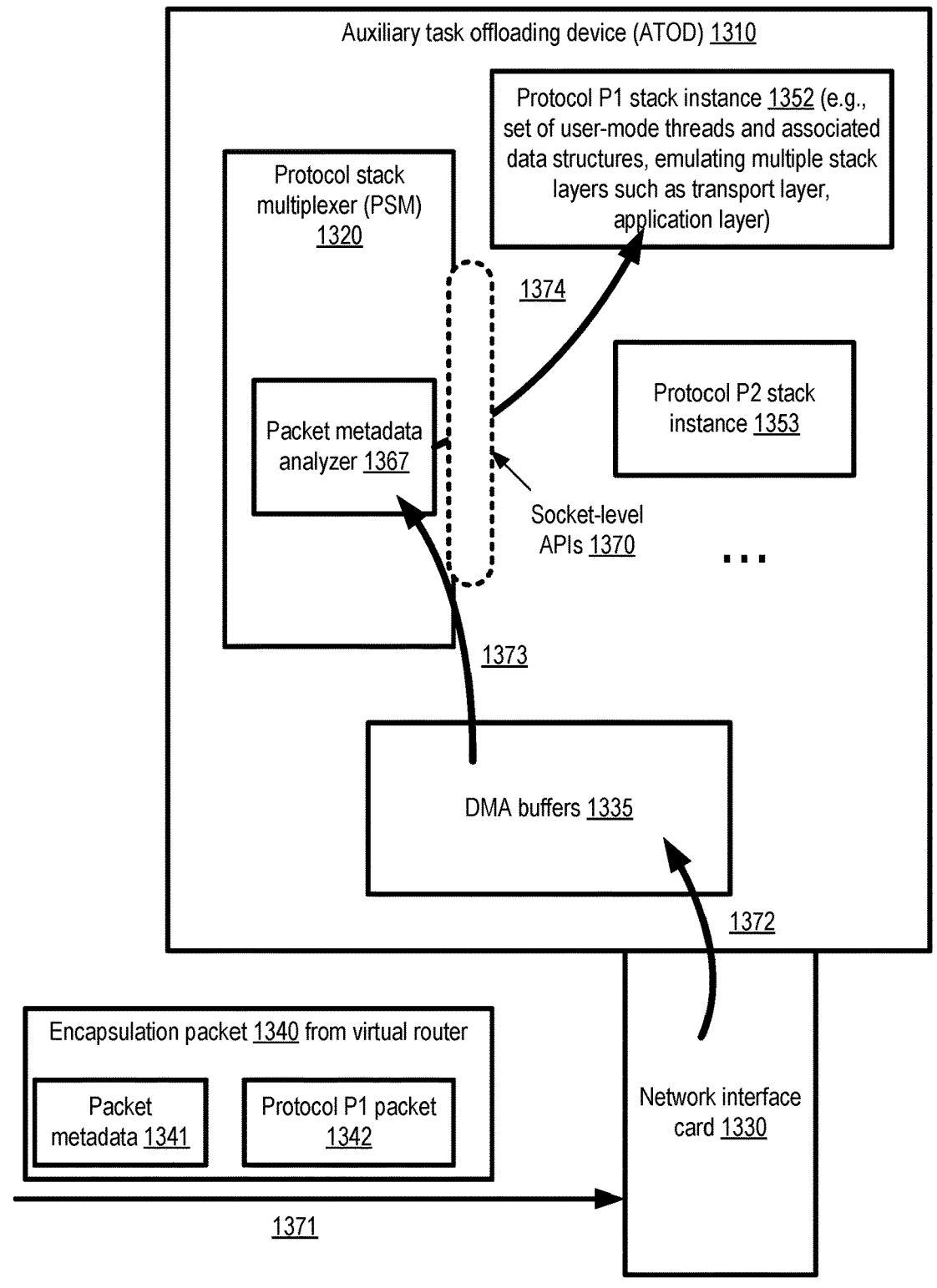
FIG. 13 illustrates an example set of interactions between components of an auxiliary task offloading device at which a protocol stack multiplexer may be configured for a virtual router, according to at least some embodiments.

FIG. 13 illustrates an example set of interactions between components of an auxiliary task offloading device at which a protocol stack multiplexer may be configured for a virtual router, according to at least some embodiments. An encapsulation packet 1340 may be received from a virtual router at a network interface card 1330 of an auxiliary task offloading device (ATOD) 1310 in the depicted embodiment, as indicated by arrow 1371. The encapsulation packet may include an encapsulated packet 1342 formatted according to an auxiliary protocol P1 (such as BGP, IGMP, or the like) as well as packet metadata 1341 (e.g., in the form of headers generated during the encapsulation of protocol P1 packet 1342). As mentioned earlier, in some embodiments, the GENEVE protocol may be used to prepare the encapsulation packet. In other embodiments, other encapsulation protocols may be used. The protocol P1 packet 1342 may comprise its own headers, which may include additional metadata in at least some embodiments.

The network interface card 1330 may store the received encapsulation packet 1340 within one or more DMA buffers 1335 of the ATOD 1310 in the depicted embodiment, as indicated by arrow 1372. A protocol stack multiplexer (PSM) 1320 comprising one or more threads of execution may have been instantiated earlier at the ATOD. Depending on the implementation, the PSM may comprise one or more kernel-mode threads, one or more user-mode threads, and/or a combination of user-mode and kernel-mode threads. In some embodiments, the PSM may be implemented as part of a virtualization manager. A packet metadata analyzer 1367 of the PSM 1320 may examine the metadata 1341 (and/or other metadata included within the protocol P1 packet 1342) to select a particular protocol stack instance, from among one or more protocol stack instances running at the ATOD 1310, which should further process the contents of encapsulation packet 1340 and perform the corresponding auxiliary task required. The PSM may implement a set of socket-level APIs 1370 for communication with the protocol stack instance(s) such as protocol P1 stack instance 1352, protocol P2 stack instance 1353, and the like.

Protocol P1 stack instance 1352 may comprise a set of user-mode or user-space threads and associated data structures that collectively emulate multiple layers of a protocol stack, such as a transport layer and an application layer in the depicted embodiment.

Collectively, the threads of a given protocol stack instance may interpret the contents of a message formatted according to an auxiliary protocol such as BGP, examine state information generated as a result of earlier messages of the auxiliary protocol (in the case of stateful protocols), determine what actions if any need to be taken based on the received message (e.g., changing state information such as BGP attributes used to select optimal next hops, storing an indication of current membership of a multicast group, etc.), and implementing such actions. As such, a given protocol stack instance may be described as comprising a protocol processing engine for an auxiliary protocol in various embodiments. In at least some embodiments, copying of the contents of the encapsulation packet 1340 from DMA buffers 1335 may not be required: e.g., the packet metadata analyzer 1367 may simply examine the DMA buffers (arrow 1373) and pass a pointer to the DMA buffers to the protocol P1 stack instance (arrow 1374). Such "zero-copy" techniques may be much more efficient for processing received network messages than techniques in which message contents are copied from one set of memory locations to another.

The results of the processing of the encapsulation packet at the selected protocol stack instance 1352 (e.g., new routes, multicast group membership information, etc.) may be transmitted back to the PSM 1320 via the socket-level APIs 1370 in some embodiments, and sent on to the virtual router via the network interface card 1330. In at least one embodiment, the PSM may be responsible for encapsulating the results according to the encapsulation protocol being used for communications with the virtual router. In other embodiments, the protocol stack instance may encapsulate the results. In some embodiments, a given encapsulation packet received at the offloading device may be processed by more than one protocol stack instance, and the results of the processing may be combined at the multiplexer before being sent back in a single packet or message to the virtual router.

Figure 14:
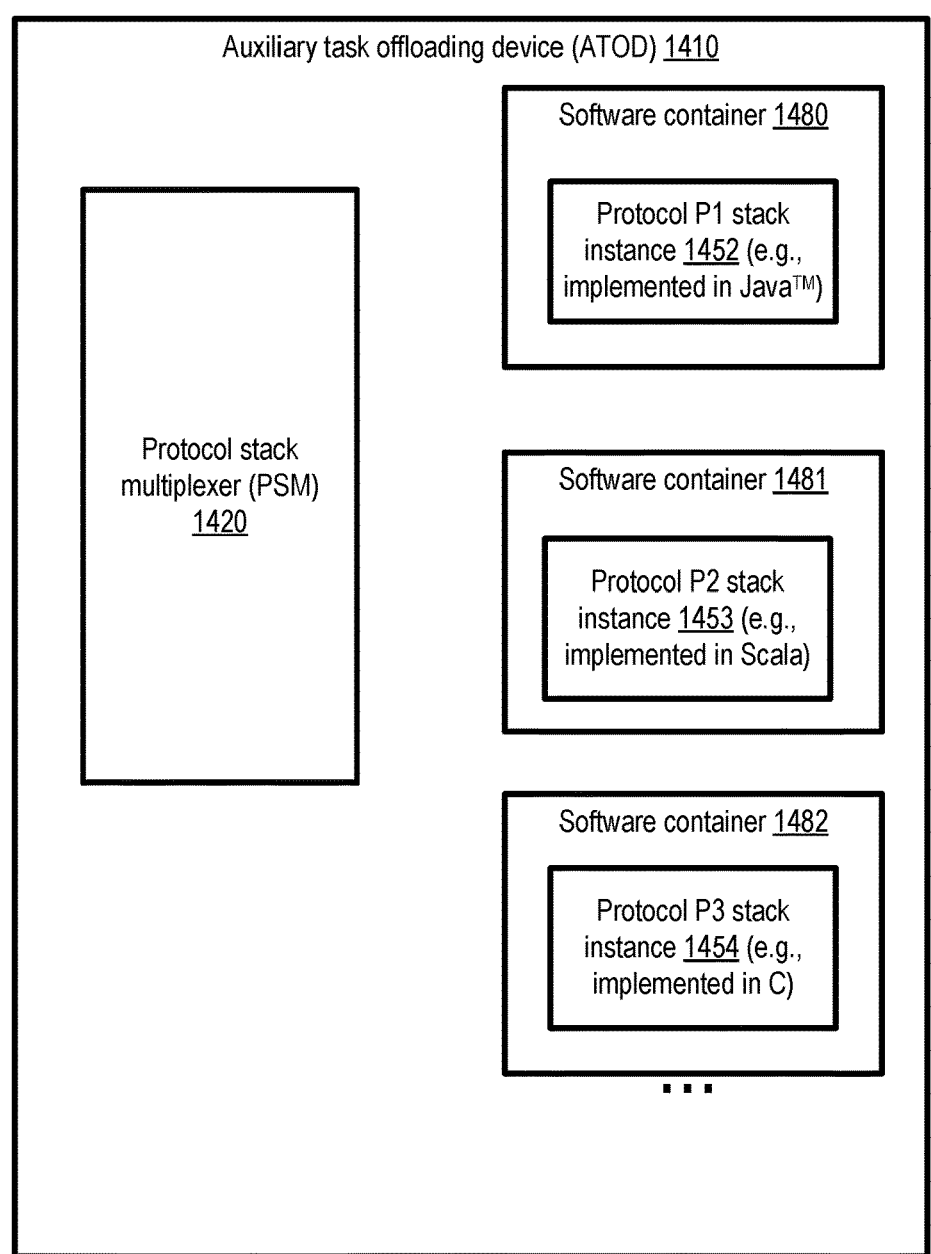
FIG. 14 illustrates an example scenario in which protocol stack instances developed in several different programming languages may be executed within respective software containers at an auxiliary task offloading device, according to at least some embodiments.

In at least some embodiments, protocol stack multiplexers of the kind introduced above may be agnostic with respect to the programming languages and/or runtime environments used for protocol stack instances. FIG. 14 illustrates an example scenario in which protocol stack instances developed in several different programming languages may be executed within respective software containers at an auxiliary task offloading device, according to at least some embodiments. An auxiliary task offloading device 1410 comprises a protocol stack multiplexer 1420 which implements a set of PSM APIs for interactions with protocol stack instances. Protocol P1 stack instance 1452, implemented in Java™, may be executed within a software container 1480 in the depicted embodiment. Protocol P2 stack instance 1453, implemented in Scala, runs within a second software container 1481, while protocol P3 stack instance 1454 is implemented in C and runs within a third software container 1482. Such flexibility with respect to programming languages and associated runtime environments may make it easier for a packet processing service to collect protocol stack instances from a wide variety of development groups in various embodiments. Each development group or individual developer may package the code for their protocol stack instance within a software container whose contents cannot be easily modified, and several such containers may be executed at the same ATOD without interfering with each other. In some embodiments, a client of the packet processing service may provide a software container comprising custom processing code to be used for auxiliary tasks performed with respect to traffic between the client's isolated networks, and such a container may be deployed at an ATOD.

FIG. 15 illustrates an example scenario in which multiple independent instances of a given protocol stack may be executed concurrently at an auxiliary task offloading device, according to at least some embodiments. In the depicted embodiment, ATOD 1510 includes a protocol stack multiplexer (PSM) 1520 and at least three protocol stack instances.

Protocol P1 stack instance 1552, configured in multi-tenant mode, is used for auxiliary tasks associated with traffic handled by a virtual router VR1 set up for a client C1 of a packet processing service, as well as for auxiliary tasks associated with traffic handled by a virtual router VR4 for a different client C4. Protocol P2 stack instance 1553A is configured at ATOD 1510 for implementing auxiliary tasks associated with traffic handled by a virtual router VR2 set up for client C1. Messages formatted according to protocol P2 can also be processed at another stack instance at the ATOD 1510 in the depicted embodiment: protocol P2 stack instance 1553B, established for implementing auxiliary tasks associated with traffic handled by a virtual router VR3 set up for a client C2. The two protocol stack instances operate independently of one another, and as a result, overlapping address ranges among packets processed at stack instances 1553A and 1553B can be easily managed. For example, one encapsulated packet received at ATOD 1510 with a destination IP address D1 (e.g., an address of a BGP engine BE1 which is participating in a BGP session with a BGP engine BE2 outside the provider network) may be processed at stack instance 1553A, while another packet received at ATOD 1510 with the same destination IP address D1 may be processed at stack instance 1553B.

Multi-tenancy may be implemented at several levels in the embodiment depicted in FIG. 15. First, ATOD 1510 as a whole may be considered multi-tenant mode, in that auxiliary tasks for several different clients (C1, C2, and C3) of the packet processing service are implemented using the ATOD. Second, a single protocol stack instance such as protocol P1 stack instance 1552 can operate in multi-tenant mode, in that it performs auxiliary tasks for clients C1 and C3. In at least some embodiments, as discussed earlier in the context of FIG. 9, a client may indicate preferences regarding the tenancy mode to be used for the resources to be used for their auxiliary tasks, and the packet processing service may configure ATODs and protocol stack instances accordingly. If a client requests single tenancy, for example, an ATOD may be configured or assigned solely for that client's auxiliary tasks in one embodiment. In some embodiments, clients may specify tenancy requirements at the device (ATOD) level or at the protocol stack instance level.

Example Auxiliary Task State Information Management

Depending on the kinds of auxiliary tasks being performed, state information that applies to multiple messages exchanged between a virtual router and an auxiliary task offloading device may have to be maintained in some embodiments. For example, Transmission Control Protocol (TCP) connection state information may have to be stored for some protocol processing stacks. FIG. 16 illustrates examples of alternative approaches for saving protocol state information associated with auxiliary tasks of a virtual router, according to at least some embodiments.

In protocol stack state management approach A, protocol stack instance 1652 is run within a process 1653 (such as a Java™ virtual machine or JVM) which uses a garbage-collected heap for memory management at an execution environment (EE) 1610 (such as a compute instance or a non-virtualized server). In order to ensure that state information associated with auxiliary tasks processed using protocol stack instance is not lost permanently in the event that process 1653 crashes or terminates unexpectedly, an off-heap data structure 1660 such as a hash table that does not utilize the heap may be used to store state information in a persistent manner in the depicted embodiment. A new protocol stack processing instance process may be started as a replacement in the event of a termination of process 1653, and the new process may access the off-heap data structure. Note that the state information may be lost in approach A if the execution environment 1610 crashes or terminates unexpectedly.

In protocol stack state management approach B, a separate persistent state management process (PSMP) 1623 (as opposed to just an off-heap data structure) may be assigned to manage the state information of auxiliary tasks processed at protocol stack instance process 1622 in some embodiments. The PSMP 1623 may have a longer lifetime than the stack instance process 1622. The process 1622 that performs the computations of the auxiliary tasks may be run at the same EE 1611 as the PSMP 1623 in the depicted embodiment; as such, the premature termination or failure of the EE may potentially still lead to the loss of state information.

In protocol stack state management approach C, a distributed technique may be employed for state information management in the depicted embodiment. A persistent state management cluster 1640 comprises several different PSMPs such as 1624A and 1624B may be configured, with each PSMP running within a separate EE 1613 (e.g., 1613A or 1613B) than the EE 1612 at which protocol stack instance process 1632 is run. Any given PSMP of the cluster 1640 may be able to take over the responsibilities of a PSM which fails. Furthermore, as state information of the auxiliary tasks changes, it may be propagated to resources at one or more services usable for persistent storage of a provider network, such as database service 1601 in the depicted embodiment. If desired by the clients on whose behalf the auxiliary tasks are being performed, the state information may be provided to or made accessible to the clients via a notification server 1602 or a message queueing service 1603 in some embodiments.

Methods for Offloading Auxiliary Tasks using Protocol Stack Multiplexing

FIG. 17 is a flow diagram illustrating aspects of operations that may be performed to offload some types of tasks from virtual routers using a protocol stack multiplexer and independent instances of protocol stacks, according to at least some embodiments. As shown in element 1701. An execution environment (EE), such as a compute instance of a virtualized computing service or a non-virtualized server, may be identified by a packet processing service's control plane to perform offloaded auxiliary protocol tasks at an offloading device for one or more virtual routers in the depicted embodiment. In one embodiment, one or more such EEs may be configured at the time that a virtual router is established; in other embodiments, an EE may be configured later in the lifetime of a virtual router, e.g., in response to programmatic requests indicating one or more categories of auxiliary tasks to be performed with respect to the traffic being routed/forwarded via the virtual router(s).

A protocol stack multiplexer (PSM) (e.g., a process or thread which can access DMA buffers into which received network packets are placed by a network interface card at the offloading device used for the EE) may be launched at the EE (element 1704) in various embodiments, e.g., by the control plane of the packet processing service. In addition, one or more protocol stack instances (PSIs) comprising threads running in user space or user mode (as opposed to running in privileged or kernel mode) may be launched at the execution environment. A PSI may implement or emulate the functionality of one or more Open Systems Interconnection network stack layers (e.g., network layer, transport layer, or application layer) needed to perform one or more types of auxiliary tasks associated with network traffic which is transmitted via the virtual routers, and execute any additional logic needed to process messages associated with the auxiliary tasks. Individual ones of the PSIs may implement processing engines for one or more of the protocols (e.g., BGP, IGMP, TWAMP, etc.) used for auxiliary tasks in various embodiments. In at least some embodiments, a cell-based architecture similar to the architecture discussed in the context of FIG. 5 and FIG. 6 may be used for the virtual routers and/or the resources set up for the auxiliary protocol tasks. In some embodiments, at least some PSIs may comprise one or more kernel-mode or privileged threads.

Network connectivity may be established between the virtual router(s) and the EE, e.g., by configuring one or more virtual network interfaces and/or encapsulation protocol tunnels in various embodiments (element 1707). Techniques similar to those shown in FIG. 7 may be employed for enabling communication in some embodiments, e.g., including establishment of a GENEVE tunnel, storing metadata at the exception path nodes of a virtual router indicating an address of a virtual network interface of a cell of autonomous task processing resources as a destination for packets that indicate the auxiliary tasks to be performed, and storing metadata at the EE indicating one or more addresses of virtual network interfaces of the virtual router as a destination for results of auxiliary tasks.

After the connectivity has been established between the EE and the VR(s), at some point a message indicative of an auxiliary task which is to be performed may be received at an EE from a VR (element 1710) which was established to transfer packets between isolated networks IN1 and IN2 in various embodiments. The message may comprise metadata (e.g., including contents of headers of an encapsulation protocol such as GENEVE) pertaining to an encapsulated packet (e.g., a packet sent by a BGP processing engine at a premise external to the provider network) incorporated within the message in some embodiments. The metadata may include, for example, (a) an identifier of a networking protocol used for an encapsulated packet within the message, (b) a virtual router identifier of the VR from which the message is received, (c) an identifier of a virtual network interface, (d) an identifier of a client of the provider network, or (e) an identifier of an isolated network whose traffic is being routed via the virtual router.

The PSM may examine the metadata and determine which particular PSI (e.g., PSI-1) running at the EE should process the message further (element 1713). In at least some embodiments, the message contents may not have to be copied from the DMA buffers for the analysis by the PSM, or for the processing of the message contents by the selected PSI.

The selected PSI, PSI-1, may analyze the contents of the message, perform the auxiliary tasks necessitated by the contents of the message, and transmit results of the auxiliary tasks to the PSM in various embodiments (element 1716). In at least some embodiments, the PSM may implement a set of socket-level or socket-layer programmatic interfaces, and PSI-1 may transmit the results to the PSM via such interfaces. In some embodiments, PSI-1 may save state information (e.g., TCP connection state, protocol-specific sequence number information, etc.) pertaining to its auxiliary tasks to a storage device external to the EE. In some embodiments, a PSI and/or the EE at which a PSI runs may be configured in single-tenant mode, e.g., at the request of a client for whom the VR was established. In other embodiments, a given EE and/or a given PSI may process auxiliary tasks for several different clients and/or for several different VRs in multi-tenant mode.

The PSM may transmit the results to the VR from which the message was received in the depicted embodiment (element 1719). At the VR, the results of the auxiliary tasks may be used to transmit at least some packets between IN1 and IN2 (element 1722) in the depicted embodiment.

Figure 18:
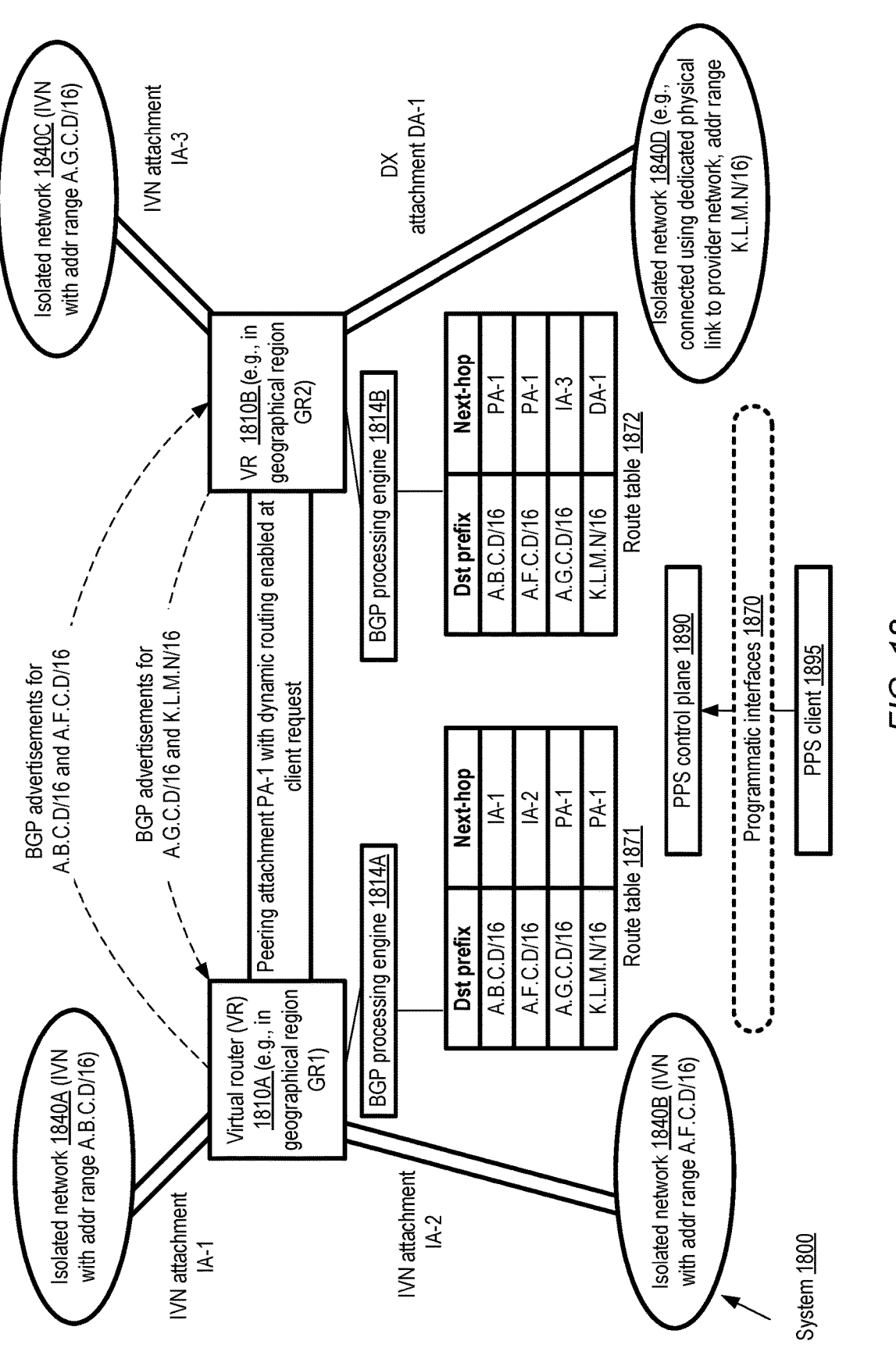
FIG. 18 illustrates an example system environment in which dynamic routing involving the exchange of routing information using Border Gateway Protocol (BGP) processing engines may be enabled for a peered pair of virtual routers at the request of a client of a packet processing service, according to at least some embodiments.

Example System Environment with Dynamic Routing Enabled for Peered Virtual Routers In some embodiments paths that include more than one virtual router may be required for transferring traffic between isolated networks, e.g., in scenarios in which the traffic has to be transmitted across continental, national, state or regional boundaries. Pairs of virtual routers may be programmatically attached to each other for such traffic. Such VR-to-VR attachments may be referred to as "peering attachments" and the attached VRs may be said to be peered with one another. FIG. 18 illustrates an example system environment in which dynamic routing involving the exchange of routing information using Border Gateway Protocol (BGP) processing engines may be enabled for a peered pair of virtual routers at the request of a client of a packet processing service, according to at least some embodiments. In system 1800, a pair of virtual routers (VRs) 1810A and 1810B may be configured or established, e.g., in response to programmatic requests of one or more clients of a packet processing service (PPS) similar to the packet processing service discussed earlier received via programmatic interfaces 1870 at the PPS control plane 1890. VR 1810A may, for example, be established in a geographical region GR1 (e.g., using computing devices within one or more provider network data centers located in country C1 or state S1) and VR 1810B may be established in another geographical region GR2 (e.g., using computing devices within one or more provider network data centers located in country C2 or state S2).

The VRs 1810A and 1810B may be programmatically attached to one another, and to one or more isolated networks, in response to programmatic attachment requests submitted by the clients on whose behalf the VRs and the isolated networks are configured in the depicted embodiment. A given attachment with a VR may belong to one of several categories in the depicted embodiment, such as an WN attachment (which associates an isolated virtual network (IVN) of a virtualized computing service (VCS) with a VR), a DX attachment (which associates an isolated network at a client premise, connected via a dedicated physical link to the provider network, with a VR), a VPN attachment (which associates an isolated network at a client premise, connected via one or more VPN tunnels to the provider network, with a VR), a peering attachment (which associates two VRs), an SD-WAN attachment (which associates a client's software-defined wide area network appliance with a VR) and so on. In the scenario depicted in FIG. 18, isolated network 1840A (comprising an IVN) and isolated network 1840B (comprising another WN) may both be programmatically attached to VR 1810A via IVN attachments IA-1 and IA-2 respectively. In addition, isolated network 1840A (comprising an WN) may be attached via WN attachment IA-3 to VR 1810B, and isolated network 1840D (which comprises resources at a client premise external to the data centers of the provider network) may be attached to VR 1810B via DX attachment DA-1. A peering attachment PA-1 may be set up between VR 1810A and VR 1810B. Each of these five attachments (IA-1, IA-2, IA-3, DA-1 and PA-1) may be set up in response to one or more programmatic requests from a client 1895 of the packet processing service (PPS) in the depicted embodiment.

Based at least in part on input received via the programmatic interfaces 1870, e.g., either as part of a peering attachment request for PA-1 or subsequent to the peering of the two VRs 1810A and 1810B, the transfer of dynamic routing information in accordance with a version or variant of BGP may be enabled between the VRs 1810A and 1810B in the depicted embodiment. In scenarios in which multiple paths are available for transmitting application data packets between isolated networks, the routing information may enable more optimal paths to be chosen dynamically at the virtual routers for the application data packets. This type of routing may be referred to as dynamic routing in various embodiments. In at least some embodiments, any of several different factors such as bandwidth availability, latency, historical congestion patterns, and/or agreements with intermediary or transit network providers may be taken into account at the virtual routers when choosing the next hops or paths for application data packets when dynamic routing is enabled.

In addition to enabling the transfer of dynamic routing information, in at least some embodiments a client may use the programmatic interfaces 1870 to provide a group of one or more dynamic routing protocol configuration settings to be used for the transfers. Such settings may indicate various preferences of the client with respect to aspects of the routing information transfers. One such setting may, for example, include a filter rule to be used to determine whether a route to a particular destination is to be transferred from one VR to the other. Another setting may indicate a respective priority to be assigned to individual ones of a plurality of routing-related attributes to select a next hop to a destination, such as: (a) a local preference attribute, (b) a local prefix origin attribute, (c) an autonomous system (AS) path length attribute, (d) a multi-exit discriminator attribute, or (e) a router identifier attribute. A local preference may indicate the respective preference to be used by a VR for different available paths using a numerical value propagated, for example, in route updates from BGP neighbors of the VR in the same autonomous region. Clients may use local preference to influence preferred exit points among multiple exit points of an autonomous system. In one embodiment, routes with the highest local preference values (among the available alternate routes) may be selected for packets by a VR. A local prefix origin attribute may be used at a VR to prefer paths that are in an WN that is directly attached to the VR, when alternative paths that involve other VRs are also available in some embodiments. A VR may choose the path with the shortest AS path length (among the available alternate paths) in embodiments in which the AS path length attribute is used. Multi-exit discriminators (MEDS) may be obtained at a VR from BGP neighbors in a different AS in some embodiments, and the VR may choose the path with the lowest MED when alternative paths with different NEDs are available. Numeric router identifiers may be assigned to each VR as well as to client-owned hardware routers, SD-WAN appliances and the like in some embodiments; among alternative paths which involve transfers to respective routers, the path of the router with the lowest router identifier may be selected if none of the other attributes being considered leads to a preference in one embodiment. In some embodiments, the client-specified settings may indicate a specific variant and/or version of BGP to be used, such as iBGP, eBGP, MP-BGP and the like, and/or a CIDR (classless inter-domain routing) block from which an address is to be assigned to a BGP processing engine associated with a VR 1810. Other parameters governing the transfer of routing information may be specified by a client in some embodiments via the interfaces 1870.

In accordance with the request for enabling dynamic routing information transfer, a respective BGP processing engine 1814 may be established or instantiated in various embodiments for the two VRs in the depicted embodiment. BGP processing engine 1814A may be configured for VR 1810A, and BGP processing engine 1814B may be set up for VR 1810B, for example. One or more BGP sessions may be initiated between the two processing engines to exchange dynamic routing information that enable network packets to be forwarded by each of the VRs to isolated networks via the other VR, in accordance with the configuration settings indicated by the client in the depicted embodiment. Transfers of routing information from one BGP processing engine to the other with respect to various sets of destination endpoints may be referred to as "advertising" the routing information.

Each of the virtual routers may maintain at least one route table associated with peering attachment PA-1 in the depicted embodiment. Thus, route table 1871 is maintained by VR 1810A, while route table 1872 is maintained by VR 1810B. Entries in a given route table may indicate the next hops for various groups of destination endpoints, referred to as destination prefixes, and specified in CIDR format in FIG. 18.

Isolated network 1840A comprises a set of network endpoints with IP version 4 addresses in the range A.B.C.D/16 (expressed in CIDR notation) in the depicted example scenario. Isolated network 1840B comprises a set of network endpoints with IP version 4 addresses in the range A.F.C.D/16. Isolated network 1840C comprises a set of network endpoints with IP version 4 addresses in the range A.G.C.D/16, while isolated network 1840D comprises a set of network endpoints with IP version 4 addresses in the range K.L.M.N/16. In order to enable traffic to flow via the peering attachment PA-1, BGP processing engine 1814A transmits advertisements for A.D.C.D/16 and A.F.C.D/16 to BGP processing engine 1814B, while processing engine 1814B transmits advertisements for A.G.C.D/16 and K.L.M.N/16 to BGP processing engine 1814A in the depicted embodiment. As a result, route table 1871 is populated with one entry showing the peering attachment PA-1 as the next hop for destinations in the A.G.C.D/16 range or destination prefix (Dst prefix), and another entry showing the peering attachment PA-1 as the next hop for destinations in the K.L.M.N/16 range. Route table 1872 is populated with entries indicating PA-1 as the next hop based on advertisements for A.B.C.D/16 and A.F.C.D/16, received from BGP processing engine 1814A at BGP processing engine 1814B in the depicted scenario.

The route tables 1871 and 1872 may also include next-hop entries for the isolated networks attached directly to the corresponding VR in the depicted embodiment. For example, an entry showing IA-1 as the next hop for A.B.C.D/16 is included in route table 1871, and another entry showing IA-2 as the next hop for A.F.C.D/16 is also included. Similarly, an entry showing IA-3 as the next hop for A.G.C.D/16 is included in route table 1872, and another entry showing DA-1 as the next hop for K.L.M.N/16 is also included. In some embodiments, some or all of the isolated networks 1840 may comprise their own BGP processing engines. For example, advertisements for K.L.M.N/16 may be transmitted from another BGP processing engine configured within isolated network 1840D to BGP processing engine 1814B.

The dynamic routing information (e.g., BGP advertisements) transferred among the VRs according to the client's configuration settings may be used to transfer network packets from one isolated network to another in the depicted embodiment. For example, if a packet originating in isolated network 1840A is directed to an address in the range K.L.M.N/16, the entry for K.L.M.N/16 in route table 1871 may be utilized at VR 1810A to transmit the packet via PA-1 to VR 1810B, from where it may be forwarded to isolated network 1840D based on the entry for K.L.M.N/16 in route table 1872. While attachment identifiers (IA-1, IA-2, IA-3 and DA-1) are used to indicate next hops in FIG. 18, such attachment identifiers may be translated to corresponding virtual network interface (VNI) identifiers or addresses (each VM configured for one of the attachments) to transfer the packets in at least some implementations. Note that because routing information is exchanged dynamically between the BGP processing engines of the virtual routers, static routes may not have to be supplied by clients to enable network packets to be transmitted between any of the isolated networks in the depicted embodiment. In some embodiments, while static routes may not be required, a client may nevertheless specify static routes if desired.

In some embodiments, the BGP processing engines 1814 may be instantiated at offloading resources such as the auxiliary task offloaders discussed earlier. In other embodiments, such offloading techniques may not be required, and the BGP processing engines may be launched at the same resources used for one of the VR nodes. In some embodiments, protocols other than BGP or its variants may be used for transferring at least some of the routing information between virtual routers—for example, a custom protocol developed at the provider network may be used.

Figure 19:
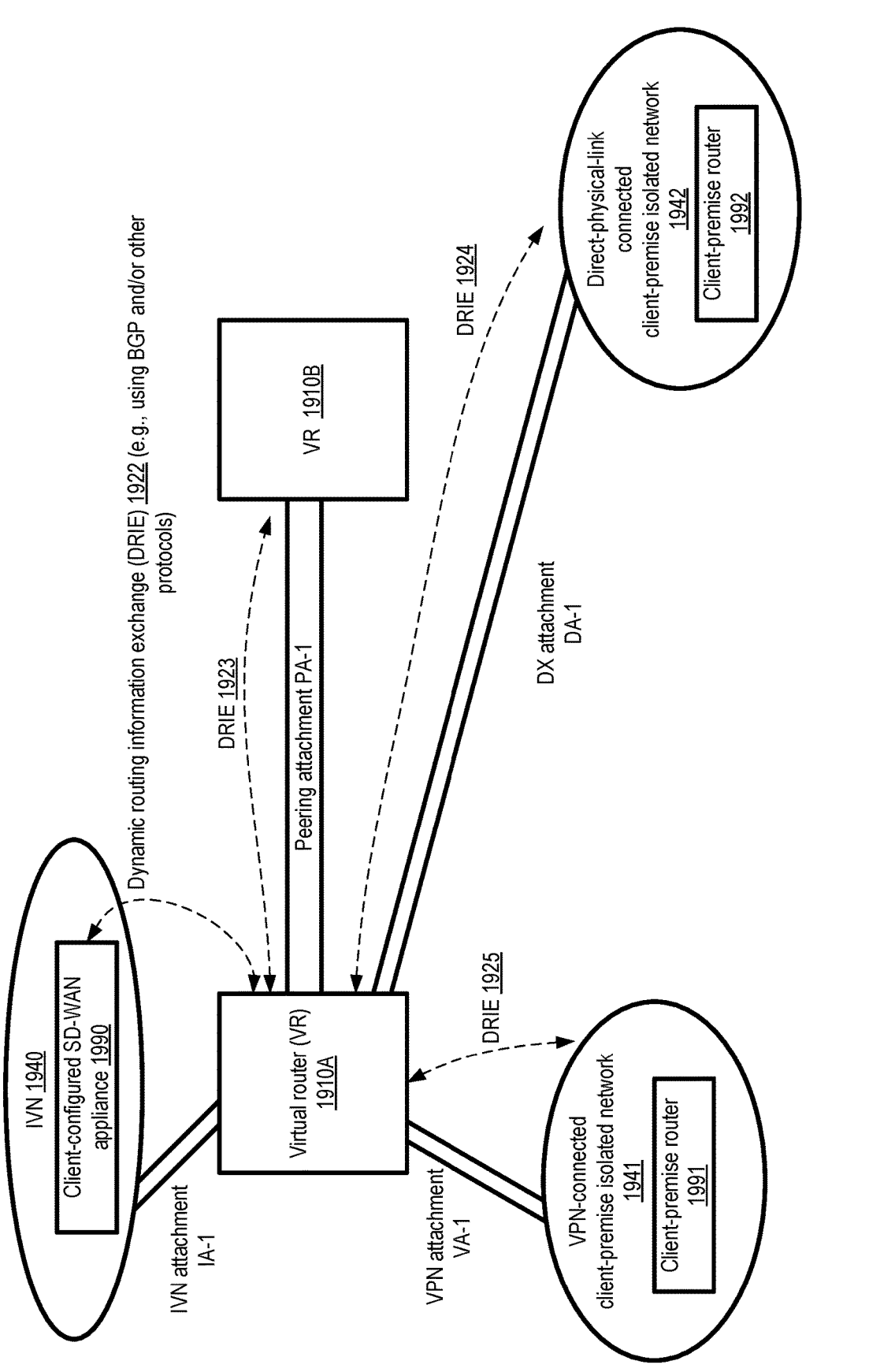
FIG. 19 illustrates an example scenario in which dynamic routing information exchange may be enabled for several different types of programmatic attachments of a virtual router, according to at least some embodiments.

FIG. 19 illustrates an example scenario in which dynamic routing information exchange may be enabled for several different types of programmatic attachments of a virtual router, according to at least some embodiments. As mentioned above, virtual routers may be attached to other sources of routing information via any of several different kinds of attachments, e.g., in response to programmatic requests from clients of a PPS. The different kinds of attachments may different from one another in the kinds of metadata that may be stored for them at the PPS control plane (e.g., including the kinds of protocol processing engines to be used for routing information associated with the attachment, route tables associated with the attachment, respective limits on the amount or rate of traffic that can be transferred, the manner and frequency of updating routing information associated with the attachments, virtual network configuration information for the attachments, etc.) in some embodiments.

In the embodiment depicted in FIG. 19, a VR 1910A is attached to four other entities. WN 1940, comprising a client-configured SD-WAN (software-defined wide area network) appliance 1990 is attached to VR 1910A via an WN attachment IA-1. A VPN-connected client-premise isolated network 1941 (i.e., an isolated network comprising network endpoints and resources at a premise external to the provider network at which the VR 1910A is established) comprising a client-premise router 1991 is attached to VR 1910A via a VPN attachment VA-1. A direct-physical-link-connected client-premise isolated network 1942 (i.e., an isolated network comprising network endpoints and resources at a premise external to the provider network at which the VR 1910A is established) comprising a client-premise router 1992 is attached to VR 1910A via a DX attachment DA-1. In addition, another VR 1910B is attached to VR 1910A via a peering attachment PA-1.

Each of the entities to which VR 1910A is attached may comprise a respective protocol processing engine for a dynamic routing information exchange protocol (such as a BGP variant, or a custom protocol) in the depicted embodiment. As such, dynamic routing information exchange may be enabled between each pair of attached entities, as indicated by the bidirectional dashed arrows labeled dynamic routing information exchange (DRIE) 1922, DRI 1923, DRE 1924 and DRIE 1925. In some embodiments, different protocols may be used for dynamic routing information exchange between different pairs of entities— e.g., protocol P1 (and associated protocol processing engines PE1) may be used to exchange routing information between VRs 1910A and 1910B, while protocol P2 (and associated engine protocol processing engines PE2) may be used for exchanging routing information between IVN 1940 and VR 1910A.

Example use of Custom Protocol while Maintain BGP Compatibility

Figure 20:
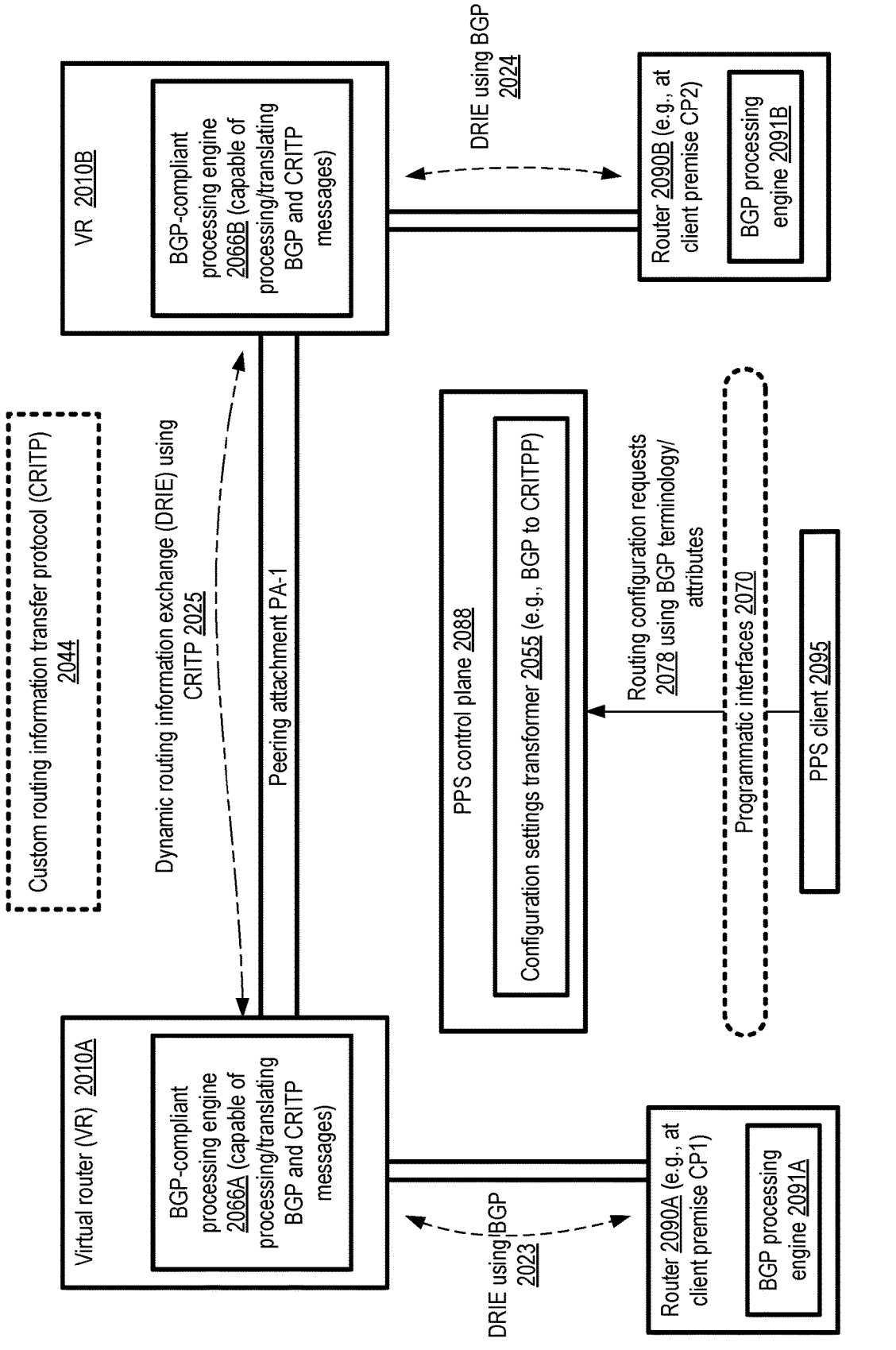
FIG. 20 illustrates an example scenario in which a custom protocol for routing information transfer may be employed by virtual routers to exchange information which is originally transmitted to the virtual routers using BGP, according to at least some embodiments.

FIG. 20 illustrates an example scenario in which a custom protocol for routing information transfer may be employed by virtual routers to exchange information which is originally transmitted to the virtual routers using BGP, according to at least some embodiments. In the embodiment depicted in FIG. 20, a PPS client 2095 may submit routing configuration requests 2078 (e.g., including the kinds of settings discussed above, which control aspects of the transfer of routing information) using BGP terminology and attributes via programmatic interfaces 2070. Internally, the PPS control plane 2088 may utilize a custom routing information transfer protocol (CRITP) 2044 for transferring routing information between VRs, while still maintaining compatibility with BGP from the clients' perspective. A custom protocol may be preferred for internal use for a variety of reasons in different embodiments, such as the ability to avoid implementing some of the less-frequently utilized functionality of BGP, removing some of the constraints imposed by BGP (such as limits of the amount of routing information that can be transferred within a given BGP session), etc. In the depicted embodiment, a configuration settings transformer 2055 may translate the BGP-based routing configuration requests 2078 into a format used for CRITP 2044.

Messages of dynamic routing information exchanges (DRIEs) between client premises and the VRs 2010 may continue to be formatted according to BGP in the depicted example scenario, as indicated by labels 2023 and 2024. For example, a BGP processing engine 2091A at a router 2090A of a client premise CP1 may establish a BGP session with a BGP-compliant processing engine 2066A of VR 2010A, and a BGP processing engine 2091B at a router 2090B of a client premise CP2 may establish a BGP session with a BGP-compliant processing engine 2066B of VR 2010A. When routing information obtained via BGP messages from routers 2090 is to be transferred from one VR to another via peering attachment PA-1, the information may be expressed in accordance with CRITP in the depicted embodiment; that is, the VRs 2010A and 2010B may exchange dynamic routing information using CRITP messages rather than BGP messages as indicated by label 2025. In effect the BGP compliant processing engines 2066 may translate the same underlying routing information from BGP to CRITP and vice versa as needed, and thus may be capable of processing messages of both protocols.

Example use of Multiple Peering Attachments for Network Segmentation

Figure 21:
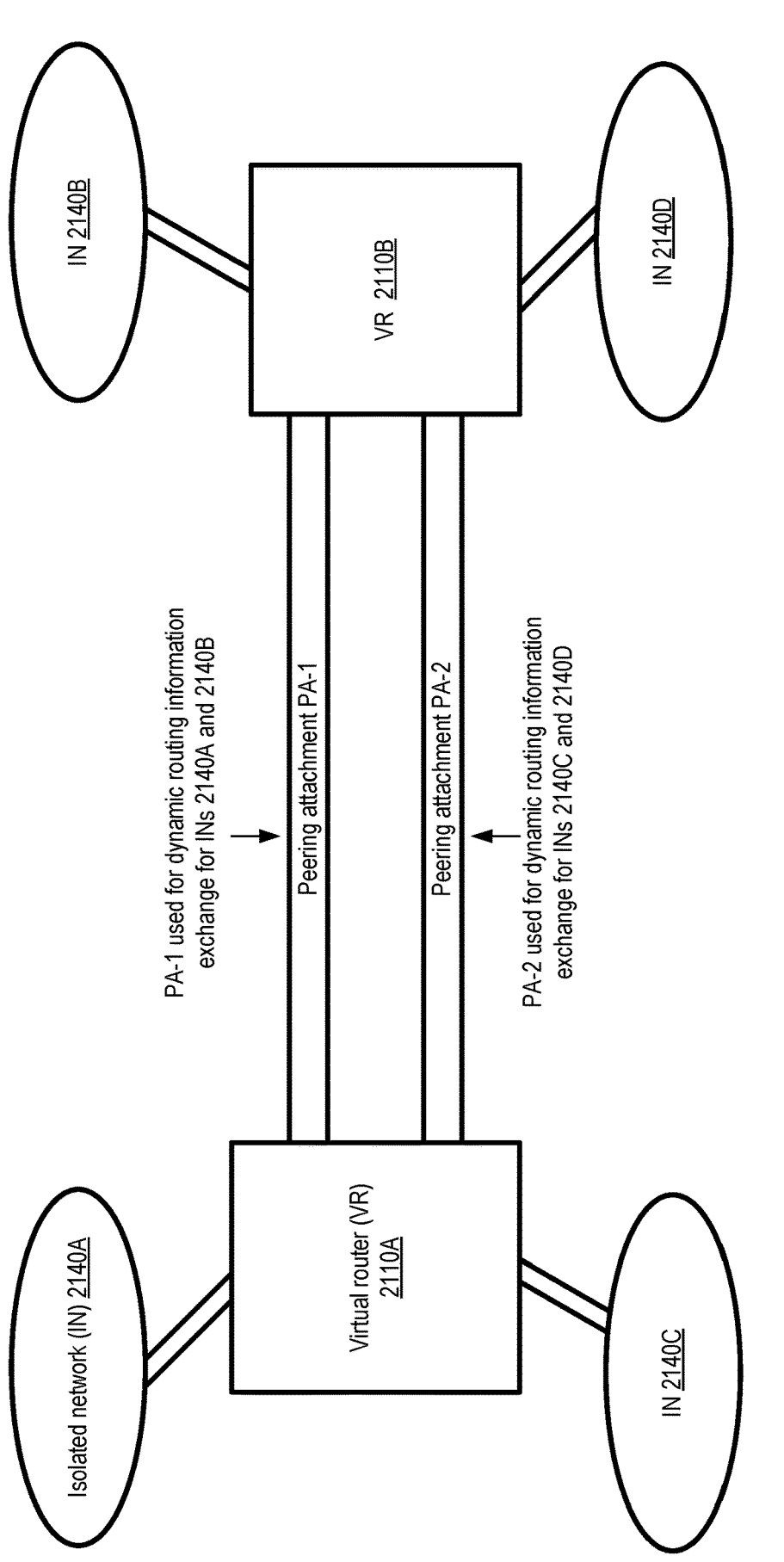
FIG. 21 illustrates an example scenario in which multiple peering attachments may be set up between a pair of virtual routers, according to at least some embodiments.

FIG. 21 illustrates an example scenario in which multiple peering attachments may be set up between a pair of virtual routers, according to at least some embodiments. In the depicted embodiment, a client may wish to ensure that while traffic is allowed to flow between specified pairs of isolated networks attached to VRs 2110A and 2110B, network flows are prevented or prohibited between other pairs of isolated networks attached to the same VRs. For example, a client may wish to enable dynamic routing of packets (e.g., using exchanges of advertisements of the kind discussed above) between isolated networks (INs) 2140A and 2140B, and also between isolated networks 2140C and 2140D. However, the client may also wish to prevent traffic from flowing (a) between IN 2140A and IN 2140D, (b) between IN 2140A and IN 2140C, (c) between IN 2140B and IN 2140C and (d) between IN 2140B and 2140C.

In order to achieve this type network segmentation while still using dynamic routing information exchange using BGP or similar protocols, two different peering attachments (and associated different pairs of dynamic routing protocol engines) may be established in some embodiments. Peering attachment PA-1 may be set up for traffic only between INs 2140A and 2140B (and associated dynamic routing information transfers), while peering attachment PA-2 may be set up for traffic only between INs 2140C and 2140D (and associated dynamic routing information transfers).

Figure 22:
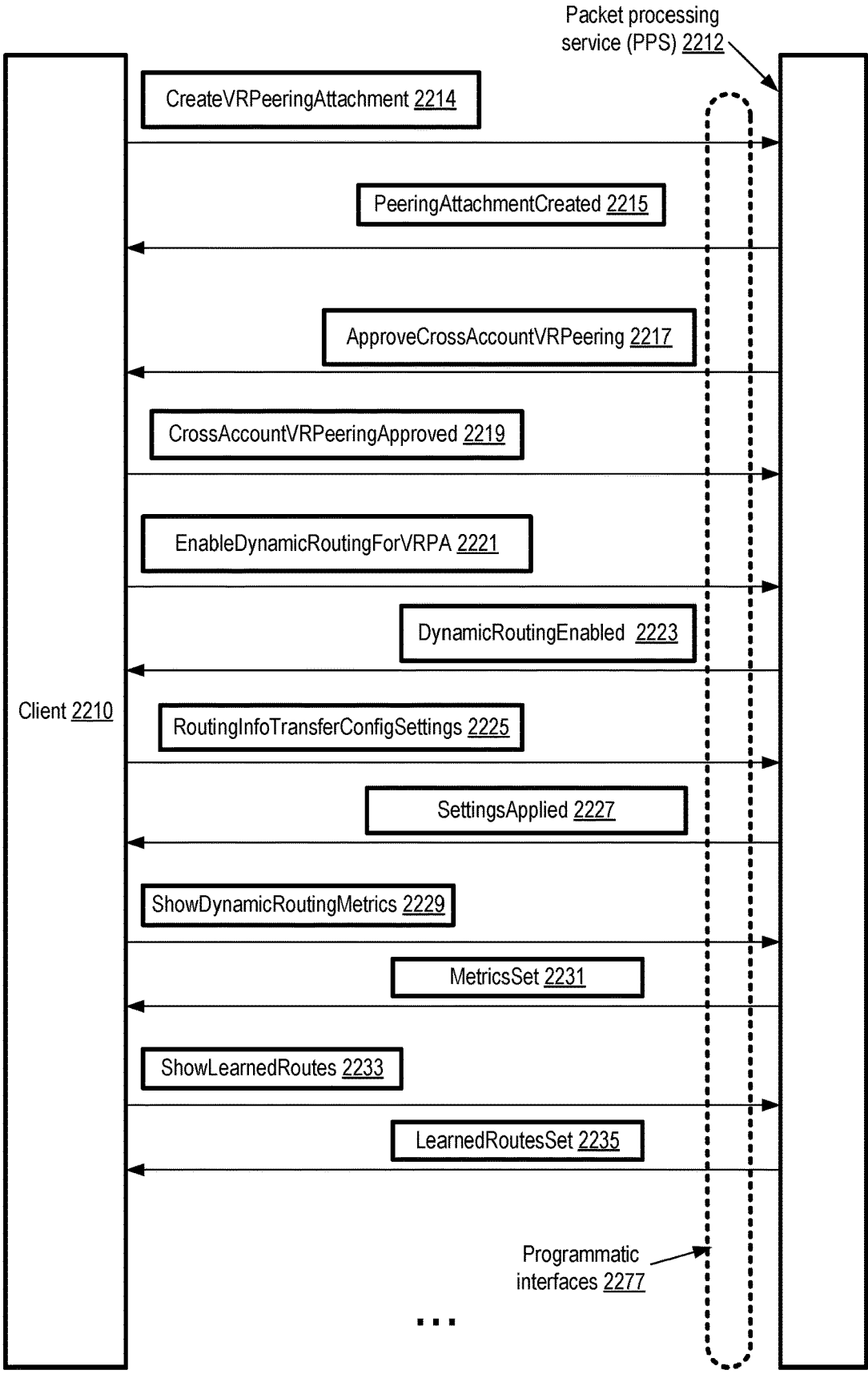
FIG. 22 illustrates an example set of programmatic interactions pertaining to configuring dynamic routing for peered virtual routers, according to at least some embodiments.

Example Programmatic Interactions for Dynamic Routing via Peered Virtual Routers FIG. 22 illustrates an example set of programmatic interactions pertaining to configuring dynamic routing for peered virtual routers, according to at least some embodiments. Packet processing service (PPS) 2212, similar in functionality to the packet processing service discussed earlier in the context of FIG. 1, may implement a set of programmatic interfaces 2277 in the depicted embodiment. The programmatic interfaces 2277 may, for example, include a set of APIs, command-line tools, web-based consoles, graphical user interfaces and the like. Using the interfaces 2277, clients may submit messages pertaining to virtual router configuration similar to those discussed in the context of FIG. 8 and FIG. 9, as well as additional messages shown in FIG. 22, and receive corresponding responses.

Having established several virtual routers for managing the traffic between a set of isolated networks (e.g., using CreateVirtualRouter requests 814 shown in FIG. 8) earlier, a client 810 may submit a CreateVRPeeringAttachment request 2214 to request that a peering attachment be created between a specified pair of VRs in the embodiment depicted in FIG. 22. Metadata indicating that the specified VRs have been attached may be stored at the PPS 2212, and a PeeringAttachmentCreated message 2215 may be sent to the client in some embodiments.

In at least some embodiments, a peering attachment may be created between VRs that are established on behalf of different clients, or different client accounts. For example, virtual router VR-1 may be created for a client C1 of a provider network, virtual router VR-2 may be created for client C2, and the two clients may wish to enable transfer of application data packets between various isolated networks owned by the clients via a peering attachment established between VR-1 and VR-2. In such a scenario, when one of the clients requests a peering attachment, the PPS may have to ensure that the owner of the other VR agrees to the attachment. In some embodiments, when such "cross-account" attachments are requested, the PPS 2212 may send an ApproveCrossAccountVRPeering request 2217 to the client from whom permission or approval is desired. Thus, in the above example in which client C1 owns VR-1 and requests peering with VR-2, the ApproveCrossAccountVRPeering request 2217 may be sent to C2. If C2 approves, C2 may reply with a CrossAccountVRPeeringApproved message 2219, and the peering attachment requested by C1 may be established in the depicted embodiment.

In various embodiments, a client may request that dynamic routing (e.g., including the transfer of routing information between peered VRs, and the use of the routing information to dynamically select optimal next hops at the VRs for various application data packet flows) be enabled for a peering attachment, e.g., by submitting an EnableDynamicRoutingForVRPA request 2221. In response, in at least some embodiments, a respective routing information exchange protocol processing engine may be configured for each of the peered VRs (e.g., using offloading devices as discussed above, or using the same devices as are used for the forwarding plane nodes of the VRs), and a session of the protocol may be initiated between the protocol processing engines. A DynamicRoutingEnabled message 2223 may be sent to the client to confirm that dynamic routing has been enabled. In at least one embodiment, dynamic routing may be enabled by default when a peering attachment is created, so a separate EnableDynamicRoutingForVRPA may not be needed.

One or more RoutingInfoTransferConfigSettings messages 2225 may be sent by a client 2210 to indicate various configuration settings pertaining to the transfer of dynamic routing information between the peered VRs in the depicted embodiment. Any of a number of different configuration settings may be indicated, including the specific protocols to be used (e.g., any of various flavors of BGP such as eBGP, iBGP, MP-BGP etc.), settings for filtering outbound advertised routes, filtering inbound advertisements, relative priorities assigned to various BGP attributes to select a next hop to a destination, CIDR blocks to be used for the IP addresses of protocol processing engines, autonomous system identifiers to be assigned to the protocol processing engines, and so on. The set of BGP attributes whose respective relative priorities are indicated by the client in one embodiment may include, for example, one or more of: (a) a local preference attribute, (b) a local prefix origin attribute, (c) an autonomous system (AS) path length attribute, (d) a multi-exit discriminator (IVIED) attribute, or (e) a router identifier attribute. The configuration settings, which may also be referred to as dynamic routing protocol control settings in at least some embodiments, may be indicated as parameters of the EnableDynamicRoutingForVRPA requests in some embodiments. In some embodiments, a client may use programmatic interfaces 2277 to indicate various factors to be used when making dynamic routing decisions at the VRs, such as measured latencies, bandwidth availability and the like, as well as the relative priorities to be assigned to the factors, e.g., as part of the configuration settings for peering attachments. After the client-specified settings are obtained at the PPS 2212, they may be stored in a database and applied at the protocol processing engines set up for the peered VRs in various embodiments. In at least some embodiments, a SettingsApplied message 2227 may be sent to the client 2210.

According to some embodiments, various metrics pertaining to the transfer and use of dynamic routing information, such as the number of route advertisements sent in either direction between the pair of routing information exchange protocol processing engines being used, health state information (e.g., responsiveness, uptime etc.) of the protocol processing engines, the change in the rate at which the advertisements are sent over time, the number of times particular attributes were used to change next hop settings, and so on, may be collected by the PPS 2212. A client may submit a ShowDynamicRoutingMetrics request 2229 to request such metrics, and the requested metrics may be presented to the client via one or more MetricsSet response messages 2231 in the depicted embodiment.

In one embodiment, a client may submit a ShowLearnedRoutes request 2233 requesting information about the set of dynamically-learned routes of a peered virtual router or a specific route table of a peered virtual router. In response, the next hop addresses learned at the VR may be presented to the client via one or more LearnedRoutesSet responses 2235 in the depicted embodiment. In some embodiments, a protocol processing engine of a given VR may receive BGP messages from more than one processing engine, and the different engines may each provide information about alternative paths to the same destinations. In one such embodiment, the learned routes information provided to the client via the LearnedRouteSet message may include several different next hop alternatives for a given destination address or prefix, each obtained from a different protocol processing engine. For example, contents of a table similar to the following, containing routing information obtained from at least two different BGP engines, may be presented to a client in the LearnedRoutesSet message.

```
{
    "Network":   "A.B.C.D/32"
    "NextHop":   "E.F.G.H",        "E.F.G.K"
    "MED":       "0",              "0"
    "Local Preference":  "100",          "300"
    "ASN-Path":  "777 911 711i",        "777 911 711 715i"
}
```

In the above example table, two different next hops (E.F.G.H and E.F.G.K) have been learned for the destinations with addresses in A.B.C.D/32. Values of various attributes used for selecting the preferred next hop when multiple next hop alternatives are available, such as MED (multi-exit discriminator), local preferences attributes and autonomous system number path (ASN-Path) may also be provided for the different next hop options in at least some embodiments in a LearnedRoutesSet message.

Methods for Configuring and using Dynamic Routing for Peered Virtual Routers

FIG. 23 is a flow diagram illustrating aspects of operations that may be performed for enabling and utilizing dynamic routing for peered virtual routers, according to at least some embodiments. As shown in element 2301, a set of virtual routers (VRs) including VR1 and VR2 may be created or established at a packet processing service (PPS), e.g., using the kind of cell-based approach discussed earlier, in response to programmatic requests from one or more clients of the PPS. The VRs may be created to transmit network packets between a set of isolated networks including IN1 and IN2.

The INs and the VRs may be programmatically attached to one another in the depicted embodiment. For example, IN1 may be attached to VR1, IN2 may be attached to VR2, and a peering attachment PA may be created between VR1 and VR2 based on requests received from the clients on behalf of whom the INs and VRs are established (element 2304).

A determination may be made that dynamic routing is to be enabled for the VR-to-VR peering attachment (element 2307): that is, that dynamic routing information such as updated attribute values, performance metrics, and the like is to be transferred between the VRs, and that such routing information is to be employed to route application data packets among the attached IVNs. In at least some embodiments, clients may specify configuration settings (such as rules for filtering inbound or outbound route advertisements, respective priorities to be assigned to attributes/factors used for selecting next hops for various destinations, etc.) for the transfer of the routing information between the peered VRs according to a selected protocol such as a variant of BGP. The routing information exchanged may indicate, for example, routes or next hops to groups of destination addresses (expressed for example as CIDR blocks) within the different IVNs, values of BGP or other attributes (such as IVIED values, etc.) associated with the groups of destination addresses., latency measurements associated with different paths available to the destination addresses, measurements of available bandwidth along the different paths, metrics of errors/faults encountered along the paths, and so on.

Respective protocol processing engines E1 (associated with VR1) and E2 (associated with VR2) may be instantiated and/or connected to each other to initiate a dynamic routing information exchange (DRIE) session (such as a BGP session) in the depicted embodiment (element 2310). In some embodiments, offloading devices of the kind discussed earlier may be employed for one or more of the protocol processing engines E1 and E2.

Routing information pertaining to IN1 may be obtained at VR2 via the DRIE session, and routing information pertaining to IN2 may be obtained at VR1 via the DRIE session (element 2313). The routing information obtained may be utilized to transmit at least some network packets originating at one of the INs to the other IN, without requiring static routes to be configured for such packets (element 2316).

Example Wide Area Networking Service using VRs with Dynamic Routing Enabled

Figure 24:
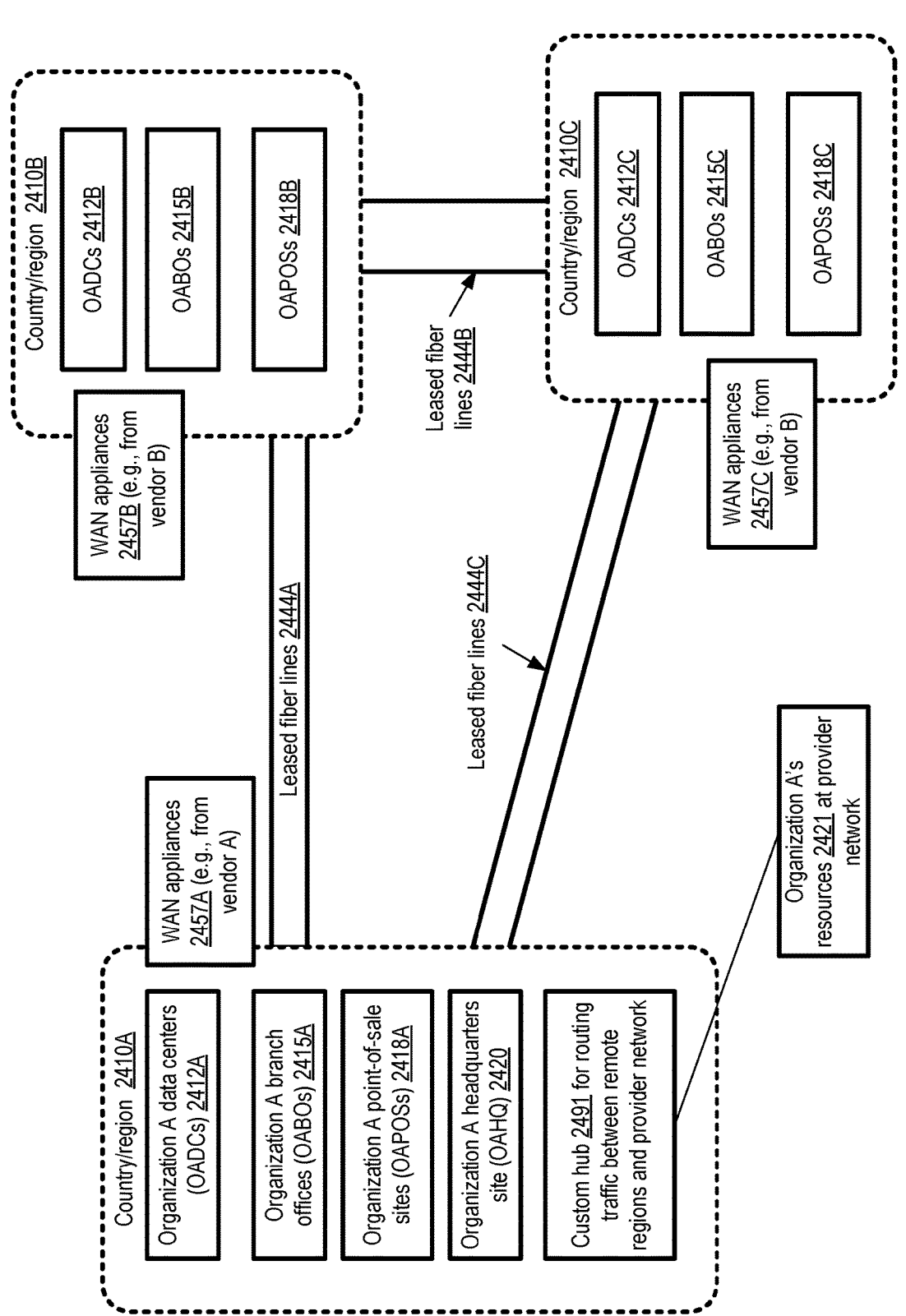
FIG. 24 illustrates an example environment in which wide area networks linking geographically distant premises of an organization may be managed by the organization using leased fiber lines and appliances from various vendors, according to at least some embodiments.

Many organizations have offices and computing resources spread across geographical regions, with the facilities of a given organization spanning continents in some cases. Managing connectivity between such remote premises can be complex, as many different entities and a variety of hardware devices and associated software from different vendors may be needed. FIG. 24 illustrates an example environment in which wide area networks linking geographically distant premises of an organization may be managed by the organization using leased fiber lines and appliances from various vendors, according to at least some embodiments. An organization A may have a headquarters site (OAHQ) 2420 in country/region 2410A, as well as premises in country/region 2410B and country/region 2410C. Country/region 2410B may include, for example, one or more of organization A's data centers (OADCs) 2412B, branch offices (OABOs) 2415B and point-of-sale sites (OAPOSs) 2418B, while country/region 2410C may include OADCs 2412C, OABOs 2415C and OAPOSs 2418C. Country/region 2410A may also include OADCs 2412A, OABOs 2415A, and OAPOSs 2418A. Within a given country/region 2410, organization A may for example rely on local internet service providers (ISPs) for connectivity between different premises. In some scenarios in which large amounts of data have to be transferred between the premises of organization A across from one country/region to another, the organization may acquire leased fiber lines such 2444A, 2444B and 2444C. Wide area networking management appliances 2457 (e.g., routers for the packets flowing across the leased fiber lines), such as WAN appliances 2457A from a hardware vendor A in country/region 2410A, WAN appliances 2457B from hardware vendor B, and WAN appliances 2457C from hardware vendor C may also have to be purchased and administered by organization A. Furthermore, if organization A also utilizes resources 2421 (such as compute instances of a virtualized computing service, database systems of a database service, etc.) within a provider network or cloud computing environment, in some cases one or more custom hubs 2491 may have to be set up route traffic between remote regions and the provider network, as there may not be an easy way to interconnect the leased fiber lines 2444 with the provider network. If and when demand for interregional traffic increases, it may take more time than desired by organization A to expand their acquired leased lines. Managing the worldwide WAN of the organization may be cumbersome, as administrators may have to utilize different tools to deal with respective parts of the network.

Figure 25:
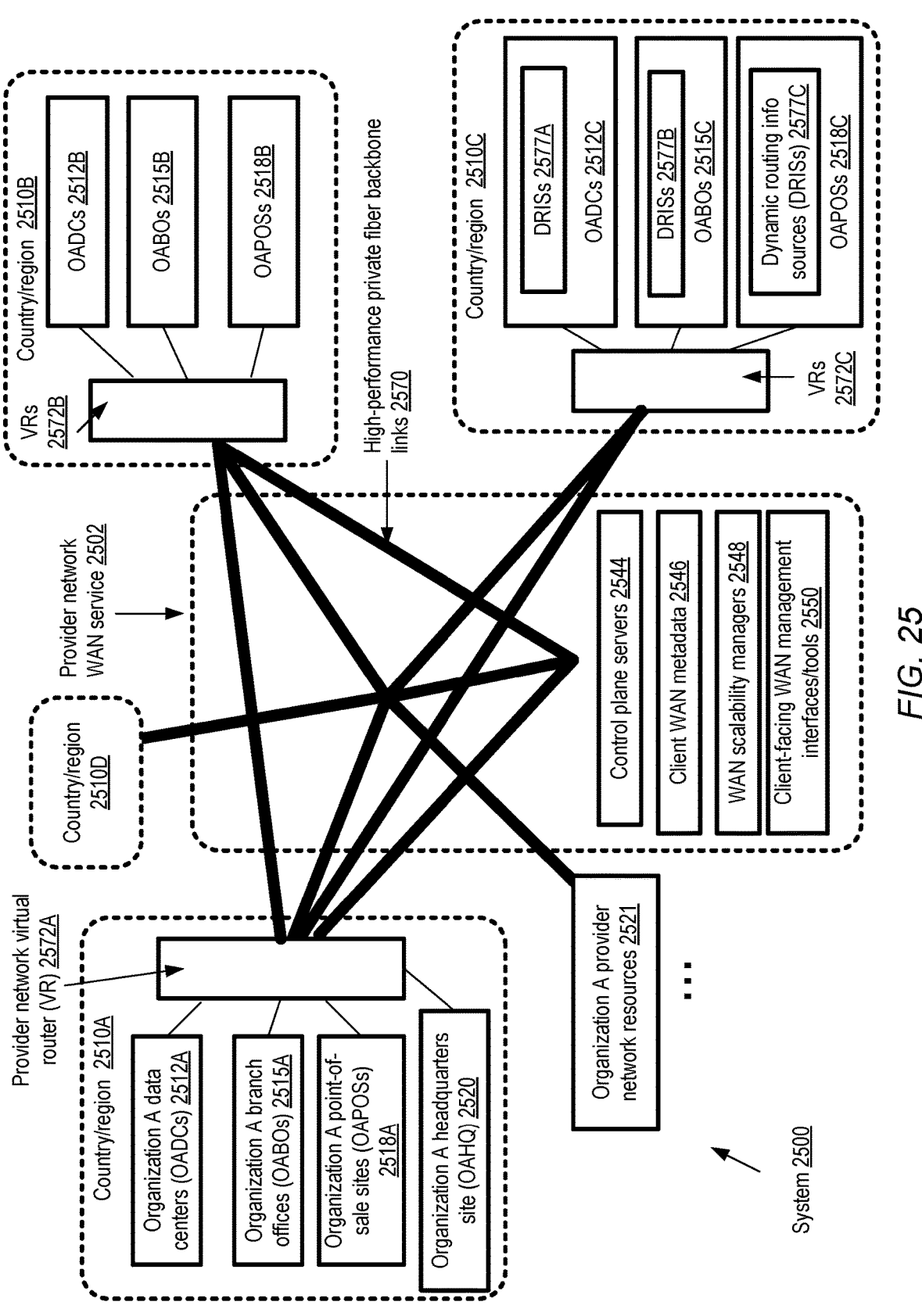
FIG. 25 illustrates an example system environment in which traffic between distant premises of a client of a provider network is transmitted using a wide area network (WAN) service of the provider network, which employs an internal fiber backbone network and a collection of virtual routers with dynamic routing enabled, according to at least some embodiments.

Resources of a provider network may also be spread across different regions/countries, and the provider network may use a high-bandwidth private fiber backbone network to connect its own data centers spread worldwide. In some embodiments, a service that allows organizations to set up their WANs using a provider network's backbone network and a collection of virtual routers of the kind discussed above may be implemented. FIG. 25 illustrates an example system environment in which traffic between distant premises of a client of a provider network is transmitted using a wide area network (WAN) service of the provider network, which employs an internal fiber backbone network and a collection of virtual routers with dynamic routing enabled, according to at least some embodiments. As shown, system 2500 includes resources and artifacts of a provider network WAN service 2502 which is used to enable connectivity between premises of an organization A with a headquarters OAHQ 2520 and various other premises distributed among country/region 2510A, country/region 2510B and country/region 2510C. The WAN service 2502 includes a set of control plane servers 2544, a set of client WAN metadata 2546, WAN scalability managers 2548 and client-facing WAN management interfaces/tools 2550. Clients of the WAN service may be able to utilize high-performance (e.g., low-latency, high-bandwidth) private fiber backbone links 2570 of the provider network to transmit packets between client premises located in the different countries or regions, in effect configuring their private WANs using provider network resources and easy-to-use configuration management tools. The high performance fiber backbone links 2570 may be described as private as they may be used exclusively by provider network services (on behalf of the services' clients and/or for internal administrative purposes), and may not include links of the public Internet in at least some embodiments. The WAN service may manage the scalability and availability of the private fiber backbone links, adding resources/links as needed, and the clients may not even have to be aware of the details of the links (e.g., exactly which backbone links link which data centers, the bandwidth supported by different links, etc.).

The control plane servers 2544 may for example be responsible for administrative tasks of the WAN service, such as provisioning compute instances of the provider network's virtualized computing service for executing scalability managers 2548 and for responding to input obtained via client-facing WAN management interfaces/tools 2550, for example. The client-facing WAN management interfaces/tools 2550 may include a set of programmatic interfaces, such as web-based consoles, command-line tools, graphical user interfaces, and/or APIs in various embodiments. Using such interfaces, in some embodiments a potential client of the WAN service 2502 (such as an administrator or manager of organization A) may provide an indication of a plurality of client premises between which network traffic is to be routed via the private fiber backbone of the provider network. For example, the client may provide information such as the physical locations of premises in different geographical regions (including OAHQ 2520, OADCs 2512A, 2512B and 2512C, OABOs 2515A, 2515B and 2515C, and OAPOSs 2518A, 2518B and 2518C), the expected rate of inter-region traffic between the premises, the desired range of packet latencies and so on. In at least some embodiments, the client may also indicate or specify a particular protocol (e.g., a version or variant of BGP) to be used to obtain dynamic routing information pertaining to different premises. The information provided by the client may be stored as part of client WAN metadata 2546 in the depicted embodiment.

According to some embodiments, the WAN service may analyze the provided information about the client's premises, and provide a recommendation to the client via programmatic interfaces that some number of virtual routers (VRs) of the kind discussed earlier be established for the client's private WAN. In at least one embodiment, a mapping between the VRs and the premises with whose local networks the VRs should preferably be programmatically attached may also be provided via the programmatic interfaces to the client. Such mappings may be based on the physical locations of provider network data centers relative to the locations of client premises in at least some embodiments. For example, if the provider network data centers are distributed among provider network-defined regions (such as United States Region A, United States Region B, Europe Region A, etc.), the mappings may indicate the recommended provider network region within which one or more virtual routers should be established for one or more nearby client premises in some embodiments. Based on the provided recommendations, the client may send programmatic requests (e.g., either directly to a packet processing service of the kind discussed earlier, or via the WAN service) to establish a set of virtual routers in some embodiments. In other embodiments, instead of requiring the client to set up the VRs, the WAN service may itself configure a set of virtual routers on behalf of the client. One or more provider network VRs 2572A may be set up in country/region 2510A, one or more provider network VRs 2572B may be set up in country/region 2510A, and one or more provider network VRs 2572C may be set up in country/region 2510C.

In at least some embodiments, each of the VRs may be configured as part of the client's private WAN using a set of provider network resources (e.g., compute instances of a virtualized computing service for the fast-path nodes, exception-path nodes and/or auxiliary task offloaders discussed earlier) that satisfy a proximity criterion with respect to one or more of the client premises. In some embodiments, verifying that a VR meets the proximity criterion with respect to a client premise may comprise ensuring that the VR is in the same provider network-defined region at which a compute instance would be established by default if a compute instance launch request were transmitted from the client premise. In other embodiments, verifying that the VR meets the proximity criterion may comprise ensuring that a dedicated direct physical link (a direct connect link) can be set up between the client premise and a provider network data center if desired by the client, or that a VPN tunnel with an average packet transfer latency no greater than T milliseconds can be set up between the client premise and the provider network. Other types of proximity criteria may be used in different embodiments.

In various embodiments, connectivity may be established or enabled, e.g., using the different types of attachments shown in FIG. 19, among some or all of the VRs themselves as well as between the VRs and the networks at the client premises. For example, peering attachments with dynamic routing enabled may be set up between pairs of VRs 2572A, VRs 2572B or VRs 2572C. Depending on the preferences of the client, e.g., as indicated in programmatic attachment requests, VPN attachments using one or more VPN tunnels may be created between one or more VRs 2572 and some client premise networks, while direct physical link based attachments (DX attachments of the kind discussed earlier) may be set up between one or more VRs 2572 and other client premise networks. In at least some embodiments, such attachments may be used to establish network connectivity between a VR and a dynamic routing information source (DRIS) 2577, such as a client-owned router, a client-managed SD-WAN appliance and the like at a given client premise. Networking configuration information such an IP address of a DRIS may be provided by the client to the WAN service via programmatic interfaces to enable a VR to communicate with the DRIS in various embodiments. In the depicted embodiment, OADCs 2512C may include one or more DRISs 2577A, OABOs 2515C may include DRISs 2577B, while OAPOSs 2518C may include DRISs 2577, and connectivity may be established between at least some of these DRISs and VRs 2572 so that dynamic routing information about endpoints within the local or isolated networks at the client premises can be obtained at the VRs and used for directing inter-regional traffic. Note that not all client premise may necessarily include DRISs in some embodiments. In some implementations, respective protocol processing engines for a routing information exchange protocol indicated by the client (such as a version of BGP) may be set up for each VR (e.g., using auxiliary task offloaders of the kind discussed above), and sessions of the protocol may be initiated between the VR's protocol processing engines and the DRISs for transfer of routing information of the various client premises. Contents of network packets originating at a given client premise (such as the OAHQ, an OADC, an OABO, or an OAPOS) may be transmitted via some number of VRs 2572 and the private fiber backbone links 2570 to another client premise, e.g., along a route identified using a set of dynamic routing information obtained at the VRs from the DRISs in the depicted embodiment.

Organization A, on whose behalf the traffic is transmitted between client premises shown in FIG. 25, may also be able to easily connect its provider network resources 2521 to its private WAN built using the provider network's backbone links in the depicted embodiment. For example, an administrator of manager of organization A may use the client-facing WAN management interfaces/tools 2550 to request connectivity between one or more client premises and an isolated virtual network of organization A, established at a virtualized computing service of the provider network. In response to such a request, configuration settings may be changed at one of the VRs set up for the client, or a new VR may be set up, and the requested connectivity may be enabled using the modified VR or the new VR in various embodiments. The provider network may also have data centers (and backbone links connected to such data centers) in additional countries such as country/region 2510D in the depicted embodiment, in which organization A may not currently have any premises or facilities. If and when organization A expands to such countries/regions, expanding the private WAN set up using the provider network's backbone network may require just a few programmatic interactions. As and when an additional premise is to be added to an existing private WAN configured using the WAN service (either in a region in which other client premises are already connected to the WAN service, or in a different region), a client may simply provide the same kind of information about the new premise as was provided about other premises earlier via the programmatic interfaces. Subsequently, connectivity may be established between a VR and a specified DRIS at the additional premise, and routing information pertaining to the additional premise may be propagated among some or all the VRs already being used for the client's VAN, without requiring any manual configuration of static routes in various embodiments.

In various embodiments, a client of the WAN service may obtain various metrics (e.g., total bytes transferred per unit time, trends in bandwidth use, measured latencies, packet drop rates, etc.) of network traffic flowing between the client's premises in different geographic regions via the private fiber backbone, e.g., via the client-facing WAN management interfaces 2550. In some embodiments, the client may select the preferred granularity at which the metrics are to be presented, e.g., from a set of granularities which includes (a) region-level granularity (in which metrics for all the traffic flowing between client premises in a pair of regions is aggregated), (b) client premise-level granularity (in which metrics are presented separately for different pairs of client premises), or (c) isolated network-level granularity (in which metrics are presented separately for each WN pair as well as for each combination of IVN and client premise network). In at least some embodiments, a unified interface may be used to present inter-region traffic metrics as well as intra-region traffic metrics.

A client of the WAN service may utilize the service for managing various types of exceptional events with respect to their applications in some embodiments, e.g., to fail over the workload of some applications from one region to another in the event of an outage or other network problems. The WAN service may, for example, obtain an indication from the client, via programmatic interfaces, of one or more diversion criteria (e.g., detection of failures, network slowdowns, etc.) for traffic directed to a first set of network endpoints at the client premises in a given geographical region. The WAN service may monitor network performance data associated with traffic to/from the different client premises utilizing the backbone network, and re-route or divert traffic based on the client's expressed criteria in various embodiments. In response to determining that a diversion criterion has been met, for example, some number of network packets whose original or initial destinations were endpoints within a first region such as 2510A may instead be delivered to a failover or backup set of endpoints in a different region such as 2510B or 2510C using the appropriate peered VRs. The diversion criteria or failover criteria of different clients may be stored as part of client WAN metadata in various embodiments.

According to some embodiments, a client may request custom processing or actions for at least some of the packets transmitted via the WAN service 2502. For example, because of regulations or organizational policies, audit records may have to be generated and stored when packets are transmitted from some set of endpoints within one country or region to another country or region. The client may use programmatic interfaces to indicate the custom actions to be performed and the conditions under which the actions are to be performed, and the WAN service may ensure that the actions are performed accordingly in the depicted embodiment. In some embodiments, for example, offloading devices similar to those discussed earlier may be used for such custom actions.

In some embodiments, a client of a WAN service may use programmatic interfaces provide an indication of a target bandwidth limit for network traffic flowing via the provider network's private fiber backbone between a first set of one or more client premises in a first geographical region and a second set of one or more premises in a second geographical region. The WAN service may ensure that such limits are enforced, e.g., by causing network packets to be dropped at the appropriate VRs if/when the limits are reached. A client may dynamically request an increase in the bandwidth limit in some embodiments via the programmatic interfaces. In response to such a request for an increase, the WAN control plane may ensure that the backbone has enough resources (e.g., sufficient unused bandwidth at various links used for the client's inter-regional traffic) to be able to support or sustain the increase, and provide an indication via the programmatic interfaces confirming that the new target bandwidth limit is acceptable. In at least some embodiments, the WAN service may periodically and proactively provision additional backbone fiber links for its clients in anticipation of potential requests for additional bandwidth from clients, so that the clients do not have to wait for long periods when higher bandwidths are needed.

In various embodiments, multiple pathways may be available via the provider network's private backbone for traffic between a given pair of client premises. Multiple sets of fiber links may be provisioned by the provider network between its own data centers in the different countries or regions, for example, for availability and performance reasons with respect to the provider network's other services (such as a virtualized computing service, various database services, etc.), and such fiber links may represent alternative options for routing the traffic of WAN service clients as well. In at least some embodiments in which a WAN service client specifies a performance target (e.g., a latency target) for traffic between a pair of client premises, the VRs used for the pair of client premises may use current or recent performance metrics obtained from several different alternative sets of backbone links usable for traffic between the client premises to dynamically select a particular set of backbone links that can satisfy the client's performance target. At least some packets may then be transmitted between the client premises using the selected set of links. In some embodiments, clients may provide rules for transferring dynamic routing information pertaining to specified premises or regions, e.g., using configuration settings similar to those discussed earlier in the context of FIG. 18 and FIG. 20. It is noted that various features and functions of virtual routers discussed earlier, in the context of FIG. 1 through FIG. 23, may be utilized by or for a WAN service of a provider network in some embodiments.

Example Graphical Interfaces of a WAN Service

Figure 26:
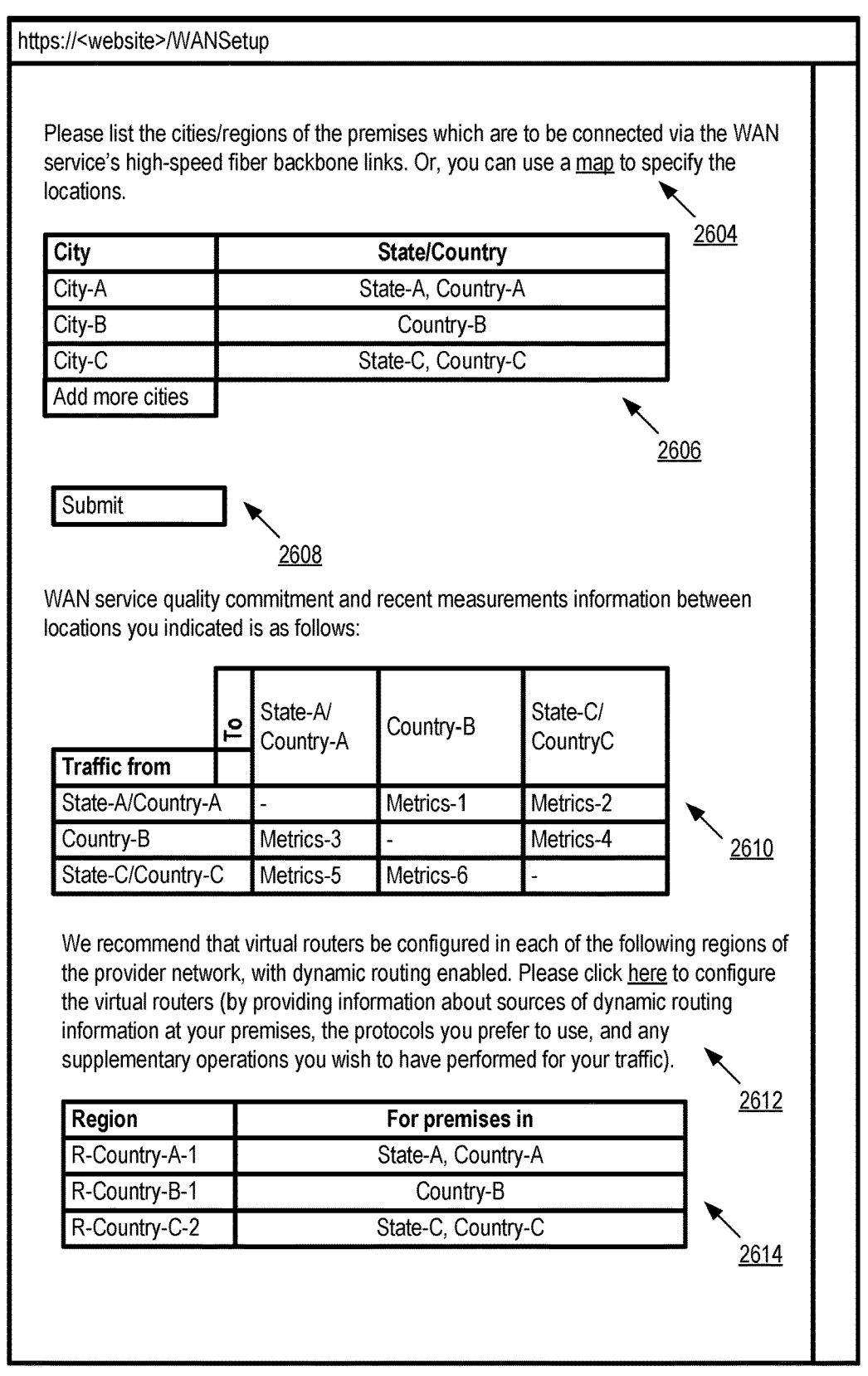
FIG. 26 illustrates an example web-based interface which may be used to provide WAN service quality metrics for traffic between client-specified locations, according to at least some embodiments.

FIG. 26 illustrates an example web-based interface which may be used to provide WAN service quality metrics for traffic between client-specified locations, according to at least some embodiments. As shown, web-based interface 2602 implemented by a WAN service similar in functionality to service 2502 of FIG. 25 may include an introductory message region 2604 in which a potential client is requested to provide a list of cities/regions in which premises of the potential client are located. This interaction may be initiated before the potential client has agreed to use the WAN service in some embodiments, so that the WAN service can determine if it can provide backbone connectivity between the client's locations and/or so that the potential client can view WAN service quality metrics for inter-region traffic. In the depicted embodiment, the potential client has indicated that premises are located in City-A, City-B and City-C, located within State-A of Country-A, Country-B and State-C of Country-C respectively. After the locations of the client premises have been entered in table 2606, the client may use the Submit button 2608 to send the information to the WAN service.

In response to the submission of the client premise location information, the WAN service may present a set of service quality metrics for traffic transmitted via the provider network's backbone network between the regions in which the client's premises are located in the depicted embodiment. Several metrics for respective directions of traffic flow between pairs of the client premise locations, such as Metrics-1, Metrics-2, Metrics-3, Metrics-4, Metrics-5 and Metrics-6, may be presented to the client via the web-based interface 2602. Such metrics may include, for example, latencies for packet transmissions between the locations, transferred bytes/second or transferred bytes/hour, packet drop rates, and so on. In some embodiments, the nominal or expected values for several metrics may be provided, along with actual measurements obtained over some recent time interval. In one embodiment, instead of first asking the client for their premise locations, a table 2610 showing such metrics for various combinations of countries/regions may be presented by the WAN service as a way of informing the client about the locations for which the WAN service can be used.

In the embodiment depicted in FIG. 26, the WAN service may present a recommendation message 2612 regarding virtual routers which should be set up if the potential client wishes to use the WAN service for routing traffic via the provider network backbone links between the client premises. Table 2614 shows a list of provider network-defined regions (such as R-Country-A-1, R-Country-B-1, R-Country-C-2) in which establishing VRs is recommended, along with mappings between the provider network-defined regions and the client premises. Note that in at least some embodiments, at least some of the provider network-defined regions may not correspond exactly to individual countries or states as defined by government-recognized boundaries. For example, regions may be defined by the provider network for its internal administrative purposes, based on the locations of its data centers, and a given provider network-defined region may include portions of states/countries rather than complete states/countries. When requesting resources (such as VRs) from the provider network, in at least some embodiments a client may have to specify the provider network-defined region in which the resource is to be established or created in the depicted embodiment. For example, a provider network-defined region may be indicated by a parameter of an API or command for requesting a resource. Instructions regarding next steps, such as how VRs should be configured, may be provided to a client via the web-based interface 2602 in the depicted embodiment. For example, the client may be informed that configuration information pertaining to dynamic routing information sources for the networks set up at the client's premises, the protocol to be used for exchange of dynamic routing information, and/or any custom actions or supplementary operations for the client's traffic (such as audit log record creation) would be required to be provided by the client if the client wishes to utilize the WAN service.

Figure 27:
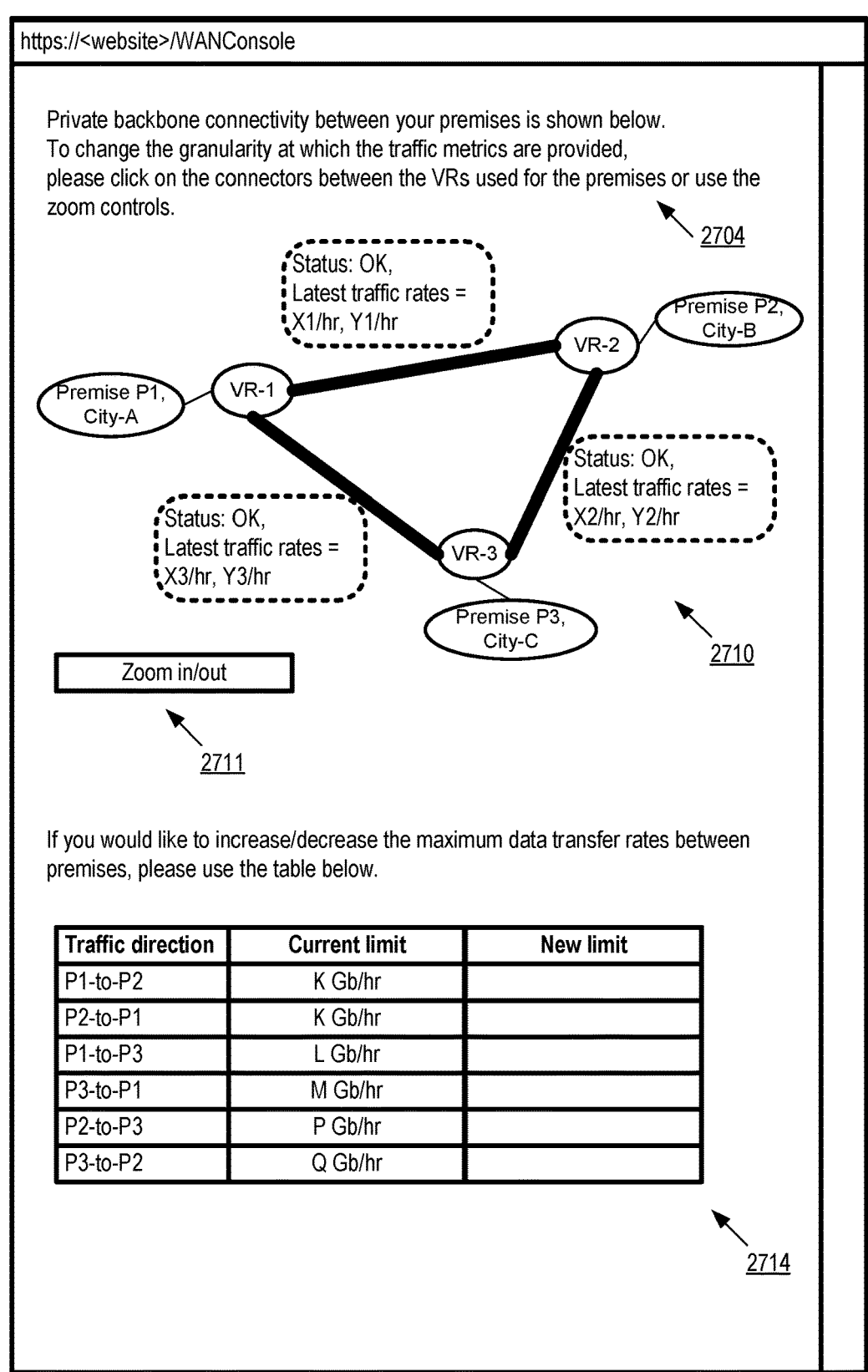
FIG. 27 illustrates an example web-based interface which may be used to present status information for traffic flowing between client-specified locations, according to at least some embodiments.

FIG. 27 illustrates an example web-based interface which may be used to present status information for traffic flowing between client-specified locations, according to at least some embodiments. In web-based interface 2702, message 2704 indicates how the client may change the granularity at which status information (including health or availability information, as well as measured traffic rates in either direction) for various portions of the client's wide area network is being presented. In some embodiments, the client may choose from, among other granularity options, information aggregated at the region level, at the level of individual premises (as shown in the example of FIG. 27), or even at the level of individual isolated networks within premises and within the provider network. In graph 2710, health stats information ("Status: OK") and latest traffic rates for both directions of traffic are shown for provider backbone-based connectivity between premise P1 (City-A) and premise P2 (City-B), premise P1 and premise P3 (City-C), and premise P2 and premise P3, with virtual routers VR-1, VR-2 and VR-3 respectively set up at the three premises. Zoom in/out control element 2711 may be used to change the granularity in some embodiments—e.g., if the client zooms out so that several different regions (each including one or more client premises) become visible, the granularity of the information displayed may be changed automatically to the region-level granularity. A client may also change granularities by clicking on the connectors shown between VRs or premises in graph 2710 in the depicted embodiment.

Figure 28:
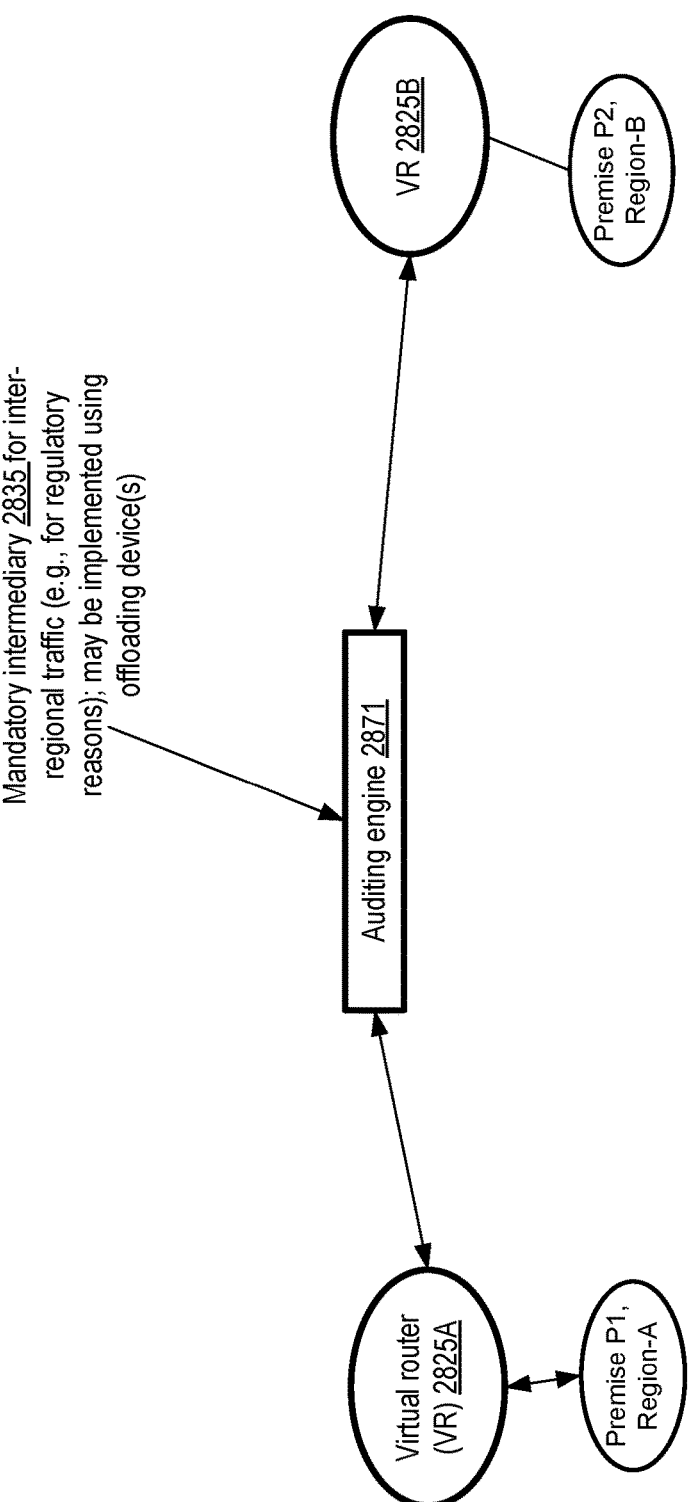
FIG. 28 illustrates an example scenario in which a mandatory intermediary device for traffic flowing between specified locations may be configured on behalf of a client of a WAN service, according to at least some embodiments.

In addition to viewing status information for their WAN using web-based interface 2702, a client may view and/or modify target data transfer rates between client premises using table 2714 of web-based interface 2702 in the depicted embodiment, The current requested data transfer rates in either direction between various premises (e.g., P1-to-P2, P2-to-P1, etc.)

or between various regions may be shown in the "Current limit" column of table 2714. The "New limit" column may be used for changing the target data transfer rate to be supported by the WAN service for any of the pairs of premises in the depicted embodiment. In some embodiments, a client may wish to raise the limit based on anticipated increase in application traffic demand. Clients may wish to lower the target limits in an embodiment in which the client is charged by the WAN service based on the bandwidth limits requested. In at least some embodiments, other types of information may be provided to WAN service clients than the information shown in FIG. 26 and FIG. 27. Example Custom Processing using WAN Service In some embodiments, as mentioned above, clients may request that specified custom processing actions be performed for at least a portion of the traffic transmitted via the WAN service on the clients' behalf. FIG. 28 illustrates an example scenario in which a mandatory intermediary for traffic flowing between specified locations may be configured on behalf of a client of a WAN service, according to at least some embodiments. In the depicted example, VRs 2825A and 2825B have been configured for routing traffic between client premise P1 in Region-A and client premise P2 in Region-B.

At the client's request, a mandatory intermediary 2835 comprising an auditing engine 2871 may be configured for inter-regional traffic of the client (i.e., for packets transmitted between Region-A and Region-B). Based on custom action specifications provided by the client, the auditing engine 2871 may examine some or all packets transmitted between the regions, and generate and store audit log corresponding records in the depicted embodiment. In some embodiments, a mandatory intermediary may be established at an offloading device of the kind discussed earlier, so that the custom actions do not have to be performed by the routing plane nodes of the VRs. In other embodiments, another computing device that is not utilized for offloading workload from the VRs may be used. In at least one embodiment, a client may provide executable code to be used to perform custom actions for the client's traffic, and the executable code may be deployed at one or more devices by the WAN service. In some embodiments, multiple client-requested custom actions may be performed for inter-regional traffic, e.g., using respective processing engines (such as auditing engine 2871) or using a single processing engine that is configured to perform all the actions.

In some embodiments, a provider network WAN service may be configured as a primary path for traffic between some client premises, while a secondary path for the traffic may be configured using resources external to the provider network. As such, two types of WAN links may be used: provider-network private backbone links (used as the primary WAN links), and external WAN links (e.g., leased fiber lines similar to those shown in FIG. 24). The inter-regional traffic of the client may be distributed among the two types of WAN links in some embodiments, e.g., based on split conditions specified by the client. For example, a client may specify that 60% of the traffic is to flow over the provider network backbone links, with the remaining 40% sent via the leased fiber lines. In one such embodiment, the client's traffic splitting preferences may be provided to the WAN service, along with information about how the VRs should direct the portion of the traffic which is not to be sent via the backbone links. The VRs may be configured to direct the requested portion of traffic to the external WAN links (e.g., with 60% of packet flows being sent over the backbone, and 40% sent from a VR to WAN appliances indicated by the client for transmission over the leased fiber lines). In another approach, the provider network backbone links may be used by default, and the client's traffic may be switched to the external fiber lines in the event of a failure reported by the WAN service, or in response to performance metrics reaching a specified threshold at the WAN service. In some embodiments, a client serviced may provide configuration information to the WAN service which can be used to access performance metrics for the leased fiber WAN, and a unified tool or interface (similar to the interface depicted in FIG. 27) may be used to provide performance metrics and health status pertaining to both types of WANs to clients.

Example Programmatic Interactions with WAN Service

Figure 29:
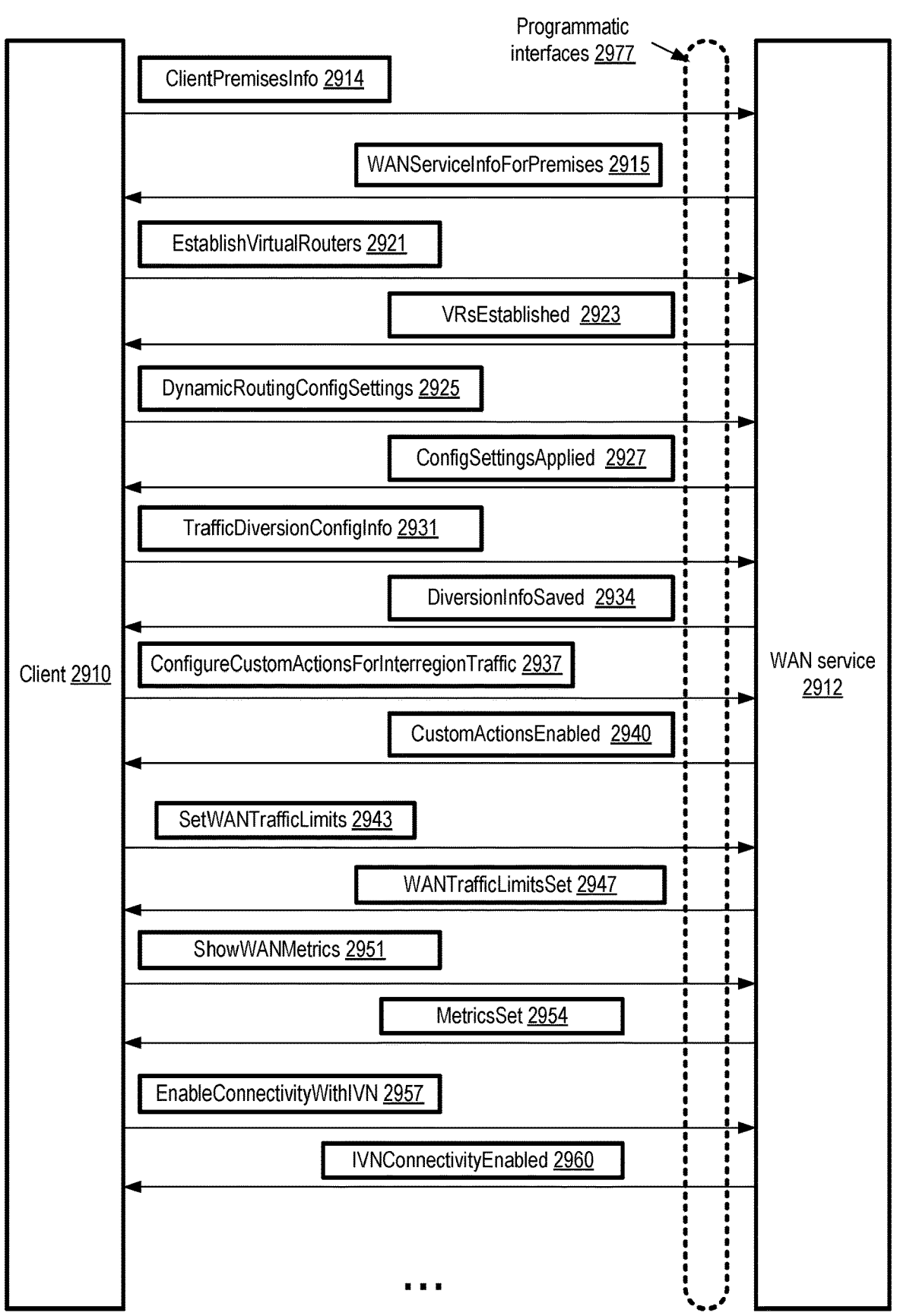
FIG. 29 illustrates an example set of programmatic interactions pertaining to the use of private provider network backbone network links for traffic between client premises, according to at least some embodiments.

FIG. 29 illustrates an example set of programmatic interactions pertaining to the use of private provider network backbone network links for traffic between client premises, according to at least some embodiments. In the depicted embodiment, a WAN service 2912 similar in functionality to WAN service 2502 of FIG. 5 may implement a set of programmatic interfaces 2977, which may be used by clients 2910 to submit requests and messages pertaining to their desired WAN configurations, and received corresponding responses. Programmatic interfaces 2977 may include, for example, a web-based console, command line tools, APIs, and/or graphical user interfaces similar to those shown in FIG. 26 and FIG. 27. In some embodiments, the WAN service may be implemented as a subcomponent of a more general packet processing service (PPS) of the kind discussed earlier, and PPS programmatic interfaces may be employed for the interactions shown in FIG. 29.

A client 2910 (or a potential client, who has not yet decided whether to start using the WAN service 2912) may submit information in one or more ClientPremisesInfo messages 2914 about a set of client premises between which network connectivity via the private fiber backbone of the provider network is desired in the depicted embodiment. In some embodiments, the premises information may include only the location information (e.g., city, state, country) of the individual premises. In other embodiments, e.g., if the client has already decided to use the WAN service, more details may be included in a ClientPremisesInfo message, such as the desired bandwidth and/or latency, the protocol(s) to be used for exchanging dynamic routing information pertaining to the premises, IP addresses of dynamic routing information sources such as client-managed routers or SD-WAN appliances at the premises, and so on. In response, the WAN service may send a WANServiceInfoForPremises message 2915 in some embodiments. The WANServiceInfoFor-Premises message may, for example, provide performance information (e.g., nominal bandwidth available, measured data transfer rates over some recent time interval, latencies, packet error rates, etc.) for private backbone traffic between the provider networks nearest data centers relative to the premises. In some embodiments, the WANServiceInfoFor-Premises message may include recommendations for the number of virtual routers which may be needed, and the mappings between the client premises and the virtual routers: e.g., the specific client premises which should have their networks programmatically attached to each of the recommended virtual routers.

In the embodiment depicted in FIG. 29, a client 2910 may submit one or more EstablishVirtualRouters requests 2921 via the programmatic interfaces 2977, e.g., to create the set of virtual routers recommended by the WAN service. In response, the virtual routers may be established, e.g., using compute instances of a virtualized computing service of the provider network as discussed earlier, with metadata pertaining to the virtual routers being stored/managed at a packet processing service (PPS) of the provider network. A VRsEstablished message 2923 may be sent back to the client in some embodiments after the VRS have been established and programmatically attached to the networks at the client premises. In at least some embodiments, in addition to assigning/allocating fast-path and exception path nodes of the VRs, auxiliary task offloaders comprising protocol processing engines (e.g., for the particular protocol indicated by the client) may also be configured for the VRs by the PPS, and sessions of dynamic routing information exchange may be initiated between the VR protocol processing engines and the dynamic routing information sources at the client premises. In addition to the attachment of VRs with the client-premise networks, in at least some embodiments peering attachments with dynamic routing enabled (similar to the attachments discussed in the context of FIG. 18) may be established between various pairs of the VRs. In one embodiment, separate programmatic requests may be sent by the client 2910 to create VRs, and then to attach the VRs to client-premise networks as well as to other VRs.

In another embodiment, the client may not have to create VRs or request attachments; instead, the WAN service may automatically set up and configure the VRs based on the information provided by the client regarding client premise networks. In some embodiments, e.g., based on client preferences indicated via programmatic interfaces 2977, VPN tunnels may be set up between VRs and one or more client-premise networks; in other embodiments, dedicated private physical links (direct connect links) may be set up for communications between one or more client premises and the corresponding VRs.

In some embodiments, a client 2910 may provide rules for controlling the kinds of routing information that is to be transmitted among the VRs and/or between the VRs and the client premise dynamic routing information sources. Such rules may be indicated via DynamicRoutingConfigSettings messages 2925, which may comprise information similar to that contained in RoutingInfoTransferConfigSettings messages 2225 of FIG. 22. Any of a number of different configuration settings may be indicated, including the specific versions or variants of protocols to be used (e.g., any of various flavors of BGP such as eBGP, iBGP, MP-BGP etc.), settings for filtering outbound advertised routes, filtering inbound advertisements, relative priorities assigned to various BGP attributes to select a next hop to a destination, CIDR blocks to be used for the IP addresses of protocol processing engines, autonomous system identifiers to be assigned to the protocol processing engines, and so on. The settings and/or rules specified may be stored in the client WAN metadata store of the WAN service, and applied to the WAN configuration of the client, before a ConfigSettingsApplied message 2927 is sent to the client.

A client may provide failover-related settings for their WAN, e.g., using one or more TrafficDiversionConfigInfo messages 2931 to the WAN service in the depicted embodiment. A TrafficDiversionConfigInfo message may indicate one or more diversion criteria for traffic which would normally be directed to some set of network endpoints within one or more of the client premises. A diversion criterion may, for example, comprise a detection that one or more links to the set of network endpoints have failed or that latencies for delivering packets to the set of endpoints have exceeded a threshold. The TrafficDiversionConfigInfo may also indicate substitute endpoints, e.g., at a customer premise in another region, to which the traffic should be diverted if the criteria are satisfied. In the traffic diversion configuration information may be stored and a DiversionInfoSaved message 2934 may be sent to the client in some embodiments. In accordance with the information provided, in various embodiments, the VRs configured for the client's WAN may divert packets from one set of network endpoints (the initial destinations of the packets) in one region to another set of network endpoints in another region when the diversion criteria are satisfied.

In some embodiments, clients may request that custom actions be performed for at least some packets transmitted on their behalf via the private fiber backbone of the provider network, e.g., at an auditing engine or other intermediary similar to that discussed in the context of FIG. 28. Rules for selecting the set of packets for which such actions are to be performed, and descriptors of the desired actions themselves (e.g., in source code form or executable code form) may be provided by a client 2910 in one or more ConfigureCustomActionsForInterregionTraffic messages 2937 in the depicted embodiment. The configuration operations needed to perform the custom actions may be completed by the WAN service (such as instantiating auditing engines or other intermediary engines at offloading devices configured for the VRs), and a CustomActionsEnabled message 2940 may be sent to the client.

A client 2910 may set and/or modify performance targets for their WANs, e.g., using SetWANTrafficLimits messages 2943. If and when a client wishes to increase traffic rates, the WAN service may verify that sufficient capacity is available at the private fiber backbone network for supporting the increase before sending a WANTrafficLimitsSet response 2947 to the client in some embodiments.

A client 2910 may request performance metrics, availability metrics and/or health status updates of their backbone-based private WAN by submitting a ShowWANMetrics request 2951 in the depicted embodiment. In response, the requested set of metrics may be presented to the client via one or more MetricsSet responses 2954. The metrics may include, for example, data transfer rates, packet latencies, packet drop/loss rates, uptimes, and the like, provided at any of several granularities chosen by the client such as region-to-region granularity, premise-to-premise granularity, per isolated network granularity and so on.

According to at least one embodiment, a client 2910 may wish to enable connectivity between their client-premise networks and one or more isolated virtual networks (IVNs) set up on behalf of the client at the virtualized computing service of the provider network. An EnableConnectivityWithIVN request 2957 may be sent to the WAN service in such an embodiment. In response, one or more configuration changes may be made at the appropriate VRs of the client's WAN (e.g., an IVN attachment may be created) and/or at the specified IVN to enable traffic to be routed between the IVN and the client's premises, and an IVNConnectivityEnabled message 2960 may be sent to the client. As and when information about additional client premise networks (indicated in ClientPremisesInfo messages) or additional IVNs (indicated in EnableConnectivityWithIVN messages) to be added to the WAN is provided by the client, routing information pertaining to the additional networks may be automatically propagated among the VRs set up for the client's private WAN, without requiring the client to provide static routes or perform additional configuration operations. In some embodiments, programmatic interactions other than those shown in FIG. 29 may be supported by a WAN service 2912.

Methods of Implementing a WAN Service

FIG. 30 is a flow diagram illustrating aspects of operations that may be performed at a wide area networking service of a provider network which transmits traffic between client premises via a private fiber backbone, according to at least some embodiments. As shown in element 3001, information pertaining to various premises of a client whose inter-premise traffic is to be transmitted, with dynamic routing enabled, using a private fiber backbone network of a provider network may be determined or obtained, e.g., via programmatic interfaces a WAN service similar in functionality to WAN service 2502 of FIG. 25. The provider network may implement a variety of network-accessible services other than the WAN service itself, such as a virtualized computing service (VCS) and a packet processing service (PPS) of the kind discussed earlier The information may include, for example, the locations of the premises, the protocols to be used for exchanging dynamic routing information that can be used to transmit packets to/from the networks at the premises, addresses of dynamic routing information sources of the client premise networks such as client-owned routers, SD-WAN appliances, and so on in the depicted embodiment.

Optionally, in some embodiments, at least some WAN service quality information pertinent to the client premise locations may be provided to the client, such as expected or measured backbone-based data transfer rates (of the provider network's internal traffic, and/or based on metrics aggregated with respect to traffic of other WAN service clients) between provider network data centers located close to the client premises, packet transfer latencies between such data centers, packet loss rates, etc. (element 3004). In some embodiments, the provider network may organize its data centers in regional groups, obtain metrics for traffic flowing between selected data centers in different regions, and use the metrics to generate and provide the WAN service quality metrics. Approval may be obtained from the client to enable backbone-based connectivity (also referred to as the client's private WAN) between the premises. In some embodiments, the approval may be provided by the client in the same messages/requests in which the client provides information about the premises to be connected using the private fiber backbone.

A set of virtual routers (VRs) may be configured for the client's private WAN in the depicted embodiment using provider network resources (e.g., using compute instances of the VCS and/or control plane components of the PPS) (element 3007). A given VR may be set up using provider network resources which meet proximity criteria with respect to one or more client premises in the depicted embodiment. For example, if a client premise is located in state S1 of a country, a VR may be set up in a provider network-defined region R1 which includes at least some data centers in S1 or a neighboring state, in preference to another provider network-defined region R2 whose data centers are farther away. Connectivity may be established, e.g., using programmatic attachments of the kind discussed earlier, between at least pairs of VRs, as well as between individual VRs and nearby client premise networks in various embodiments.

A respective protocol processing engine (e.g., a BGP processing engine) may be instantiated or configured for each of the VR for received dynamic routing information pertaining to the client-premise networks (element 3010) in some embodiments. In embodiments in which some or all of the client premises comprise dynamic routing information sources such as client-owned or client-managed hardware routers and/or SD-WAN appliances, connectivity may be established between at least one VR configured for the client and each of the dynamic routing information sources. For example, BGP sessions may be established between protocol processing engines configured for the VRs and the dynamic routing information sources at the client premises. Auxiliary task offloaders may be used for the protocol processing engines of the VRs in some embodiments.

Routing information pertaining to a given client-premise network may be obtained at a VR's protocol processing engine (element 3013). The information may be propagated to other VRs set up on behalf of the client, e.g., in accordance with protocol transfer configuration settings indicated by the client in some embodiments. Routing information about a given client-premise network may also be propagated via one or more VRs to a client-premise router or SD-WAN appliance at another client-premise network in various embodiments.

The routing information obtained and propagated among the VRs of the client's private WAN may be used to forward at least some network packets between client premises via the provider network's private fiber backbone in various embodiments (element 3016).

It is noted that in various embodiments, some of the operations shown in FIG. 10, FIG. 17, FIG. 23 and/or FIG. 30 may be implemented in a different order than that shown in the figure, or may be performed in parallel rather than sequentially. Additionally, some of the operations shown in FIG. 10, FIG. 17, FIG. 23 and/or FIG. 30 may not be required in one or more implementations.

Illustrative Computer System

Figure 31:
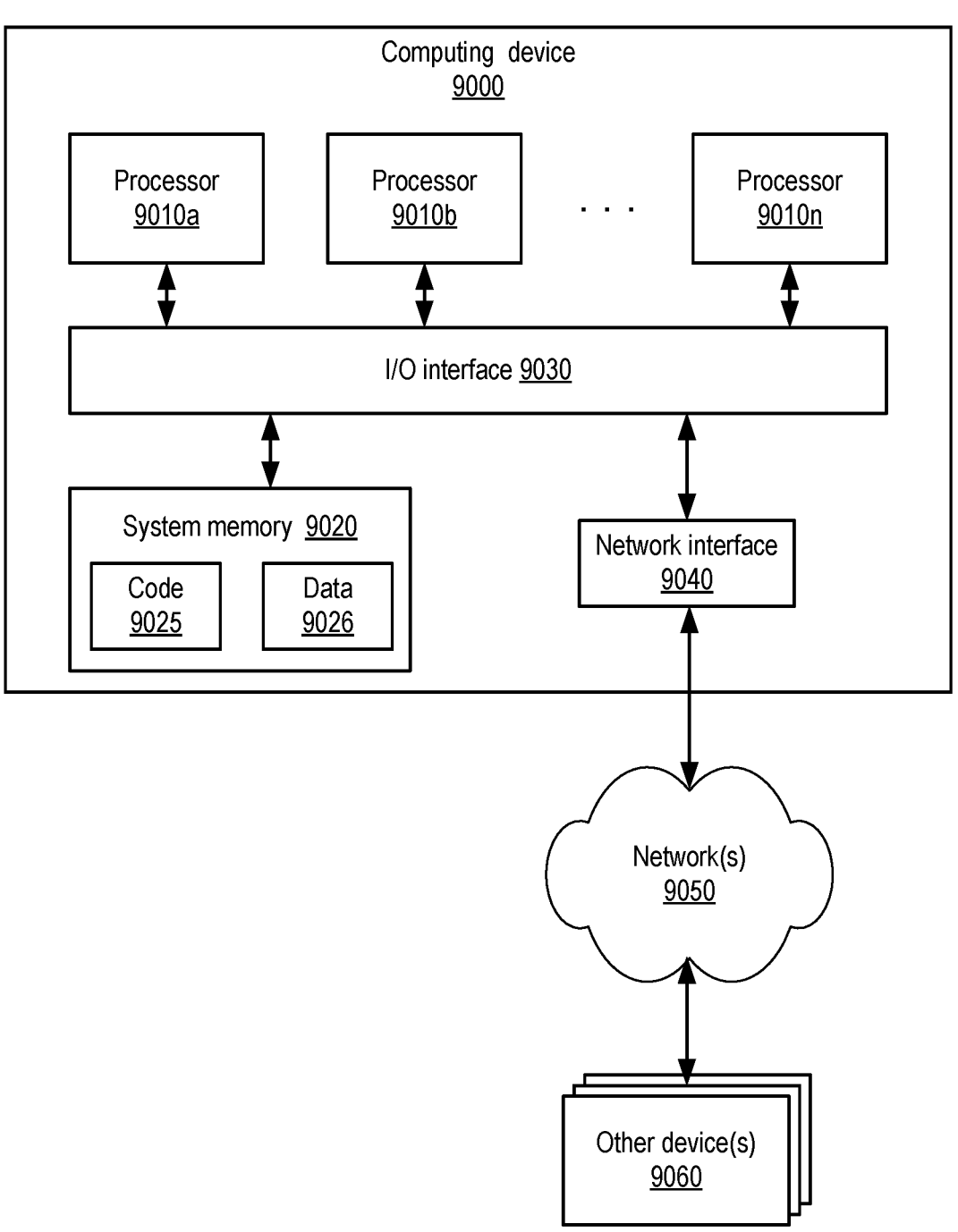
FIG. 31 is a block diagram illustrating an example computing device that may be used in at least some embodiments.

In at least some embodiments, a server that implements the types of techniques described herein (e.g., various functions of a packet processing service, auxiliary task offloaders, a wide area networking service, or other services of a provider network), may include a general-purpose computer system that includes or is configured to access one or more computer-accessible media. FIG. 31 illustrates such a general-purpose computing device 9000. In the illustrated embodiment, computing device 9000 includes one or more processors 9010 coupled to a system memory 9020 (which may comprise both non-volatile and volatile memory modules) via an input/output (I/O) interface 9030. Computing device 9000 further includes a network interface 9040 coupled to I/O interface 9030.

In various embodiments, computing device 9000 may be a uniprocessor system including one processor 9010, or a multiprocessor system including several processors 9010 (e.g., two, four, eight, or another suitable number). Processors 9010 may be any suitable processors capable of executing instructions. For example, in various embodiments, processors 9010 may be general-purpose or embedded processors implementing any of a variety of instruction set architectures (ISAs), such as the x86, PowerPC, SPARC, ARM, or MIPS ISAs, or any other suitable ISA. In multiprocessor systems, each of processors 9010 may commonly, but not necessarily, implement the same ISA. In some implementations, graphics processing units (GPUs) and or field-programmable gate arrays (FPGAs) may be used instead of, or in addition to, conventional processors.

System memory 9020 may be configured to store instructions and data accessible by processor(s) 9010. In at least some embodiments, the system memory 9020 may comprise both volatile and non-volatile portions; in other embodiments, only volatile memory may be used. In various embodiments, the volatile portion of system memory 9020 may be implemented using any suitable memory technology, such as static random access memory (SRAM), synchronous dynamic RANI or any other type of memory. For the non-volatile portion of system memory (which may comprise one or more NVDIMMs, for example), in some embodiments flash-based memory devices, including NAND-flash devices, may be used.

In at least some embodiments, the non-volatile portion of the system memory may include a power source, such as a supercapacitor or other power storage device (e.g., a battery). In various embodiments, memristor based resistive random access memory (ReRAM), three-dimensional NAND technologies, Ferroelectric RAM, magnetoresistive RAM (MRAM), or any of various types of phase change memory (PCM) may be used at least for the non-volatile portion of system memory. In the illustrated embodiment, program instructions and data implementing one or more desired functions, such as those methods, techniques, and data described above, are shown stored within system memory 9020 as code 9025 and data 9026.

In one embodiment, I/O interface 9030 may be configured to coordinate I/O traffic between processor 9010, system memory 9020, and any peripheral devices in the device, including network interface 9040 or other peripheral interfaces such as various types of persistent and/or volatile storage devices. In some embodiments, I/O interface 9030 may perform any necessary protocol, timing or other data transformations to convert data signals from one component (e.g., system memory 9020) into a format suitable for use by another component (e.g., processor 9010). In some embodiments, I/O interface 9030 may include support for devices attached through various types of peripheral buses, such as a variant of the Peripheral Component Interconnect (PCI) bus standard or the Universal Serial Bus (USB) standard, for example. In some embodiments, the function of I/O interface 9030 may be split into two or more separate components, such as a north bridge and a south bridge, for example. Also, in some embodiments some or all of the functionality of I/O interface 9030, such as an interface to system memory 9020, may be incorporated directly into processor 9010.

Network interface 9040 may be configured to allow data to be exchanged between computing device 9000 and other devices 9060 attached to a network or networks 9050, such as other computer systems or devices as illustrated in FIG. 1 through FIG. 30, for example. In various embodiments, network interface 9040 may support communication via any suitable wired or wireless general data networks, such as types of Ethernet network, for example. Additionally, network interface 9040 may support communication via telecommunications/telephony networks such as analog voice networks or digital fiber communications networks, via storage area networks such as Fibre Channel SANs, or via any other suitable type of network and/or protocol.

In some embodiments, system memory 9020 may represent one embodiment of a computer-accessible medium configured to store at least a subset of program instructions and data used for implementing the methods and apparatus discussed in the context of FIG. 1 through FIG. 30. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computing device 9000 via I/O interface 9030. A non-transitory computer-accessible storage medium may also include any volatile or non-volatile media such as RAM (e.g. SDRAM, DDR SDRAM, RDRAM, SRAM, etc.), ROM, etc., that may be included in some embodiments of computing device 9000 as system memory 9020 or another type of memory. In some embodiments, a plurality of non-transitory computer-readable storage media may collectively store program instructions that when executed on or across one or more processors implement at least a subset of the methods and techniques described above. A computer-accessible medium may further include transmission media or signals such as electrical, electromagnetic, or digital signals, conveyed via a communication medium such as a network and/or a wireless link, such as may be implemented via network interface 9040. Portions or all of multiple computing devices such as that illustrated in FIG. 31 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device", as used herein, refers to at least all these types of devices, and is not limited to these types of devices.

Conclusion

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A computer-implemented method, comprising:
receiving, via one or more programmatic interfaces of a cloud computing environment, an indication of geographic locations of a pair of sites, external to the cloud computing environment, between which WAN (Wide Area Network) connectivity is to be established using a backbone network of the cloud computing environment;
configuring, using resources of the cloud computing environment and based at least in part on the geographic locations indicated via the one or more programmatic interfaces, a set of gateways to be utilized for WAN traffic between the pair of sites; and
causing, using the set of gateways, WAN traffic to be transmitted between the pair of sites via the backbone network.

2. The computer-implemented method as recited in claim 1, further comprising:
obtaining routing preferences for at least a portion of the WAN traffic at the cloud computing environment via the one or more programmatic interfaces, wherein the WAN traffic is transmitted in accordance with the routing preferences.

3. The computer-implemented method as recited in claim 1, further comprising:
receiving at least a portion of the WAN traffic at a gateway of the set of gateways from a site of the pair of sites via a Virtual Private Network (VPN) connection.

4. The computer-implemented method as recited in claim 1, further comprising:
presenting, via the one or more programmatic interfaces, one or more metrics of the WAN traffic.

5. The computer-implemented method as recited in claim 1, further comprising:
in response to a request received via the one or more programmatic interfaces, wherein the request indicates a virtual network established at the cloud computing environment, causing network traffic originating at the virtual network to be transmitted via the backbone network to a site of the pair of sites.

6. The computer-implemented method as recited in claim 1, further comprising:
obtaining, via the one or more programmatic interfaces, a performance target for the WAN traffic between the pair of sites; and
selecting, from among a plurality of links of the backbone network, one or more links for the WAN traffic based at least in part on the performance target.

7. The computer-implemented method as recited in claim 1, further comprising:
obtaining, via the one or more programmatic interfaces, an indication of one or more auditing operations to be performed with respect to at least a portion of the WAN traffic between the pair of sites; and
causing the one or more auditing operations to be performed.

8. A system, comprising:

one or more computing devices;

wherein the one or more computing devices include instructions that upon execution on or across the one or more computing devices:

receive, via one or more programmatic interfaces of a cloud computing environment, an indication of geographic locations of a pair of sites, external to the cloud computing environment, between which WAN (Wide Area Network) connectivity is to be established using a backbone network of the cloud computing environment;

configure, using resources of the cloud computing environment and based at least in part on the geographic locations indicated via the one or more programmatic interfaces, a set of gateways to be utilized for WAN traffic between the pair of sites; and cause, using the set of gateways, WAN traffic to be transmitted between the pair of sites via the backbone network.

9. The system as recited in claim 8, wherein the one or more computing devices include further instructions that upon execution on or across the one or more computing devices:

obtain routing preferences for at least a portion of the WAN traffic at the cloud computing environment via the one or more programmatic interfaces, wherein the WAN traffic is transmitted in accordance with the routing preferences.

10. The system as recited in claim 8, wherein the one or more computing devices include further instructions that upon execution on or across the one or more computing devices:

receive at least a portion of the WAN traffic at a gateway of the set of gateways from a site of the pair of sites via a Virtual Private Network (VPN) connection.

11. The system as recited in claim 8, wherein the one or more computing devices include further instructions that upon execution on or across the one or more computing devices:

present, via the one or more programmatic interfaces, one or more metrics of the WAN traffic.

12. The system as recited in claim 8, wherein the one or more computing devices include further instructions that upon execution on or across the one or more computing devices:

in response to a request received via the one or more programmatic interfaces, wherein the request indicates a virtual network established at the cloud computing environment, causing network traffic originating at the virtual network to be transmitted via the backbone network to a site of the pair of sites.

13. The system as recited in claim 8, wherein the one or more computing devices include further instructions that upon execution on or across the one or more computing devices:

obtain, via the one or more programmatic interfaces, a performance target for the WAN traffic between the pair of sites; and select, from among a plurality of links of the backbone network, one or more links for the WAN traffic based at least in part on the performance target.

14. The system as recited in claim 8, wherein the one or more computing devices include further instructions that upon execution on or across the one or more computing devices:

obtain, via the one or more programmatic interfaces, an indication of one or more auditing operations to be performed with respect to at least a portion of the WAN traffic between the pair of sites; and cause the one or more auditing operations to be performed.

15. One or more non-transitory computer-accessible storage media storing program instructions that when executed on or across one or more processors:

receive, via one or more programmatic interfaces of a cloud computing environment, an indication of geographic locations of a pair of sites, external to the cloud computing environment, between which WAN (Wide Area Network) connectivity is to be established using a backbone network of the cloud computing environment;

configure, using resources of the cloud computing environment and based at least in part on the geographic locations indicated via the one or more programmatic interfaces, a set of gateways to be utilized for WAN traffic between the pair of sites; and cause, using the set of gateways, WAN traffic to be transmitted between the pair of sites via the backbone network.

16. The one or more non-transitory computer-accessible storage media as recited in claim 15, storing further program instructions that when executed on or across the one or more processors:

obtain routing preferences for at least a portion of the WAN traffic at the cloud computing environment via the one or more programmatic interfaces, wherein the WAN traffic is transmitted in accordance with the routing preferences.

17. The one or more non-transitory computer-accessible storage media as recited in claim 15, storing further program instructions that when executed on or across the one or more processors:

receive at least a portion of the WAN traffic at a gateway of the set of gateways from a site of the pair of sites via a Virtual Private Network (VPN) connection.

18. The one or more non-transitory computer-accessible storage media as recited in claim 15, storing further program instructions that when executed on or across the one or more processors:

present, via the one or more programmatic interfaces, one or more metrics of the WAN traffic.

19. The one or more non-transitory computer-accessible storage media as recited in claim 15, storing further program instructions that when executed on or across the one or more processors:

in response to a request received via the one or more programmatic interfaces, wherein the request indicates a virtual network established at the cloud computing environment, causing network traffic originating at the virtual network to be transmitted via the backbone network to a site of the pair of sites.

20. The one or more non-transitory computer-accessible storage media as recited in claim 15, storing further program instructions that when executed on or across the one or more processors:

obtain, via the one or more programmatic interfaces, a performance target for the WAN traffic between the pair of sites; and select, from among a plurality of links of the backbone network, one or more links for the WAN traffic based at least in part on the performance target.

\* \* \* \* \*